United States Patent [19]

Morishita

[11] Patent Number: 5,647,477
[45] Date of Patent: Jul. 15, 1997

[54] MAGNETIC NON-CONTACT TRANSPORT SYSTEM

[75] Inventor: Mimpei Morishita, Tokyo, Japan

[73] Assignee: Kabushiki Kaisha Toshiba, Kawasaki, Japan

[21] Appl. No.: 529,609

[22] Filed: Sep. 18, 1995

[30] Foreign Application Priority Data

| Sep. 19, 1994 | [JP] | Japan | 6-223788 |
| Mar. 31, 1995 | [JP] | Japan | 7-074317 |
| Mar. 31, 1995 | [JP] | Japan | 7-074322 |

[51] Int. Cl.$^6$ .................................................. B65G 35/00
[52] U.S. Cl. ................................................ 198/619; 104/282
[58] Field of Search .............................. 198/619, 679; 104/282, 283, 284

[56] References Cited

U.S. PATENT DOCUMENTS

| 4,924,778 | 5/1990 | Morishita et al. | 104/284 |
| 4,967,670 | 11/1990 | Morishita et al. | 104/284 |
| 4,972,779 | 11/1990 | Morishita et al. | 104/284 |
| 5,067,415 | 11/1991 | Morishita et al. | 104/281 |
| 5,156,093 | 10/1992 | Azukizawa et al. | 104/282 X |
| 5,163,546 | 11/1992 | Kawada et al. | 198/619 |
| 5,253,969 | 10/1993 | Richert | 198/619 X |

FOREIGN PATENT DOCUMENTS

| 0034272 | 3/1978 | Japan | 198/619 |
| 0299120 | 12/1989 | Japan | 198/619 |
| 2-270739 | 11/1990 | Japan . | |

OTHER PUBLICATIONS

Nikkei Mechanical, pp. 48–52, Jun. 12, 1989.

Annual Conf. 1989 of IEEJ Proceedings, No. 217, pp. 915–916, Aug. 23, 1989, Ryuichi Oguro, et al., "A Gap Control Method of Magnetic Levitation Transfer System".

*Primary Examiner*—James R. Bidwell
*Attorney, Agent, or Firm*—Oblon, Spivak, McClelland, Maier & Neustadt, P.C.

[57] ABSTRACT

A ferromagnetic track positioning type magnetic levitation transport system which transports without contact a large variety of ferromagnetic objects without impairing the expandability of the track. The track is composed of support units 3, propulsion units 5 and guidance units 7. In the support units 3, multiple magnetic support units 15 are mounted so that they are vertically moveable. Attraction control device 19 performs levitation control which contributes to the vertical movement of the center of gravity of the part of steel plate X overlapping support unit 3 and levitation control which contributes to the rolling of the same part of steel plate X. The height of steel plate X is maintained at a specified position by controlling height adjustment mechanisms with height control system 53. Stabilization of the pitching of steel plate X accomplished using coil springs 47 and dampers 49 which are provided in support units 3. Movement and at the same time, decrease of yawing of steel plate X is caused by propulsion unit 5. Guidance of steel plate X in the left and right directions is performed by guidance unit 7.

28 Claims, 38 Drawing Sheets

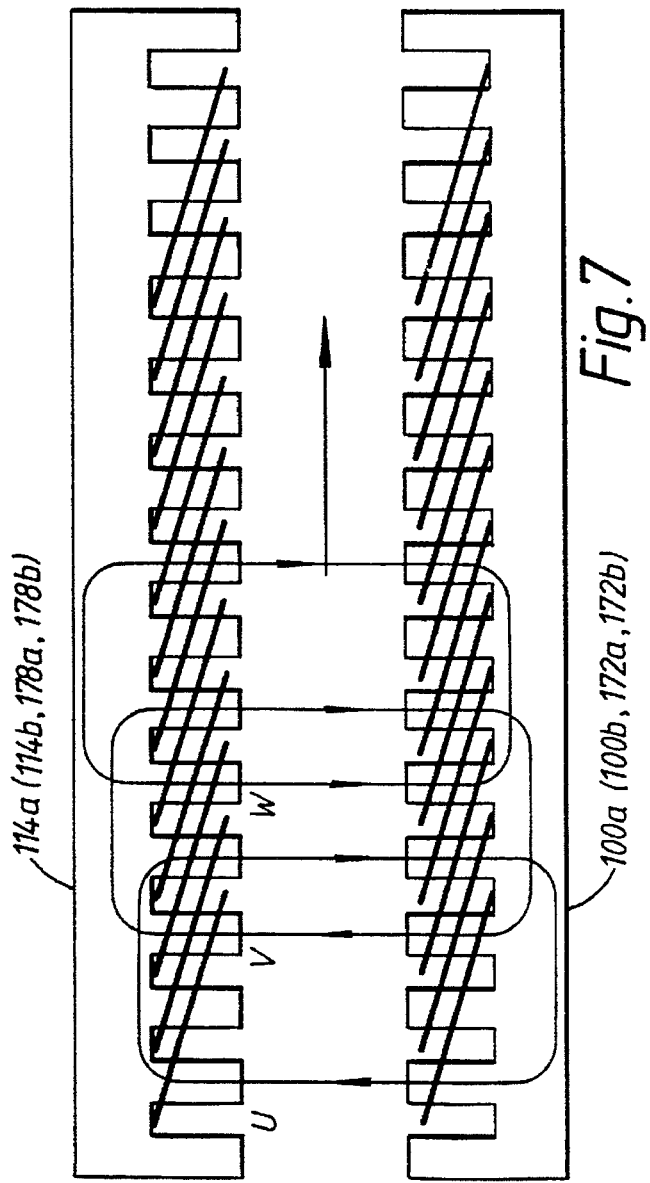
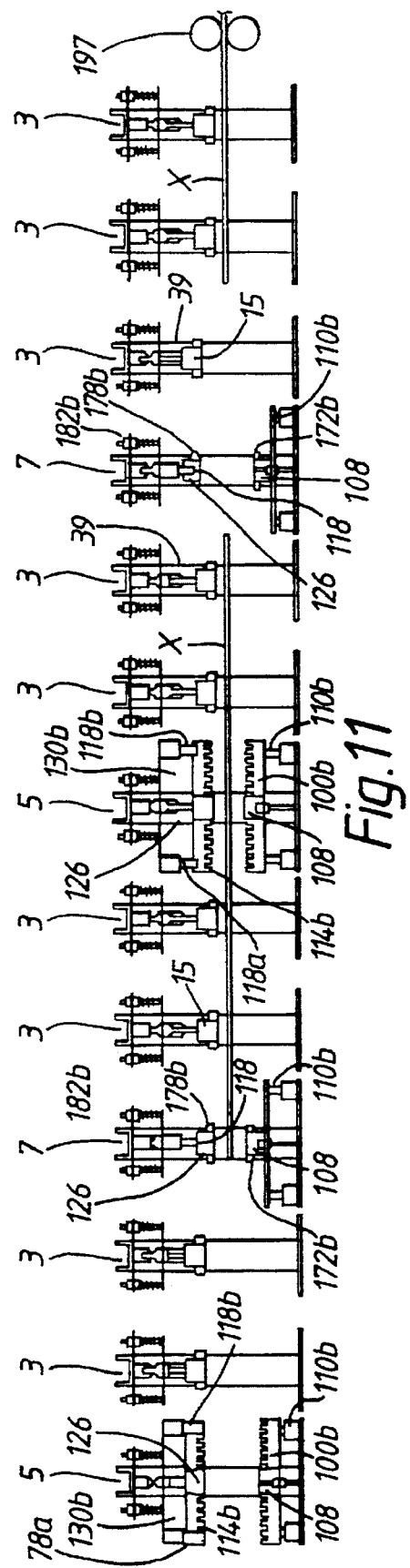
Fig.7
Fig.11

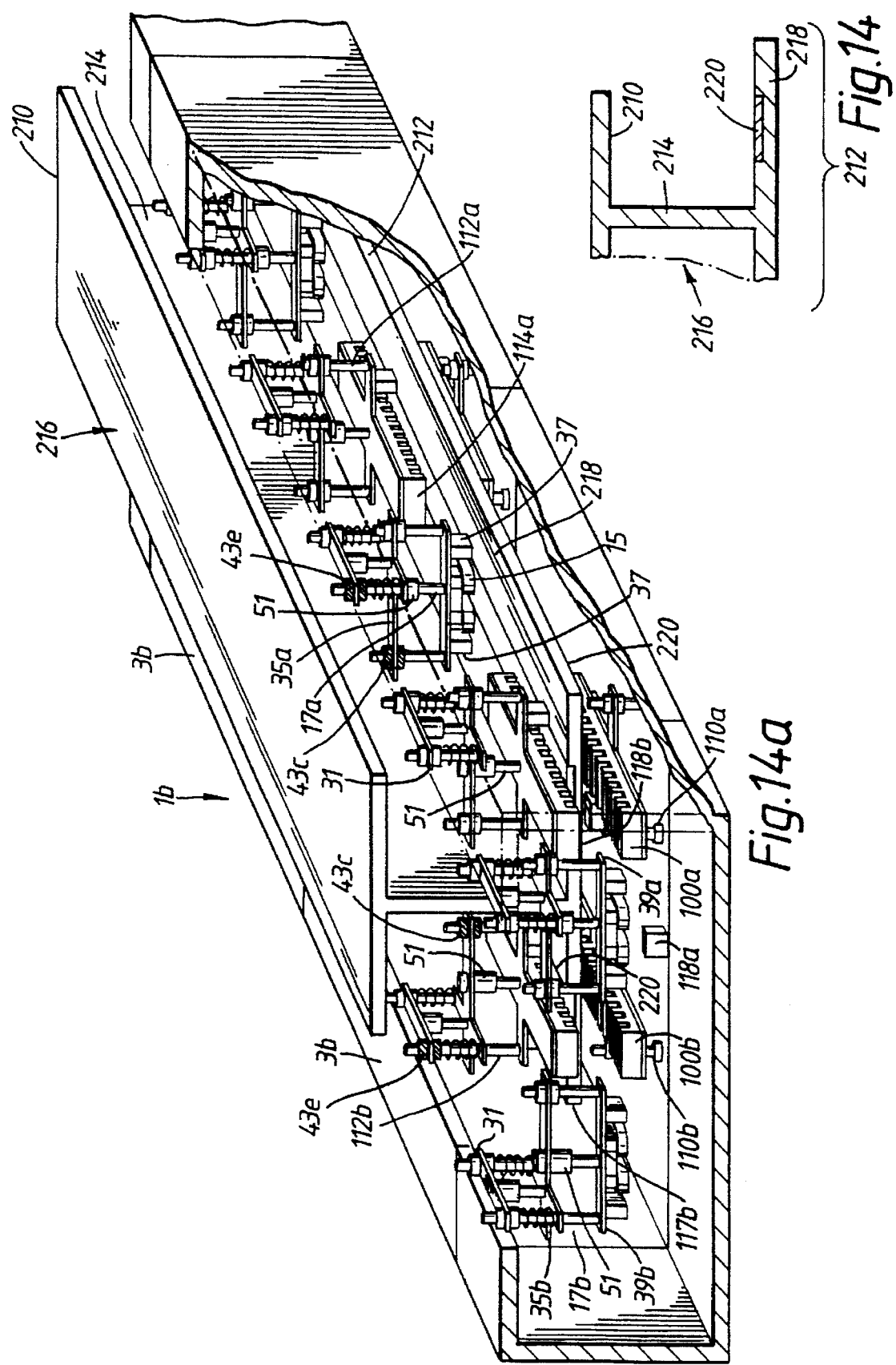

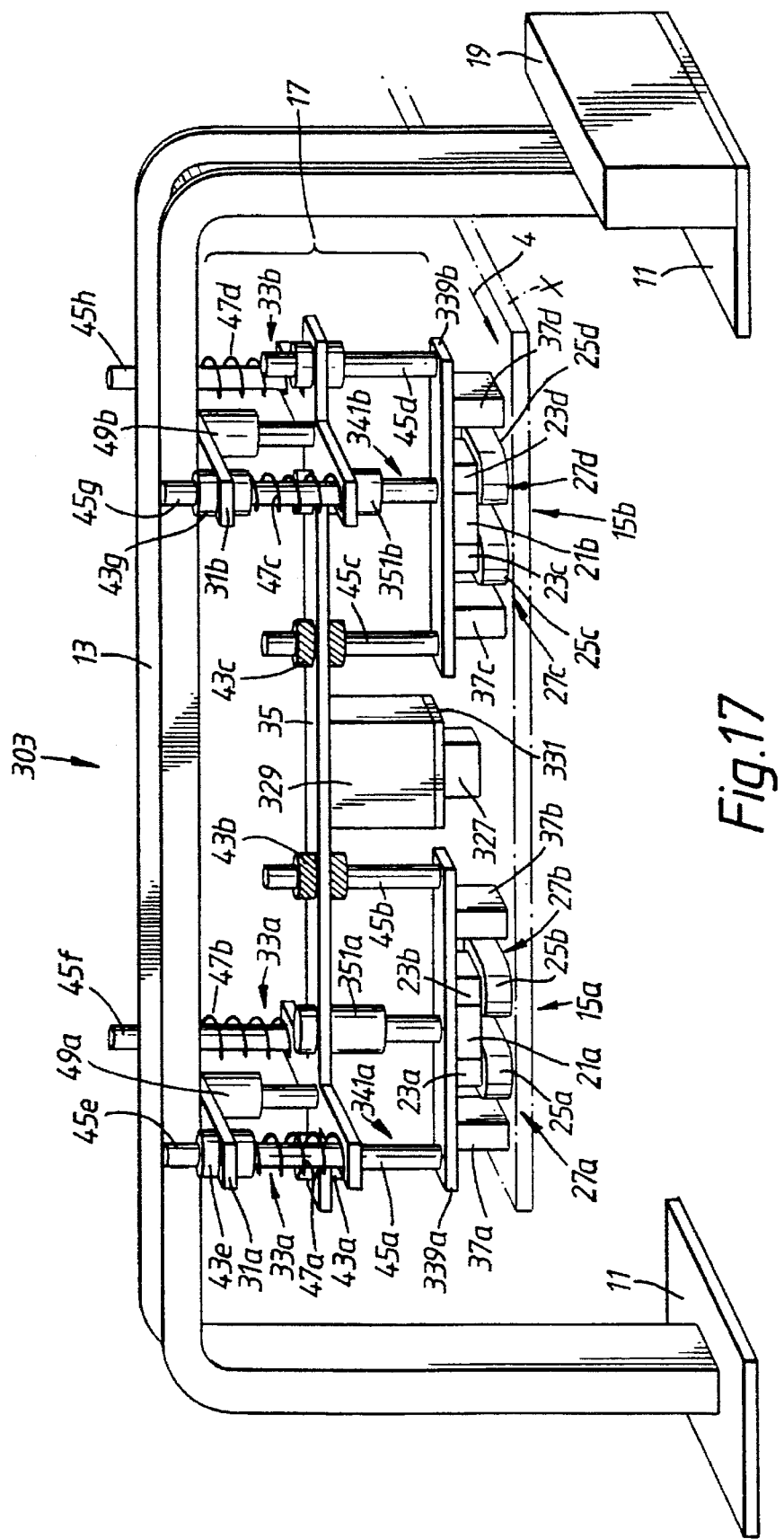

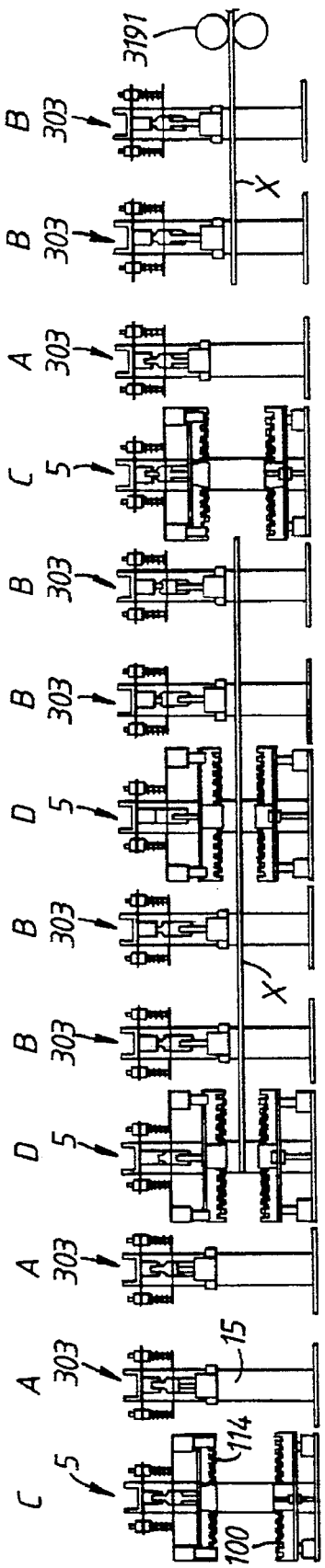
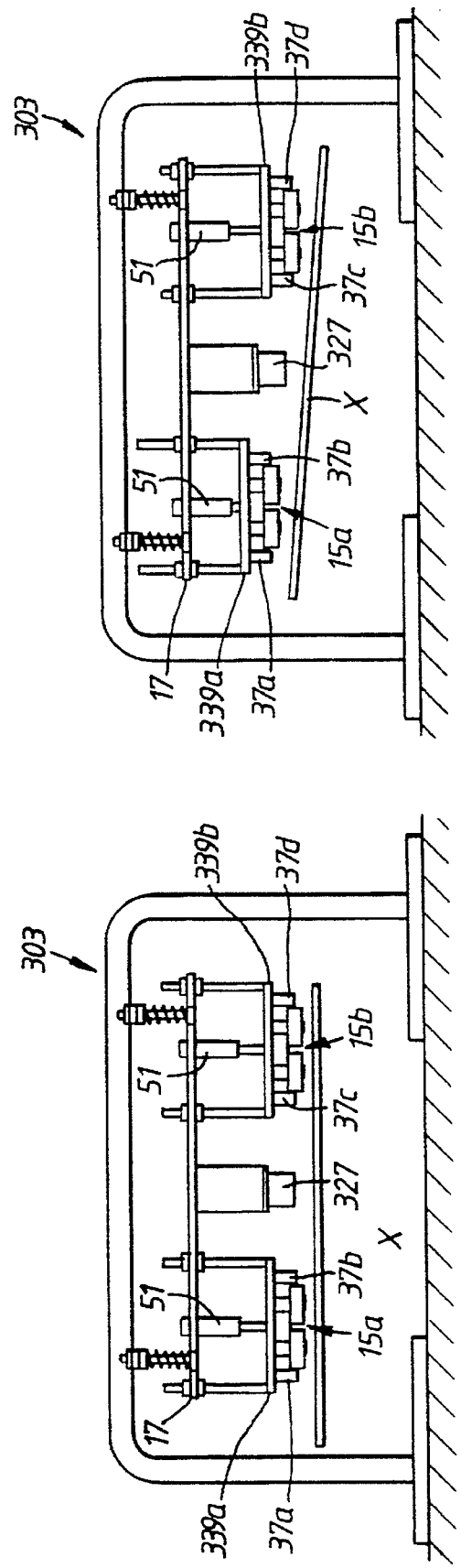
Fig.19
Fig.20a
Fig.20b

MAGNETIC NON-CONTACT TRANSPORT SYSTEM

BACKGROUND OF THE INVENTION

1. Field of the Invention

This invention concerns a track mounting type magnetic levitation transport system which performs non-contact transport of objects to be transported by attraction type magnetic levitation; the objects to be transported being made of ferromagnetic bodies such as steel plate.

2. Description of the Prior Art

For example, when transporting steel plate between steel plate processing equipment in the cold rolling process at a steel works, normally, a transport method using a roller track, in which multiple rollers are arranged in the direction of transport, is adopted. Also, in steel plate press processing at car plants and the like, generally, a transport method is adopted in which the steel plates to be pressed are transported to the pressing equipment using bogies or cranes.

However, with the method using roller tracks, if there is any dirt, etc. on the rollers, the surface of the steel plate which the track transports is liable to be scratched. Thus, there is a risk of significant reduction of the product quality. For this reason, the rollers must always be serviced so that dirt and the like does not adhere to the rollers. Thus, there is the problem of requiring large amounts of labour and cost. Also, with the bogie or crane methods, there are the problems that, not only is the steel plate liable to scratching when loading or unloading, but also a great deal of time is expended on the movement.

Therefore, currently, various systems are under development to resolve problems such as these. A system for the non-contact support of steel plate has been developed (Nikkei Mekanikaru, Jun. 12, 1989). In this, for instance, multiple electromagnets are laid in a track and these electromagnets are successively excited where the end of the steel plate, which moves along a track beneath the electromagnets, approaches the electromagnets. Here, the attraction of the electromagnets is used for supporting the weight of the steel plate and for imparting thrust to the steel plate. At the same time, adsorption of the steel plate to the electromagnets is prevented by jetting air on the steel plate from compressed air passages provided between the electromagnets and the steel plate. Also, a study on the support of thin steel plate by 4 electromagnets (Denki Gakkai Sangyo Oyo Bumon, Zenkoku Taikai Yokoshu, July 1989, p915) and the development of a system which guides steel plate without contact using specially shaped electromagnets (Japan Laid-Open Patent Gazette: Laid-Open Patent No. Heisei 2-270739) are in progress.

However, with these techniques, the systems are complex, and the range of dimensions and weights of steel plate which can be transported is restricted. Also, it is presumed that the transporting of various weights and types of steel plate over long distances will be difficult.

As described above, when transporting steel plate without any scratching with devices which use mechanical contact, large amounts of labour and time are required for maintenance, shock prevention during transport, etc. Also, with prior art non-contact transport devices, there are problems such as that the dimensions and weights of transportable steel plates are limited, the systems are complex and long-distance transport is difficult.

SUMMARY OF THE INVENTION

Therefore, the aim of this invention is to provide a track mounting type magnetic levitation transport system which can transport various objects to be transported made of magnetic materials over long distances, and in which the transport line can be easily constructed.

In order to achieve the above aim, in a track mounting type magnetic levitation transport system in which a track provided with a magnetic support system is positioned along the transport route of the objects to be transported, and which is designed for the non-contact transport of objects to be transported by controlling the magnetic attraction of the above magnetic support system, the track of this invention is composed by including multiple supporting units which are positioned in the direction of transport and these supporting units are composed by providing a track frame;

multiple magnetic support units positioned approximately orthogonal to the transport direction of the objects to be transported via a mounting device which permits vertical movement of the track frame including the electromagnets and an attraction control device which performs levitation control on the perpendicular movement of the object to be transported and levitation control on the rolling of the object to be transported by controlling the electromagnets of each magnetic support unit when the object to be transported is below each magnetic support unit.

When using this invention, levitation control on the perpendicular movement of the object to be transported and levitation control on rolling are performed at every supporting unit. Also, it is possible to inhibit the pitching of the object to be transported between the supporting unit by the magnetic support units being vertically moveable using the mounting device. For this reason, stable levitation can be performed by inhibiting the vertical movement and rolling of the object to be transported at every supporting unit, even if, not only the whole length, but also the whole width, of the object to be transported varies. Also, pitching of the object to be transported can be inhibited by the mounting device. Therefore, non-contact support of the whole object to be transported is possible. Moreover, even when the weight and the inertial moment of the object to be transported differ, this difference is distributed to each supporting unit. Thus, as a track mounting type magnetic levitation transport system as a whole which is formed of collection of individual supporting units, non-contact support is possible for objects to be transported which have a greater range of weights and inertial moments. Also, non-contact transport is possible for multiple objects to be transported by one track.

Moreover, in a track mounting type magnetic levitation transport system in which a track provided with a magnetic support system is positioned along the transport route of the objects to be transported, and is designed for the non-contact transport of objects to be transported by controlling the magnetic attraction of the above magnetic support system, this invention has the characteristics that the track is composed by including multiple supporting units which are positioned in the direction of transport and these supporting units are composed by providing a track frame;

multiple magnetic support units positioned approximately orthogonal to the transport direction of the objects to be transported via a mounting device which permits vertical movement of the track frame including the electromagnets;

an attraction control device which performs levitation control on the perpendicular movement of the object to be transported and levitation control on the rolling of the object to be transported by controlling the electromagnets of each magnetic support unit when the object to be transported is below each magnetic support unit; an inclination device which varies the angle of inclination of the object to be transported in the direction orthogonal to the transport direction and an angle of inclination control device which controls that angle of inclination.

When using this invention, levitation control on the perpendicular movement of the steel plate and levitation control on rolling are performed at every unit supporting component. Also, it is possible to inhibit the pitching of the steel plate between the unit supporting components by the magnetic support units being vertically moveable using the mounting device. For this reason, stable levitation can be performed by inhibiting the vertical movement and rolling of the steel plate at every supporting unit, even if, not only the whole length, but also the whole width, of the steel plate varies. Also, pitching of the steel plate can be stabilized by the mounting device. Therefore, it is possible to support the whole of the steel plate without contact.

Moreover, when guiding the steel plate by controlling the inclination of the steel plate to the left or right in relation to the direction of advance at every supporting unit, the guiding force which acts on the steel plate by inclining the magnetic support units is proportional to the weight of the steel plate. Since the acceleration of the steel plate to the left or right is unrelated to the weight, it is possible to achieve guidance control of the steel plate without being affected by the weight of the steel plate.

For this reason, there is no requirement for the provision of an additional guidance device. Therefore, it is possible to simplify the composition of the whole system and, at the same time it is possible to increase the number of supporting units per unit length of track. Even when the weight and the inertial moment of the steel plate differ, this difference can be divided into each supporting unit. Thus, as a track mounting type magnetic levitation transport system as a whole which is formed of a collection of individual supporting units, non-contact support and guidance is possible for steel plates which have a greater range of weights and inertial moments. Also, non-contact transport is possible for multiple steel plates to be transported by one track.

Furthermore, in a magnetic levitation system provided with magnet units having electromagnets; frames for mounting these magnet units and a magnetic support control device which controls the attraction of the electromagnets of the magnet units for the non-contact support of the object to be transported of which at least a part is formed by a ferromagnetic body, this invention has the characteristic of being provided with an inclination device which varies the angle of inclination of the object to be transported in the direction of transport and an angle of inclination control device which controls this angle of inclination.

When using this invention, the guiding force acts by the combined force of the gravitational force due to the inclination of the levitated object to be transported and the attraction of the magnetic unit. The guiding force can be adjusted by detecting the amount of movement and the speed of movement in the guidance direction of the object to be transported, and controlling the angle of inclination of the object to be transported. Therefore, there is no requirement for the provision of additional electromagnets for guidance. Thus, the supporting mechanism can be simplified.

Also, since the guiding force can be obtained by the inclination of the object to be transported, a guiding force can be obtained which is relative in size to the mass of the object to be transported. Moreover, it is possible to obtain guidance of the object to be transported, even if the width of the object to be transported is greater than the span of magnet units in the direction of guidance.

For this reason, it is possible to support various types of steel plate over long distances without contact. Also, the simple construction of a transport line can be achieved.

BRIEF DESCRIPTION OF THE DRAWINGS

Other objects and features of the invention will become apparent from the following detailed description of the preferred embodiments taken in conjunction with the accompanying drawings in which:

FIG. 7 is a diagram to illustrate the stator moving magnetic field in the above system.

FIG. 11 is a cross-sectional view along the track central length direction to illustrate the operation in the above system.

FIG. 14 is an oblique view of the essential parts in the track mounting type magnetic levitation transport system concerned in yet another different embodiment of this invention.

FIG. 17 is an oblique view showing the track mounting type magnetic levitation transport system of another embodiment of this invention.

FIG. 19 is a side view showing the lay-out state of the above transport system.

FIG. 20 is front views of magnetic support units to illustrate the inclination guidance operation using the above transport system.

DETAILED DESCRIPTIONS OF THE PREFERRED EMBODIMENTS

The following is a description of an embodiment of this invention with reference to the drawings.

Figure 1:
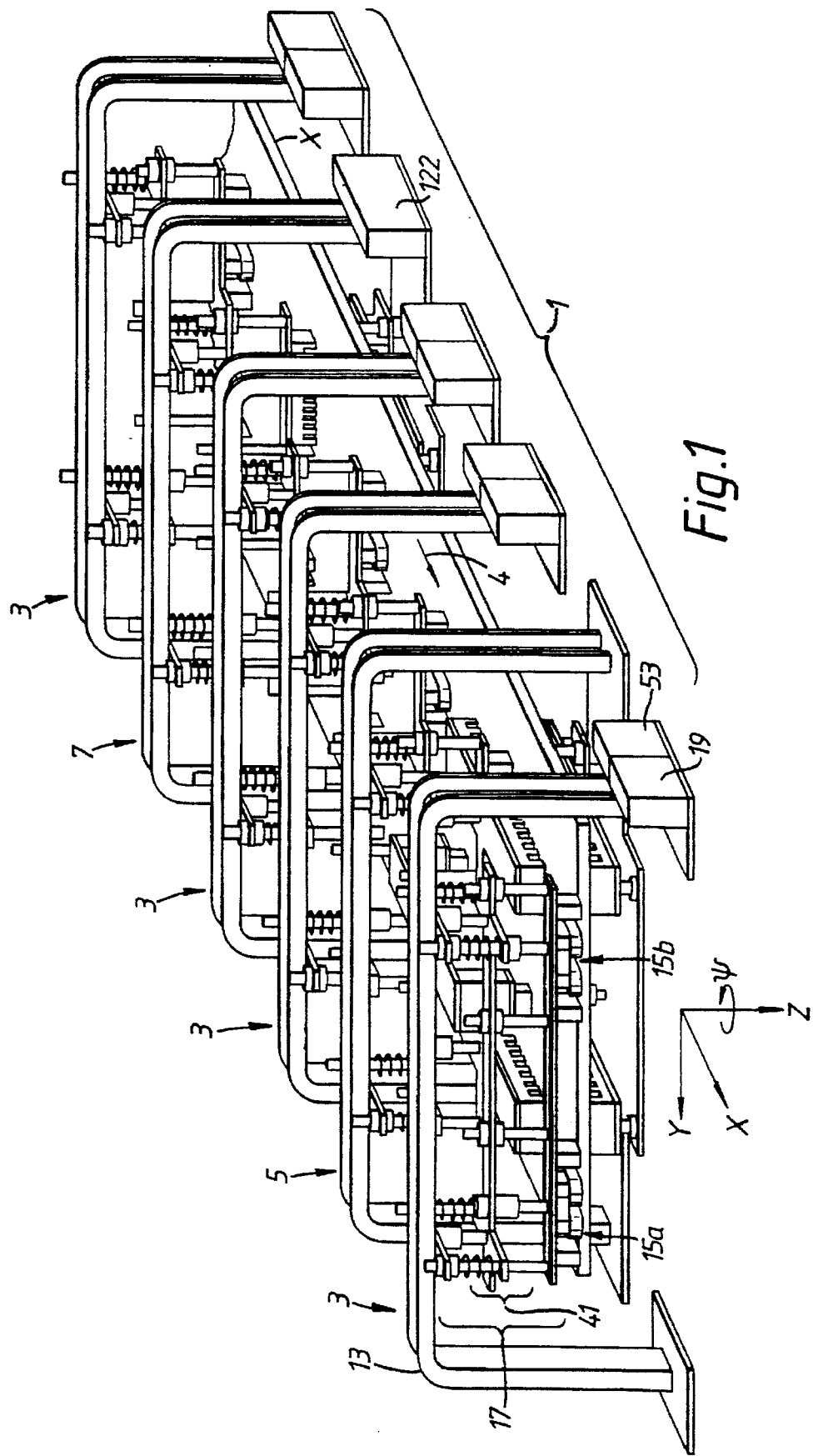
FIG. 1 is an oblique view of the essential parts in the track mounting type magnetic levitation transport system concerned in an embodiment of this invention.

FIG. 1 shows track mounting type magnetic levitation transport system 1 concerned in an embodiment of this invention. The composition of track mounting type magnetic levitation transport system 1 includes supporting units 3, which form a track arranged along the transport route;

propulsion units 5 arranged at strategic points on the track and which give thrust in transport direction 4 to the object to be transported made of ferromagnetic material, for instance steel plate X and guidance units 7 positioned at strategic points on the track and which apply guiding forces to steel plate X.

Figure 2:
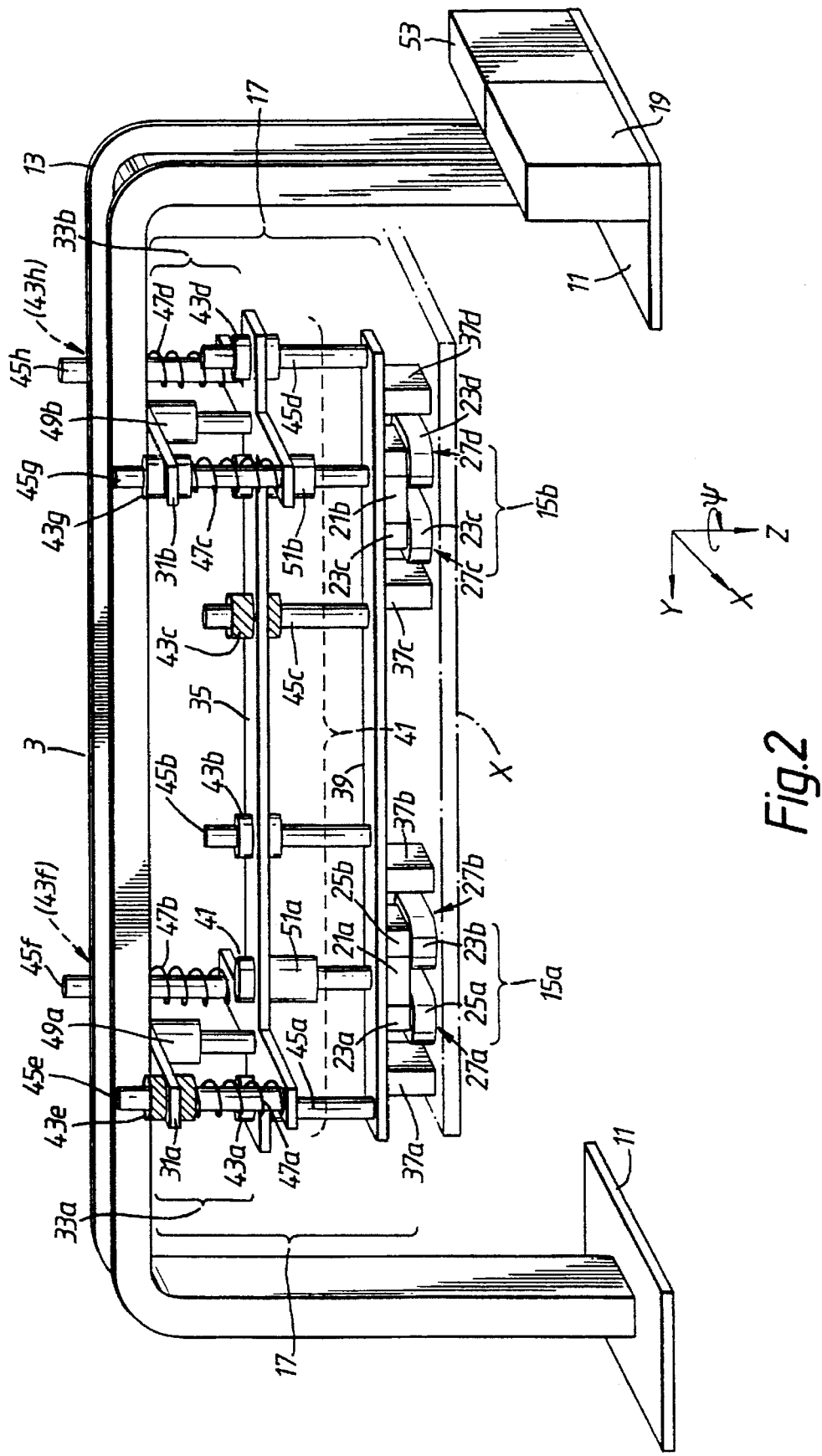
FIG. 2 is an oblique view of the essential parts of a support unit in the above system.

As shown in FIG. 2, the composition of support unit 3 includes inverted U-shaped track frame 13 which has bases 11 secured to its two ends;

a pair of magnetic support units 15a and 15b aligned on a line orthogonal to the transport direction and which exert magnetic attraction on steel plate X in order to support steel plate X, which is the object to be transported, without contact;

mounting device 17, which is provided between track frame 13 and each magnetic support unit 15a and 15b, for mounting each magnetic support unit 15a and 15b on track frame 13 and attraction control device 19 which causes the non-contact support of steel plate X by controlling the magnetic attraction of each magnetic support unit 15a and 15b.

Each magnetic support unit 15a and 15b is respectively composed in the same manner. Magnetic support unit 15a is composed of permanent magnet 21a sandwiched by two electromagnets 27a and 27b, made up of coils 23a and 23b and iron cores 25a and 25b. In the same way, magnetic support unit 15b is composed of permanent magnet 21b sandwiched by two electromagnets 27c and 27d, made up of coils 23c and 23d and iron cores 25c and 25d. Also, both coils 23a, 23b (coils 23c, 23d) are connected in series so that their magnetic fluxes are reinforced each other by using the same excitation current.

Mounting device 17 is composed of two seats 31a and 31b welded to the underside of track frame 13 with a specified predetermined distance between them;

baseplate 35 which is guided so that it is only free to move in the vertical direction via guide mechanisms 33a and 33b respectively provided beneath these two seats 31a and 31b;

substrate 39, for the two magnetic support units 15a and 15b and attraction control device 19, on the underside of which are provided four gap sensors 37a, 37b, 37c and 37d which measure the gaps between each magnetic support unit 15a and 15b and steel plate X and height adjustment mechanism 41 which is secured to the upper face of substrate 39 and adjusts the height of substrate 39 by varying the distance between baseplate 35 and substrate 39.

Also, height adjustment mechanism 41 is composed of a total of four linear guides 43a, 43b, 43c and 43d which are thrust through baseplate 35 and secured at both ends of baseplate 35;

four rods 45a, 45b, 45c and 45d of which the lower ends are secured to substrate 39 and the upper ends are guided by linear guides 43a, 43b, 43c and 43d so that they are free to move in the vertical direction and actuators 51a and 51b, which are free to expand and contract, of which the tops are thrust through baseplate 35 and secured, and the lower ends are secured to the upper face of substrate 39.

The expansion and contraction of actuators 51a and 51b are controlled by height control system 53 in order to control the height of substrate 39 to a predetermined value.

Guide mechanisms 33a and 33b are provided respectively at the two ends of the upper face of baseplate 35. Guide mechanism 33a is composed of a total of two linear guides (one of which is not illustrated) 43e (43f) which are thrust through seat 31a and secured to both ends of seat 31a;

two rods 45e and 45f of which the lower ends are secured to baseplate 35 and the upper ends are guided by linear guides 43e (43f) so that they are free to move in the vertical direction;

coil springs 47a and 47b, as elastic components, which are fitted between baseplate 35 and linear guides 43e (43f) so that they encircle each rod 45e and 45f and damper 49a, as a damping component, of which the upper end is secured to the underside of seat 31a while the lower end is secured to the upper surface of baseplate 35.

In the same way, guide mechanism 33b is composed of a total of two linear guides (one of which is not illustrated) 43g (43h) which are thrust through seat 31b and secured to both ends of seat 3b;

two rods 45g and 45h of which the lower ends are secured to baseplate 35 and the upper ends are guided by linear guides 43g (43h) so that they are free to move in the vertical direction;

coil springs 47c and 47d, as elastic components, which are fitted between baseplate 35 and linear guides 43g (43h) so that they encircle each rod 45g and 45h and damper 49b, as a damping component, of which the upper end is secured to the underside of seat 31b while the lower end is secured to the upper surface of baseplate 35.

In addition, out of the above linear guides 43a, 43b, ..., linear guide 43c and linear guide 43e have another purpose of travel distance measuring devices for measuring the vertical travel distances of respective rods 45c and 45e.

Figure 3A:
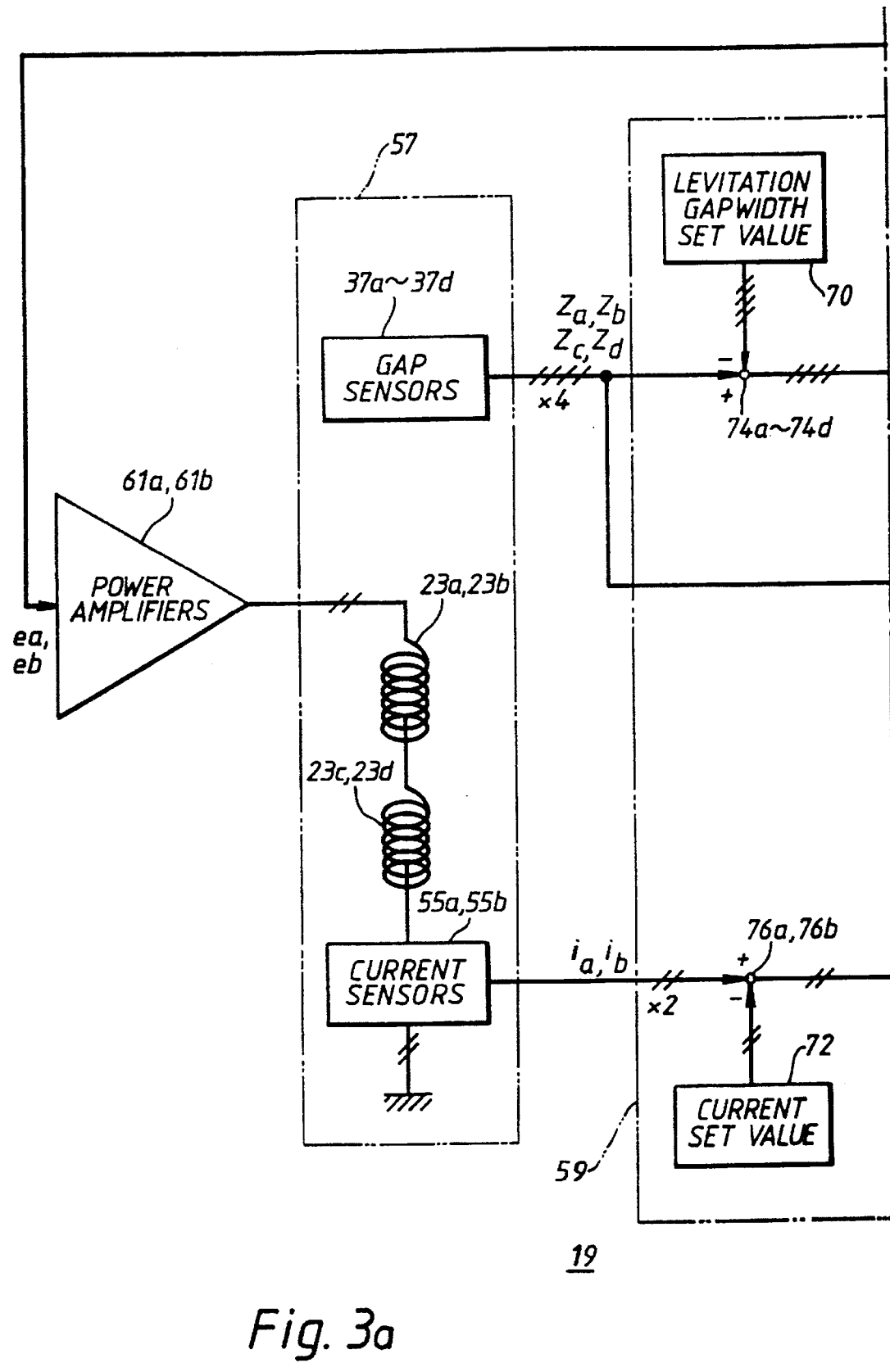
FIG. 3 is a block diagram of the attraction control system in the above system.
Figure 3B:
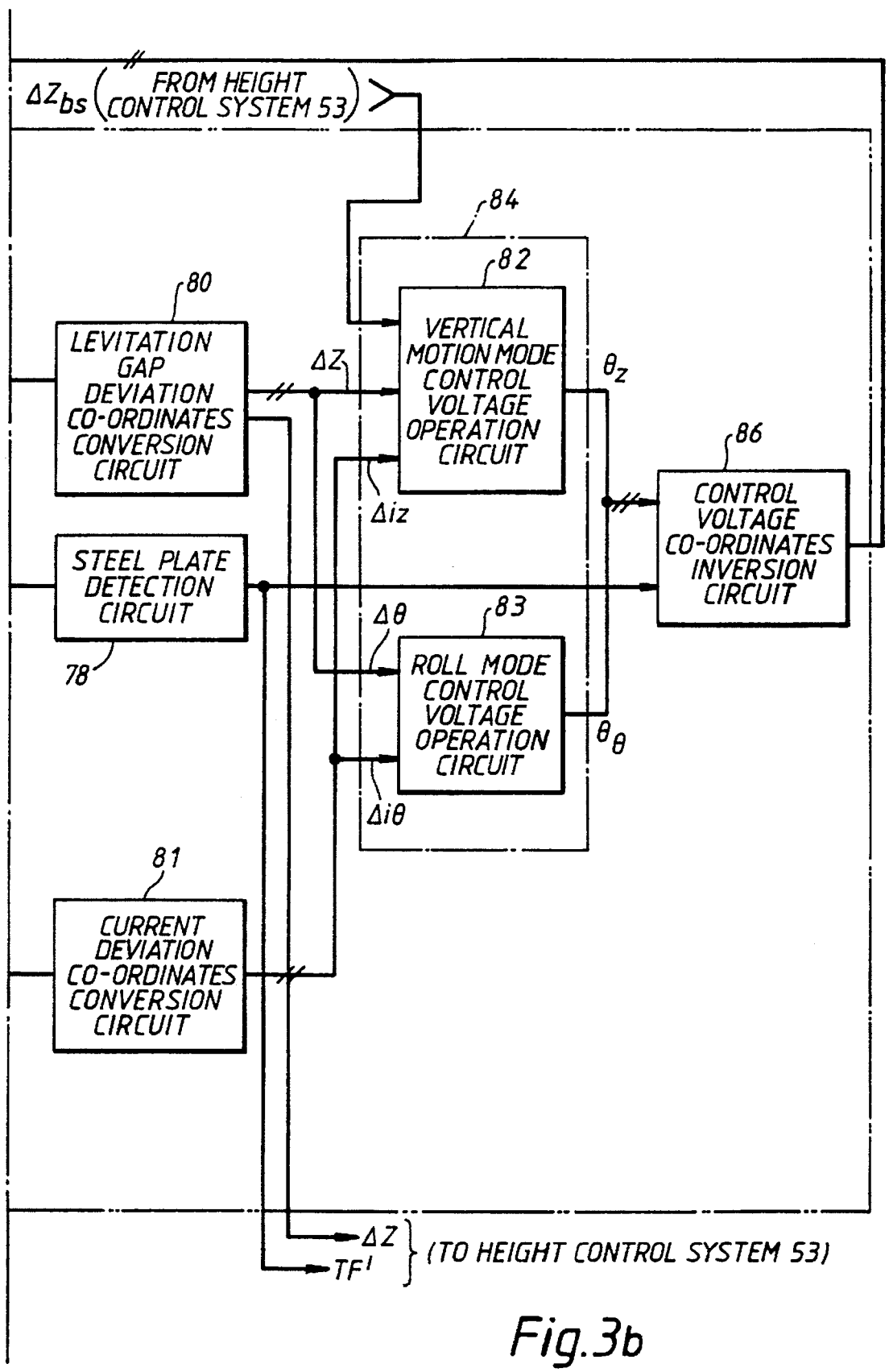

As shown in the block diagram in FIG. 3, attraction control device 19 is mainly composed of levitation sensor unit 57, levitation operation unit 59 and power amplifiers 61a and 61b. That is to say, attraction control device 19 is composed of levitation sensor unit 57 which is composed of four gap sensors 37a, 37b, 37c and 37d which are positioned close to the left and right of each magnetic support unit 15a and 15b in every support unit 3 to measure the levitation gaps between the respective magnetic support units 15a and 15b and steel plate X, and current detectors 55a and 55b for measuring the excitation currents flowing in each coil 23a (23b) and 23c (23d) of electromagnets 27a (27b) and 27c (27d);

operation unit for levitation 59 which takes as its inputs output signals za~zd, ia and ib from levitation sensor unit 57 and displacement signal $\Delta$zbs from the predetermined setting value for the height of substrate 39 obtained from height control system 53, and calculates excitation voltages ea and eb for every magnetic support unit 15a and 15b which are required to levitate steel plate X and power amplifiers 61a and 61b which are connected to a power source (not illustrated) and excite coils 23a, 23b, 23c and 23d of each magnetic support unit 15a and 15b based on outputs ea and eb of levitation operation unit 59.

Levitation operation unit 59 of attraction control device 19 is composed of levitation gap setter 70 and levitation current setter 72 which output predetermined setting values which are set by, for instance, the main computer;

subtractors 74a~74d for subtracting the levitation gap setting value from output values za~zd of gap sensors 37a~37d and subtractors 76a and 76b which subtract the current setting value from output values ia and ib of current detectors 55a and 55b;

steel plate detector circuit 78 which detects the presence of steel plate X at a position below magnetic support units 15a and 15b from output values za~zd of gap sensors 37a~37d;

levitation gap deviation coordinates conversion circuit 80 for obtaining deviation $\Delta$z from the predetermined position of the center of gravity of the part of steel plate X which is overlapped by support unit 3 and roll angle $\Delta\theta$ of the same part of steel plate X from the output values of subtractors 74a~74d.

excitation current deviation coordinates conversion circuit 81 for obtaining coil excitation current $\Delta$iz which contributes to the vertical motion of the center of gravity of the part of steel plate X which is overlapped by support unit 3 and coil excitation current $\Delta i\theta$ which contributes to the rolling of the same part of steel plate X;

control voltage operation circuit 84 which is provided with vertical motion mode control voltage operation circuit 82 which takes as its inputs signal $\Delta$zbs from height control system 53, which expresses the deviation from the predetermined height of substrate 39 in addition to outputs $\Delta$z and $\Delta$iz of levitation gap deviation coordinates conversion circuit 80 and excitation current deviation coordinates conversion circuit 81, and calculates coil excitation voltage ez which contributes to the vertical motion of the center of gravity of the part of steel plate X which is overlapped by support unit 3 and roll mode control voltage operation circuit 83 which takes as its inputs outputs $\Delta\theta$ and $\Delta i\theta$ of levitation gap deviation coordinates conversion circuit 80 and excitation current deviation coordinates conversion circuit 81, and calculates coil excitation voltage e$\theta$ which contributes to the rolling of the part of steel plate X which is overlapped by support unit 3 and control voltage coordinates inversion circuit 86 which takes as its inputs outputs ez and e$\theta$ of control voltage operation circuit 84 and detection signal TF from steel plate detector circuit 78, and, when steel plate X is present below magnetic support units 15a and 15b, calculates the excitation voltages ea and eb for exciting the respective magnetic support units 15a and 15b.

In control voltage coordinates inversion circuit 86, when steel plate detection signal TF changes from 'NO' to 'YES', its outputs change from 0 and 0 to ea and eb after predetermined time t1. Moreover, when the rolling of steel plate X is impaired due to external causes, the design is that output e$\theta$ of roll mode control voltage operation circuit 83 becomes zero through a device which is not illustrated.

Figure 4:
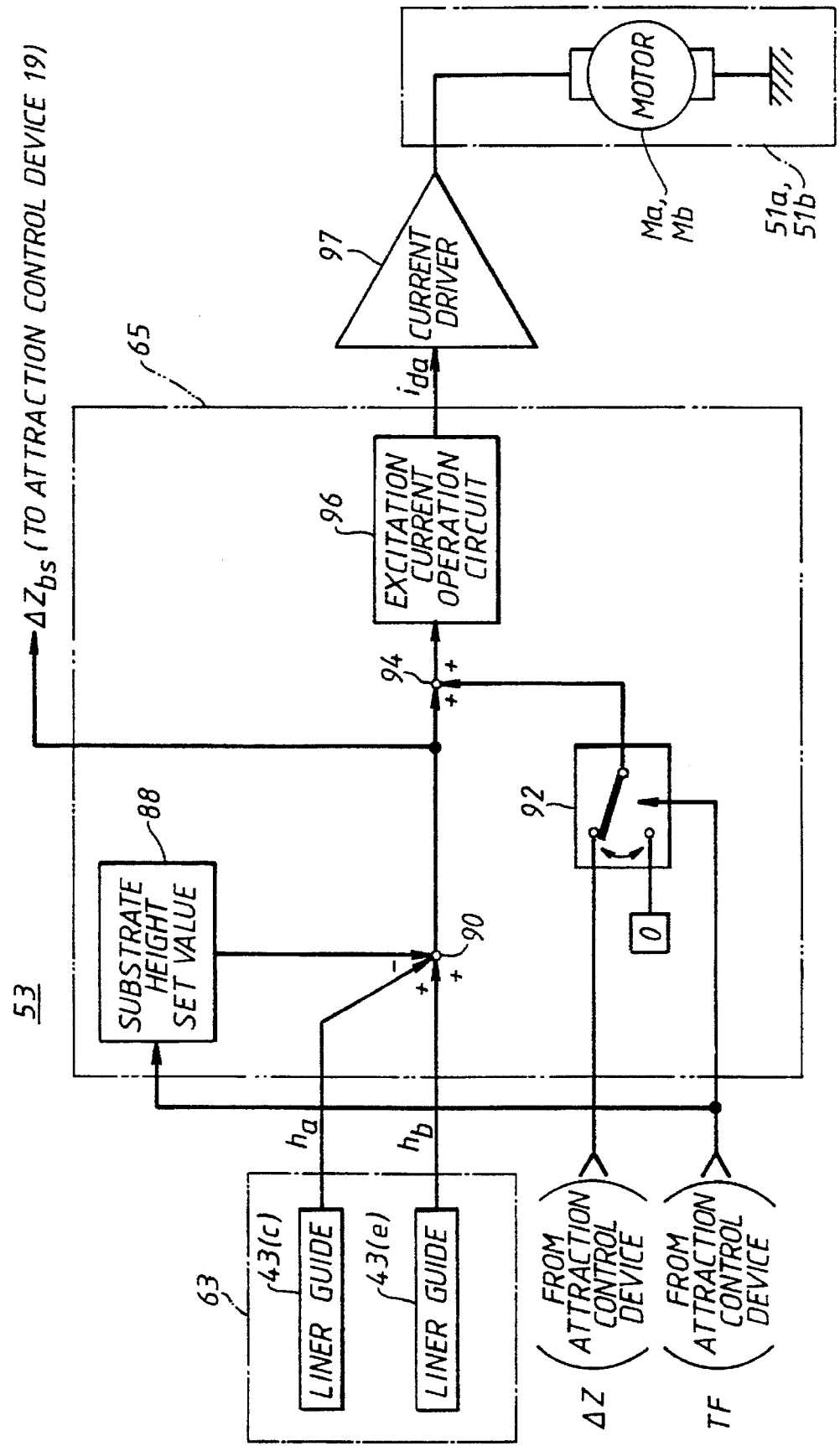
FIG. 4 is a block diagram of the height control system in the above system.

As shown in FIG. 4, height control system 53 is composed of height adjustment sensor unit 63, which is composed of linear guides 43c and 43e which are provided with travel distance meters;

height adjustment operation unit 65, which takes as its inputs the output signals of height adjustment sensor unit 63 and signal $\Delta$z for the displacement from the predetermined set value of the levitation gap length and steel plate X detection signal TF, which are obtained from attraction control device 19, and calculates the motor driving current ida of actuators 51a and 51b in order to maintain the height of steel plate X at the predetermined value during levitation and current driver 67 which is connected to a power source (not illustrated) and drives motors Ma and Mb of actuators 51a and 51b based on output ida of height adjustment operation unit 65.

Height adjustment operation unit 65 is composed of substrate height setter 88, which selectively outputs multiple predetermined setting values, which are set by, for instance, a main computer, based on steel plate detection signal TF from attraction control device 19;

operator 90 for subtracting the base height set value from the sum of output values ha and hb of linear guides 43a and 43b;

changeover switch 92 which takes as its inputs displacement signal $\Delta$z and steel plate detection signal TF from attraction control device 19, and outputs $\Delta$z when steel plate X is levitated below magnetic support units 15a and 15b and 0 when that is not the case;

adder 94 which adds the output of operator 90, which expresses signal $\Delta$zbs for the displacement from the predetermined setting value of the height of substrate 39, to the output of changeover switch 92 and excitation current operation circuit 96 which calculates motor driving current ida, for actuators 51a and 51b for maintaining the predetermined value of the height of steel plate X when levitated, from the output of operator 94.

In changeover switch 92, when steel plate detection signal TF changes from 'NO' to 'YES', the changeover from 0 to $\Delta$z is performed after predetermined time t2.

Figure 5:
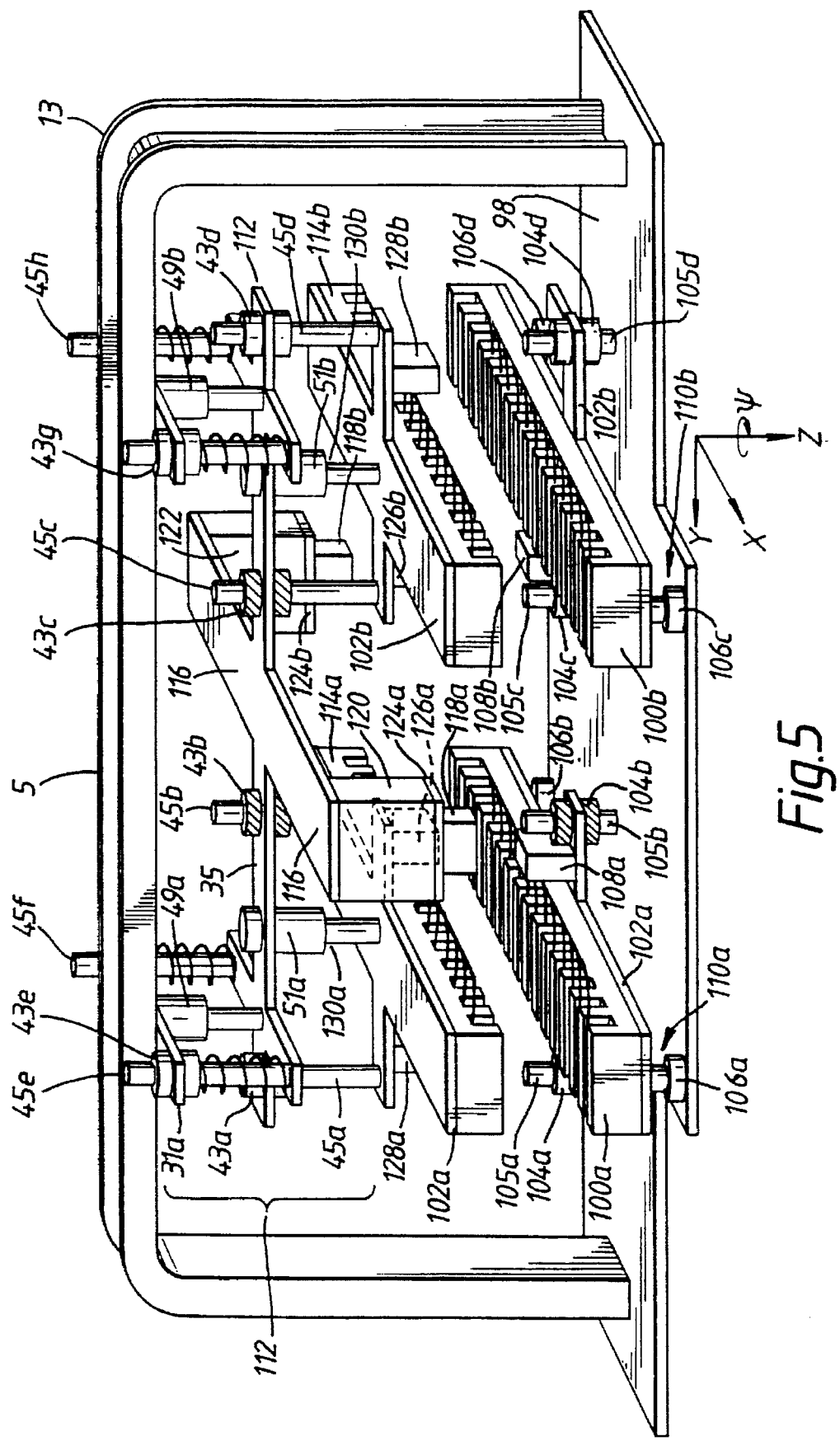
FIG. 5 is an oblique view of a propulsion unit in the above system.

Propulsion unit 5 is composed as shown in FIG. 5. In the description of the structural parts used in this drawing, those parts which are the same as some of the structural components in the drawing described above have been given the same symbols and their descriptions have been omitted.

In this propulsion unit 5, the ends of the two legs of its track frame 13 are secured to a single base 98. Stators 100a and 100b of two linear induction motors, as the propulsion device for imparting a thrust to steel plate X without contact, are located above the upper surface of base 98.

Stators 100a and 100b are respectively secured to the upper surfaces of cross-shaped substrates 102a and 102b. In order to guide stator 100a in the vertical direction, cross-shaped substrate 102a is mounted on base 98 via a pair of linear guides 104a and 104b which are thrust through substrate 102a and secured; rods 105a and 105b, which are guided by linear guides 102a and 102b, and of which the lower ends are secured to the upper surface of base 98, and a pair of actuators 106a and 106b of which the upper ends are secured to the underside of substrate 102a while the lower ends are secured to the upper surface of base 98, and which are positioned at the front and rear ends of substrate 102a. In the same way, in order to guide stator 100b in the vertical direction, cross-shaped substrate 102b is mounted on base 98 via a pair of linear guides 104c and 104d which are thrust through substrate 102b and secured; rods 105c and 105d, which are guided by linear guides 102c and 102d, and of which the lower ends are secured to the upper surface of base 98, and a pair of actuators 106c and 106d of which the upper ends are secured to the underside of substrate 102b while the lower ends are secured to the upper surface of base 98, and which are positioned at the front and rear ends of substrate 102b.

Gap sensors 108a and 108b, which detect the gap width between steel plate X and stators 100a and 100b, are respectively installed on the upper surfaces of the inner arms of the two substrates 102a and 102b. That is to say, base 98, linear guides 104a, 104b, 104c and 104d, and actuators 106a, 106b, 106c and 106d compose height adjustment mechanisms 110a and 110b for stators 100a and 100b. Also, out of linear guides 104a, 104b, 104c and 104d, linear guides 104b and 104c have the additional purpose of respective travel distance meters for rods 105b and 105c.

The structure of mounting device 112 between baseplate 35 and track frame 13 is the same as the structure of the above-mentioned support unit 3. Its description has therefore been omitted.

The part below baseplate 35 of mounting device 112 of propulsion unit 5 is composed by respectively suspending cross-shaped substrates 102a and 102b from the undersides of the two ends of baseplate 35 by respective actuators 51a and 51b, respective pairs of linear guides 43a, 43b and 43c, 43d and rods 45a, 45b and 45c, 45d which pass through these. Here, in mounting device 112, the damping factor of damper 49 is infinity. Furthermore, in order to impart thrust to steel plate X (not illustrated) without contact, as propulsion devices, linear induction motor stators 114a and 114b are respectively installed on the undersides of substrates 102a and 102b so that they face stators 100a and 100b.

Support plates 116 are secured on both sides of the central portion of baseplate 35 of mounting device 112. As detection devices for the presence of steel plate X and the yawing of steel plate X, feed monitors for detecting left and right travel without contact are mounted below the two tips of support plate 116 via thrust control system 120, height control system 122 and seating plates 124a and 124b.

At the same time, at the left and right ends of cross-shaped substrates 102a and 102b of mounting device 112, two gap sensors 126a and 126b, which detect the respective gaps between steel plate X and stator 114a and between steel plate X and stator 114b, are mounted on the inner sides, while feed monitors 128a and 128b, for the non-contact detection of the presence of steel plate X and its travel along the track, are mounted on the outer sides. That is to say, height adjustment mechanisms 130a and 130b which can adjust the respective heights of stators 114a and 114b are each composed by two linear guides 43a, 43b and 43c, 43d which are thrust through and secured to baseplate 35;

two rods 45a, 45b and 45c, 45d of which the lower ends are secured to substrates 102a and 102b, and which are guided by linear guides 43a, 43b and 43c, 43d so that they are free to move in the vertical direction and actuators 51a and 51b of which the upper parts are thrust through and secured to baseplate 35 while the lower ends are secured to the upper surfaces of substrates 102a and 102b, and which are free to expand and contract.

The expansion and contraction of actuators 106a, 106b and 106c, 106d and actuators 51a and 51b are controlled by height control system 122 in order to control the respective heights of stators 100a and 100b and stators 114a and 114b at the predetermined values. Here, in feed monitors 118a and 118b and feed monitors 128a and 128b, zero is outputted when the absence of steel plate X is detected, and when the presence of steel plate X is detected, the amount of travel from the time of detection is outputted, taking the initial value as zero.

Figure 6A:
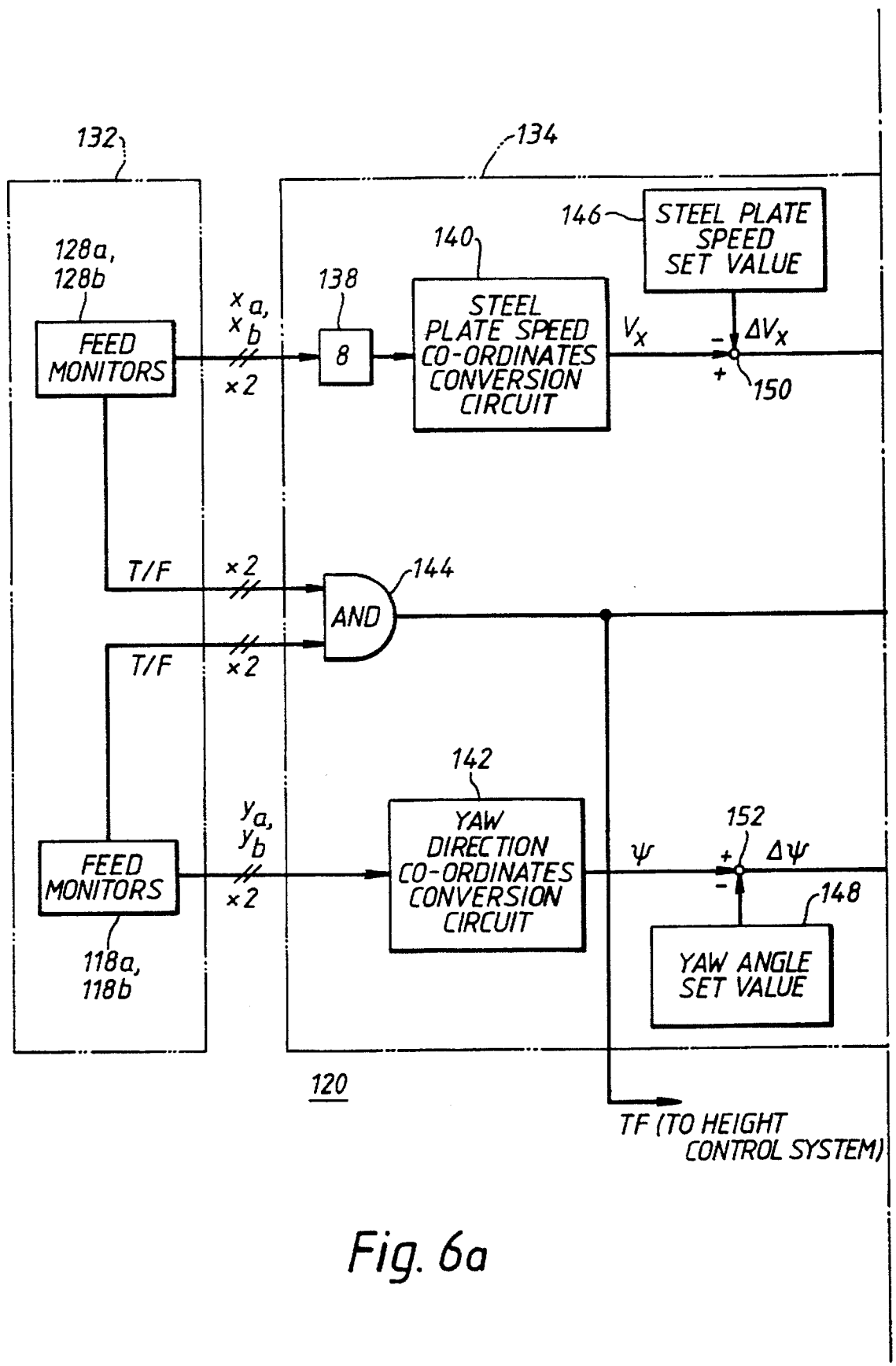
FIG. 6 is a block diagram of the thrust control system in the above system.
Figure 6B:
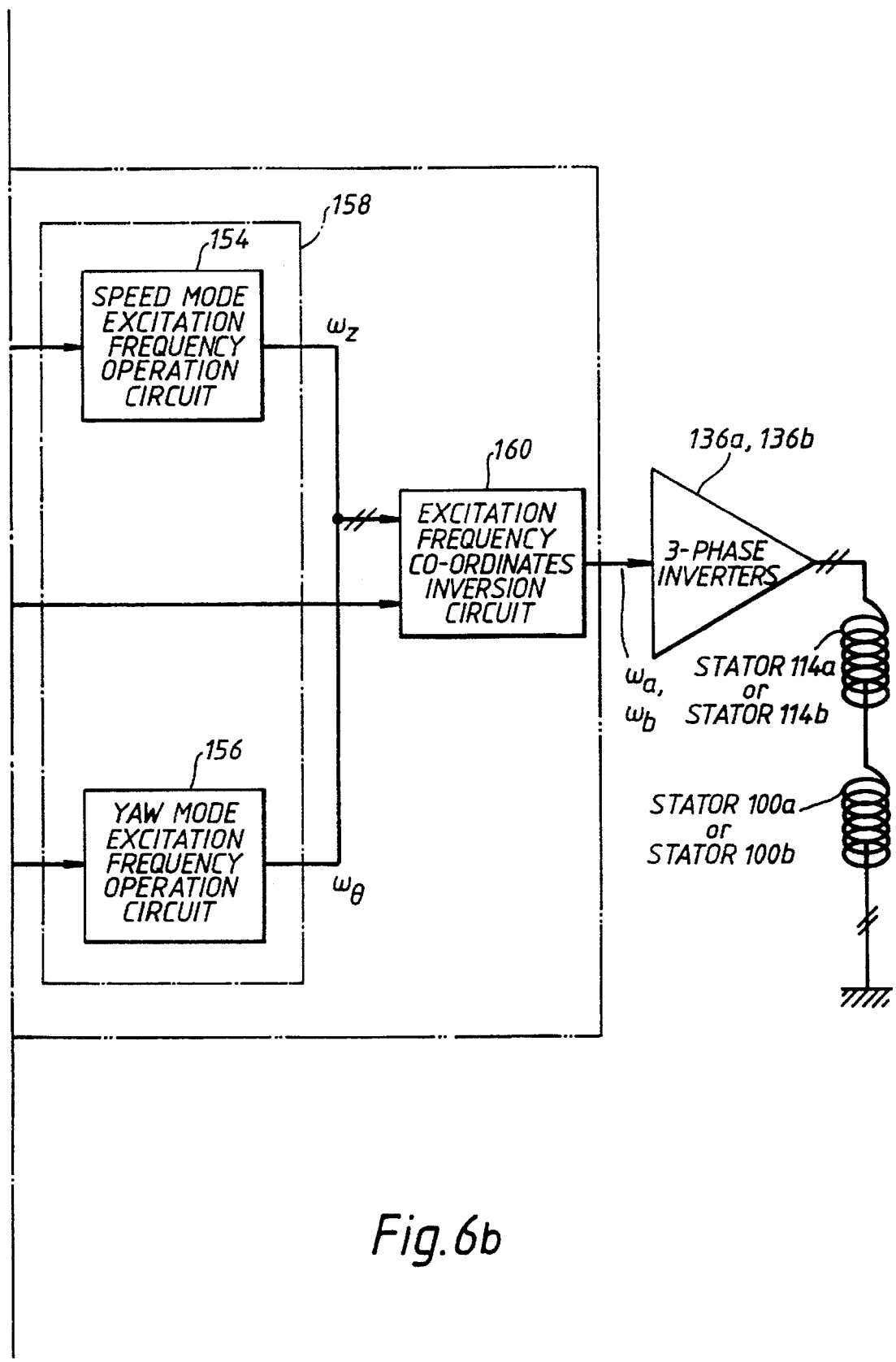

The following is a description of propulsion control system 120 with reference to the block diagram shown in FIG. 6. Propulsion control system 120 is composed of thrust sensor unit 132 which is composed of feed monitors 118a and 118b which detect and output travel amounts ya and yb orthogonal to the track of steel plate X which is below stators 114a and 114b, and, at the same time, output steel plate X presence detection signal TF and feed monitors 128a and 128b which detect and output travel amounts xa and xb along the track of steel plate X which is below them, and, at the same time, output steel plate X presence detection signal TF;

thrust operation device 134, which takes as its inputs outputs xa, xb, ya and yb and the four TF of thrust sensor unit 132, for calculating excitation frequency $\omega a$ for exciting stator 100a and stator 114a and excitation frequency $\omega b$ for exciting stator 100b and stator 114b, based on these;

3-phase inverter 136a which is connected to a 3-phase power source (not illustrated) and excites stator 100a and stator 114a based on output $\omega a$ of thrust operation device 134 and 3-phase inverter 136b which similarly excites stator 100b and stator 114b.

With this embodiment, inverters 136a and 136b are the excitation devices. Also, stator 100a and stator 114a, stator 100b and stator 114b are connected so that the travelling magnetic fields shown in FIG. 7 are generated between stators which face each other.

Thrust operation device 134 is composed of differentiator 138 for calculating the respective travel speeds from outputs xa and xb of thrust sensor unit 132;

steel plate speed coordinates conversion circuit 140 for obtaining travel speed vx of the center of gravity of the part of steel plate X which is overlapped by propulsion unit 5 from speeds va and vb of differentiator 138;

yaw direction coordinates conversion circuit 142 for obtaining angle of yaw $\phi$ about the center of gravity of the part of steel plate X which is overlapped by propulsion unit 5 from outputs ya and yb of thrust sensor unit 132;

AND circuit 144 which calculates the AND of the four steel plate X presence detection signals TF;

steel plate speed setter 146 which outputs a predetermined value set by, for instance, a main computer;

yaw angle setter 148 which operates in a similar way to setter 146;

subtractor 150 which subtracts the set value of steel plate speed setter 146 from output vx of steel plate speed coordinates conversion circuit 140, and outputs speed deviation Δvx;

subtractor 152 which subtracts the set value of yaw angle setter 148 from output φ of yaw direction coordinates conversion circuit 142, and outputs yaw angle deviation Δφ;

excitation frequency operation circuit 158 which is made up of speed mode excitation frequency operation circuit 154 which calculates excitation frequency ωz of inverters 136a and 136b which is related to the travel speed of the center of gravity of the part of steel plate X overlapped by propulsion unit 5 and is based on output Δvx of subtractor 150 and yaw mode excitation frequency operation circuit 156 which calculates excitation frequency ωθ of inverters 136a and 136b which is related to the yawing about the center of gravity of the part of steel plate X which is overlapped by propulsion unit 5 and excitation frequency coordinates inversion circuit 160 which takes as inputs outputs ωz and ωθ of excitation frequency operation circuit 158 together with detection signal TF of AND circuit 144, and, when steel plate X is present below stators 114a and 114b, calculates excitation frequency ωa of inverter 136a which excites stator 100a and stator 114a, and, at the same time, in the same case, calculates excitation frequency ωb which excites stator 100b and stator 114b.

Height control system 122 is divided into four blocks of the same composition which separately control the individual heights of the four stators 100a, 100b, 114a and 114b.

Figure 8:
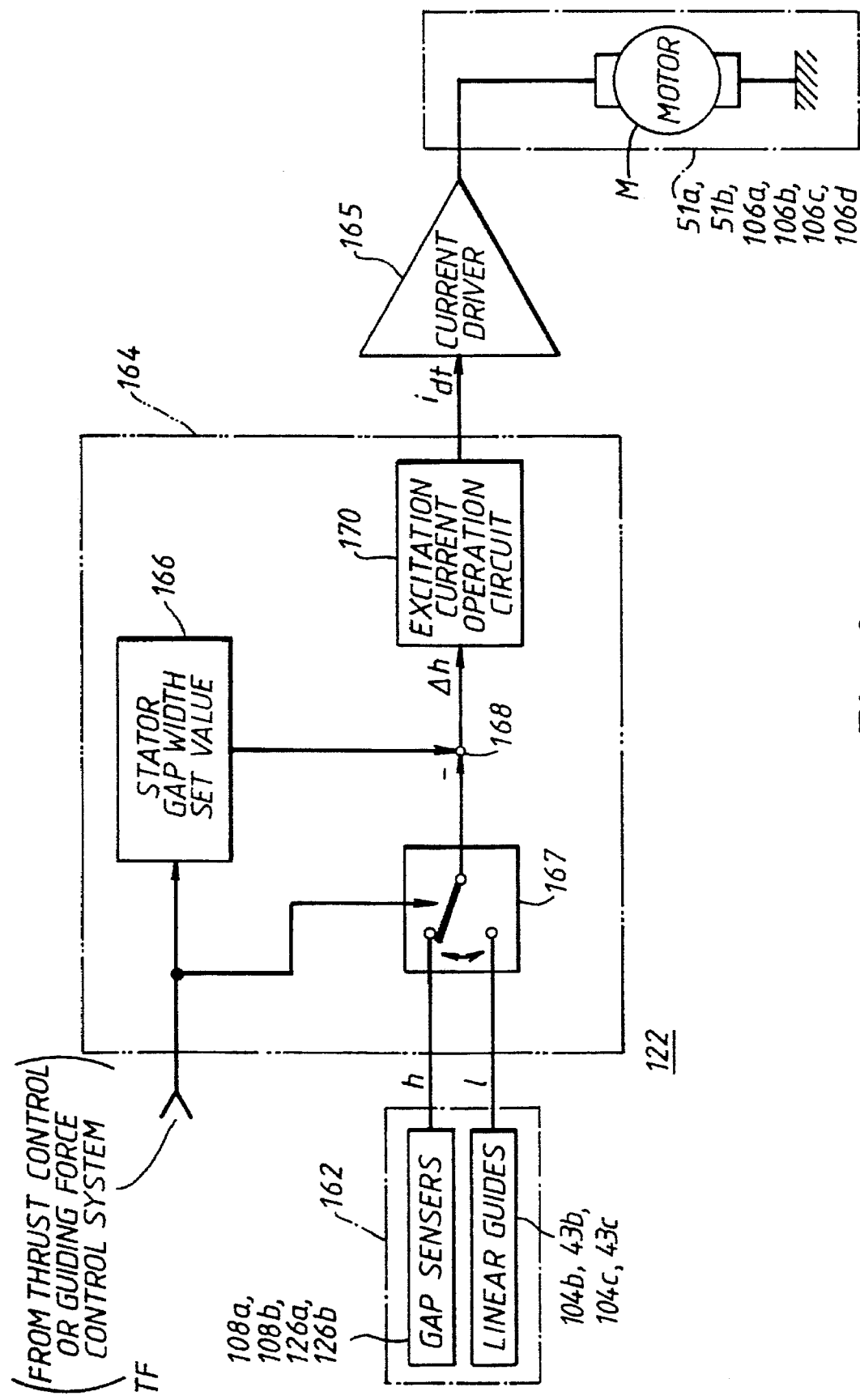
FIG. 8 is a block diagram of the height control system for propulsion in the above system.

The composition of one block of height control system 122 is shown in FIG. 8.

One of the blocks of height control system 122 is composed of height adjustment sensor unit 162, which is composed of gap sensors 126a or 126b, or gap sensors 108a or 108b and linear guide 43b or 43c, or linear guide 104b or 104c and which outputs output value h of gap sensors 108a or 108b, or of gap sensors 126a or 126b and, at the same time, outputs output value I of linear guide 104b or 104c or linear guide 43b or 43c;

height adjustment operation unit 164 which takes, as its inputs output signals h and I of height adjustment sensor unit 162 and steel plate X detection signal TF obtained from propulsion control system 120, and calculates motor driving current idt of actuators 51a and 51b or actuators 106a and 106b for maintaining the respective gaps between steel plate X and stators 100a and 100b or stators 114a and 114b at the predetermined values and current driver 165, which is connected to a power source (not illustrated) and which drives motors M of actuators 51a and 51b or actuators 106a, 106b, 106c and 106d based on output idt of height adjustment operation unit 164.

Height adjustment operation unit 164 is composed of stator gap width setter 166 which selectively outputs multiple predetermined set values which are set by, for instance a main computer, based on steel plate detection signal TF from propulsion control system 120;

changeover switch 167 which takes as inputs output h of gap sensors 108a and 108b, output I of linear guides 43b and 104b and steel plate detection signal TF, and outputs h when steel plate X is present below stators 114a and 114b and outputs I when that is not the case;

subtractor 168 which subtracts the output of stator gap width setter 166 from the output of changeover switch 167 and excitation current operation circuit 170 which calculates motor drive current idt of actuators 51a and 51b for maintaining the gap width between the stators and steel plate X at the predetermined value from output Ah of subtractor 168.

Figure 9:
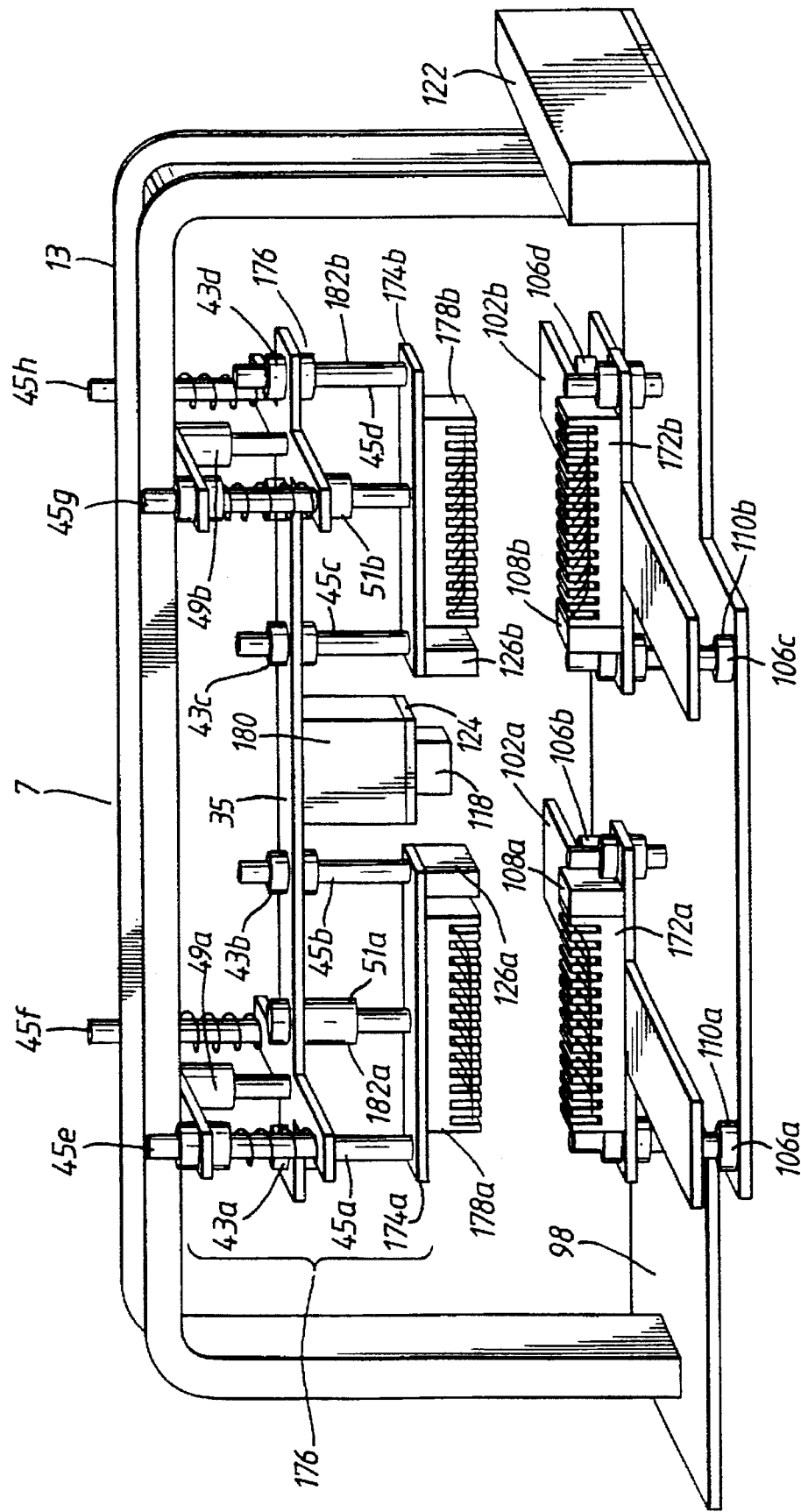
FIG. 9 is an oblique view of the essential parts of a guidance unit in the above system.

Guidance unit 7 is composed as shown in FIG. 9. In the description of the structural parts used in this drawing, those parts which are the same as some of the structural components in the drawings described above have been given the same symbols and their descriptions have been omitted.

In guidance unit 7, linear induction motor stators 172a and 172b, as the guidance devices, are respectively mounted on the upper surfaces of respective substrates 102a and 102b of height adjustment mechanisms 110a and 110b. Gap sensors 108a and 108b, which are structural components of height control system 122 shown in FIG. 8, are secured on the inner side surfaces close to stators 172a and 172b and on the upper surfaces of substrates 102a and 102b. Also, mounting device 176 is composed by the provision of two plate-shaped substrates 174a and 174b, actuators 51a and 51b and linear guides 43a, 43b, 43c and 43d and rods 45a, 45b, 45c and 45d which pass through them, beneath baseplate 35.

Here, in mounting device 176, the damping factor of dampers 49 is infinity, and they are secured between baseplate 35 and track frame 13.

Moreover, as the guidance device, linear induction motor stators 178a and 178b are mounted on the lower surfaces of substrates 174 so that they respectively face stators 172a and 172b in order to impart a guiding force to steel plate X without contact. Feed monitor 118, for detecting the presence of steel plate X and its lateral travel amounts without contact, is mounted on the underside of the central part of baseplate 35, which is a structural component of mounting device 176, via guiding force control system 180 and seat 124.

At the same time, gap sensors 126a and 126b, which detect the gap widths between steel plate X and stators 178a and 178b are mounted on the undersides of the inner ends of substrates 174a and 174b. That is to say, height adjustment mechanisms 182a and 182b, which adjust the respective heights of stators 178a and 178b, are each composed of two linear guides 43a, 43b and 43c, 43d which are thrust through baseplate 35 and secured; two rods 45a, 45b and 45c, 45d, which are guided by linear guides 43a, 43b and 43c, 43d so that they are free to move in the vertical direction, and actuators 51a and 51b, of which the upper parts are thrust through baseplate 35 and secured while the lower ends are secured to the upper surfaces of substrates 174a and 174b, and which are free to expand and contract.

The amounts of expansion and contraction of actuators 106a, 106b, 106c and 106d and of actuators 51a and 51b are controlled by height control system 122, which is mounted on the end part of the upper surface of base 98, for controlling the respective heights of stators 172a and 172b and stators 178a and 178b at the predetermined values. Height control system 122 is the same as that in propulsion unit 5. However, the steel plate X presence detection signal TF which is introduced to height adjustment operation unit 164 shown in FIG. 8 comes from guiding force control system 180.

Figure 10:
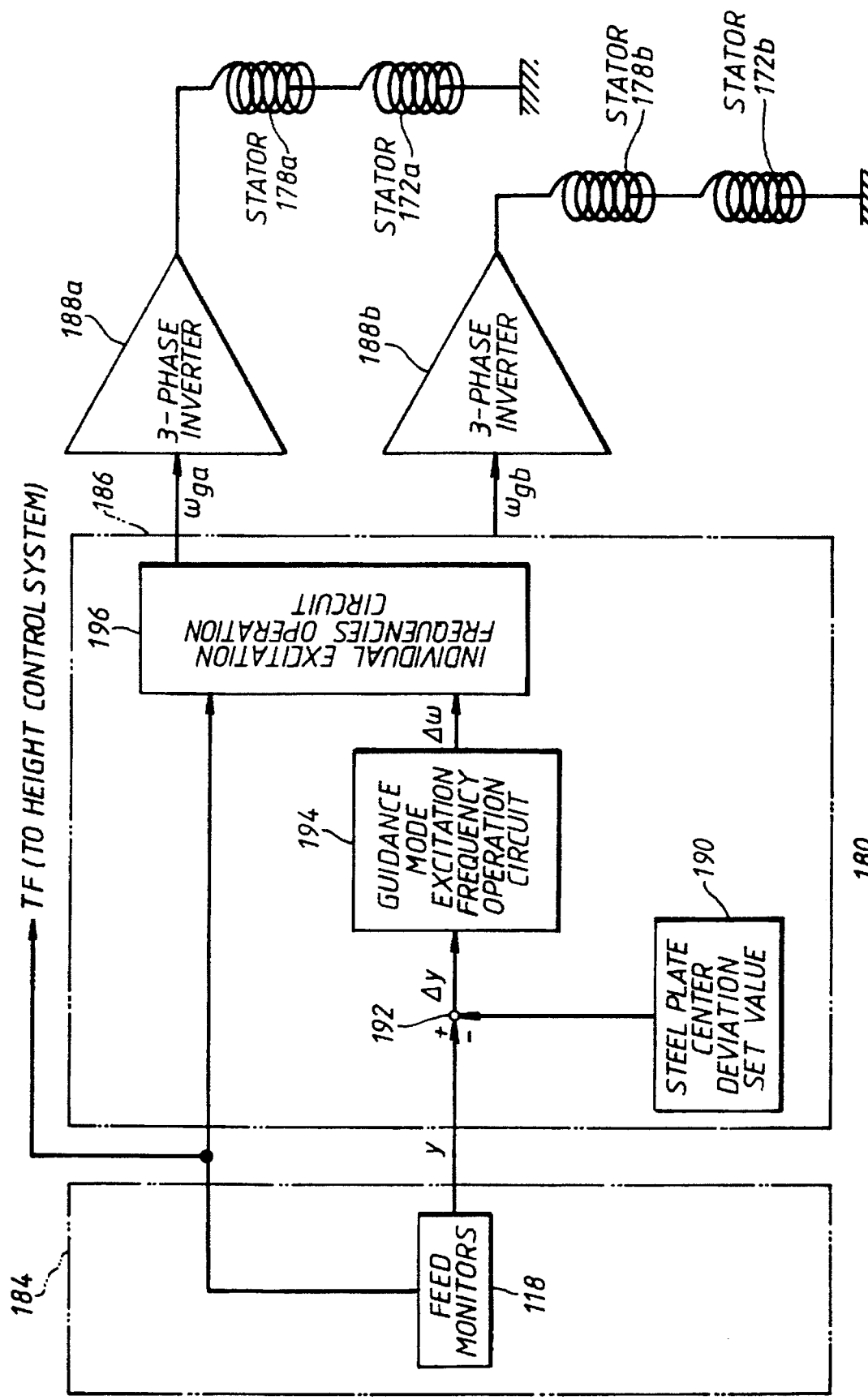
FIG. 10 is a block diagram of the guiding force control system in the above system.

FIG. 10 shows the composition of guiding force control system 180.

Guiding force control system 180 is composed of guidance detection device 184 which is composed of feed monitor 118 which detects and outputs the lateral travel amount y of steel plate X which is beneath stators 178a and 178b, and, at the same time, outputs steel plate X presence detection signal TF;

guiding force operation device 186 which takes as inputs y and TF outputted from guidance detection device 184 in order to calculate excitation frequency ωga for exciting stator 172a and stator 178a and excitation frequency ωgb for exciting stator 172b and stator 178b based on these inputs;

3-phase inverter 188a which is connected to a 3-phase power source (not illustrated) and which excites stator 172a and stator 178a based on output ωga of guiding force operation device 186 and 3-phase inverter 188b which similarly excites stator 172b and stator 178b based on output ωgb of guiding force operation device 186.

With this embodiment, inverters 188a and 188b are the excitation devices. Also, stator 172a and stator 178a, stator 172b and stator 178b are connected so that the travelling magnetic fields shown in FIG. 7 are generated between stators which face each other. At the same time, the directions of the travelling magnetic fields between stator 172a and stator 178a and between stator 172b and stator 178b are in the opposite direction to each other so that they are facing each other.

Guiding force operating device 186 is composed of steel plate center deviation setter 190, which outputs a specified setting value set by, for instance, a main computer;

subtractor 192, which subtracts the set value of steel plate center deviation setter 190 from output y of guidance detection device 184 to calculate positional deviation Δy of the part of steel plate X which is overlapped by guidance unit 7;

guide mode excitation frequency operation circuit 194 which calculates the incremental/decremental excitation frequency Δω of excitation frequency ωga of inverter 188a and of excitation frequency ωgb of inverter 188b, which are concerned in the guidance of the part of steel plate X which is overlapped by guidance unit 7, based on output Δy of subtractor 192 and individual excitation frequency operation circuit 196, which takes as its inputs output Δω of guide mode excitation frequency operation circuit 194 and steel plate X presence detection signal TF, and calculates excitation frequency ωga of inverter 188a which excites stator 172a and stator 178a when steel plate X is present beneath stators 178a and 178b and, at the same time, calculates excitation frequency ωgb of inverter 188b which excites stator 172b and stator 178b in the same case.

In individual excitation frequency operation circuit 196, ωga=ω−Δω, ωgb=ω+Δω are calculated for a standard frequency ω, which is set at a predetermined magnitude.

The following is a description of the operation of the track mounting type magnetic levitation transport system concerned in the embodiment composed as described above.

Here, the description uses FIG. 11 for the case when the track mounting type magnetic levitation transport system concerned in this embodiment is set up along a transport route from the vicinity of the roller exit of a cold rolling mill.

In FIG. 11, 197 is the rollers of the cold rolling mill. In each support unit 3, when steel plate X is not beneath magnetic support units 15, steel plate detection circuit 78 detects that there is no steel plate because the output values of gap sensors 37a–37d are large. Thus, since the fact that there is no steel plate is transmitted to control voltage coordinates inversion circuit 86 by detection signal TF, zero is outputted in place of excitation voltages ea and eb, and no levitation control is performed. At this time, detection signal TF is also transmitted to height control system 53. For this reason, zero is selected by changeover switch 92 and, at the same time, a value to make the expansion of linear guides 43 smaller than the set value when steel plate X is present is selected in substrate height setter 88.

The sum of the outputs ha and hb of linear guides 43a and 43b expresses the height of substrate 39, and the set value of substrate height setter 88 is subtracted from the sum of ha and hb in operator 90. Then, when substrate 39 is not at the predetermined value, output Δzbs of operator 90 is introduced to excitation current operation circuit 96 of height control system 53, and ida is operated so that Δzbs converges to zero, and the motors of actuators 51 are driven by current driver 67. By this means, substrate 39 is set in a higher position than when steel plate X is present.

When substrate 39 is set in a higher position in this way, even if steel plate X arrives by levitation at that support unit 3, not only does steel plate X not make contact with magnetic support units 15, but also a sufficient gap width between magnetic support units 15 and steel plate X can be ensured. Neither is steel plate X adsorbed by the attraction of permanent magnets 21.

In each propulsion unit 5 and each guidance unit 7 of height control system 122 also, the fact that steel plate X is not present is transmitted to stator gap width setter 166 and changeover switch 167 by detection signal TF. By this means, a smaller value than when steel plate X is present is selected in stator gap width setter 166, while output 1 of linear guides 43 and 104 is selected in changeover switch 167. Then, in the case when 1 is not the same as the set value, ah is introduced to excitation current operation circuit 170, and idt is operated so that Δh converges to zero and the motors of actuators 51 and 106 are driven by current driver 165. By this means, stators 114a, 114b, 178a and 178b are set higher, and also stators 100a, 100b, 172a and 172b are set lower, than when steel plate X is present. Thus, even if steel plate X arrives by levitation at the relevant unit propulsion component 5 or unit guidance component 7, no stator makes contact with steel plate X.

Also, since the fact that steel plate X is not present is also transmitted by detection signal TF to excitation frequency coordinates inversion circuit 160 of thrust control system 120 and to individual excitation frequency operation circuit 196 of guiding force control system 180, zero is outputted in place of their outputs ωa, ωb and ωga, ωgb. Thus, there is no excitation of the stators.

When steel plate X arrives beneath magnetic support units 15 of support unit 3, since the output values of gap sensors 37a–37d are smaller than the specified value, steel plate detection circuit 78 detects that a steel plate is present. Then, the fact that steel plate X has arrived beneath magnetic support units 15 of unit support component 3 is transmitted by detection signal TF to substrate height setter 88 and changeover switch 92 of height control system 53. Then, the set value for when steel plate X is present is selected in substrate height setter 88.

With operator 90, the set value of substrate height setter 88 is subtracted from the sum of outputs ha and hb of linear guides 43a and 43b to output Δzbs. When there is no set value for substrate 39, the output of changeover switch 92, which selects zero, and $\Delta$zbs are added by adder 94. Thus, the output of adder 94 and $\Delta$zbs are introduced to excitation current operation circuit 96.

In excitation current operation circuit 96, ida is operated so that $\Delta$zbs converges to zero, and the motors of actuators 51 are driven by current driver 67. By this means, substrate 39 is set at the set height when steel plate X is present. At this time, output $\Delta$zbs of operator 90 is introduced to vertical motion mode control voltage operation circuit 82 of attraction control device 19. At the same time, steel plate detection signal TF of steel plate detection circuit 78 is transmitted to control voltage coordinates inversion circuit 86. After substrate 39 has been set to the set height, that is to say after predetermined time t1 from receiving detection signal TF, excitation voltages ea and eb are outputted to commence levitation control.

In levitation control, the output values za, zb, zc and zd of gap sensors 37a~37d are subtracted from the output of levitation gap width setter 70 by subtractors 74a~74d. These subtraction results are introduced to levitation gap deviation coordinates conversion circuit 80, and deviation $\Delta$z from the predetermined position of the center of gravity coordinates of the part of steel plate X which is overlapped by support unit 3 and roll angle $\Delta\theta$ of that part of steel plate X are calculated. Then, excitation current measured values ia and ib of electromagnets 27 detected by current detectors 55a and 55b are subtracted from the zero output of current setter 72 by subtractors 76a and 76b. These subtraction results are introduced to excitation current deviation coordinates conversion circuit 81, and coil excitation current $\Delta$iz, which contributes to the vertical motion of the center of gravity of the part of steel plate X which is overlapped by support unit 3, and coil excitation current $\Delta i\theta$, which contributes to the rolling of that part of steel plate X, are calculated.

Out of $\Delta$z, $\Delta\theta$, $\Delta$iz and $\Delta i\theta$, $\Delta$z and $\Delta$iz are introduced to vertical motion mode control voltage operation circuit 82, together with output $\Delta$zbs of operator 90. Here, coil excitation voltage ez, which contributes to the vertical motion of the center of gravity of the part of steel plate X overlapping unit support component 3, is calculated. When ez is calculated, $\Delta$iz converges to zero in the stationary levitation state of steel plate X, that is to say, zero power control is performed.

At the same time, $\Delta\theta$ and $\Delta i\theta$ are introduced to roll mode control voltage operation circuit 83, and coil excitation voltage e$\theta$, which contributes to the rolling of the same part of steel plate X, is calculated. When e$\theta$ is calculated also, $\Delta i\theta$ converges to zero in the stationary levitation state of steel plate X, in other words zero power control is performed.

Outputs ez and e$\theta$ of control voltage operation circuit 84 are introduced to control voltage coordinates inversion circuit 86, and excitation voltages ea and eb for respective electromagnets 27 are calculated. By this levitation control, ia and ib in the stationary levitation state of steel plate X converge to zero, in other words, zero power control is achieved as a whole.

In this way, if levitation control which contributes to the vertical motion of the center of gravity of the part of steel plate X overlapped by support unit 3 and levitation control which contributes to the rolling of the same part of steel plate X are performed in every mode, it is possible to design levitation control systems in the respective modes. Therefore, robust levitation control can be performed for variations of weight per unit length of steel plate X and for variations of material and thickness.

Also, during the time for levitation control to get into the stationary levitation state, the weight of steel plate X is loaded on coil springs 47 and dampers 49. Thus, even if output ha of linear guide 43a fluctuates, height control will be performed in height control system 53 to maintain substrate 39 at the set height. At the same time, since the fluctuation of $\Delta$zbs which height control causes is introduced to vertical motion mode control voltage operation circuit 82, stable levitation control can be achieved.

Furthermore, if steel plate X is stably levitated by zero power control, the levitation gap width between magnetic support units 15 and steel plate X becomes a width at which the attraction of permanent magnets 21 balances with the load weight of steel plate X. If the levitation gap width at this time differs from the output value of levitation gap width setter 70, $\Delta$z is outputted in levitation gap deviation coordinates conversion circuit 80. This output is introduced to changeover switch 92 of height control system 53. Then, after predetermined time t2 from the reception of steel plate detection signal TF of steel plate detection circuit 78 to the stable levitation of steel plate X, it is outputted from changeover switch 92. By this means, ($\Delta$zbs+$\Delta$z) is outputted by adder 94 of height control system 53. Therefore, substrate 39 shifts to a position which is only $\Delta$z higher than the specified height.

In this way, even if the weight of steel plate X which is supported by support unit 3 varies per unit length, its upper surface is always maintained at a constant height. Here, if a levitation gap width setting value which takes into consideration thickness data for steel plate X is set by the main computer, it goes without saying that it is possible always to maintain the position of the center of the thickness of steel plate X at a constant height.

Since steel plate X can be levitated at a constant height in this way, not only does dimensional compatibility with other systems become simple, but also the initial values of the gap widths between magnetic support units 15 and steel plate X when levitation control is initiated in support units 3 by the fresh arrival of steel plate X are the same for each support unit 3. Therefore, the shocks at the initiation of levitation control, applied to support units 3 which are already supporting steel plate X can be made the same. Thus, there is the advantage that control system design for the absorption of this shock by attraction control device 19 becomes simple.

After the passage of steel plate X through support unit 3 is completed, the output values of gap sensors 37a~37d become larger and therefore steel plate detection circuit 78 detects that there is no steel plate. Then, by the operation in the above-mentioned case when steel plate X is not beneath magnetic support units 15, levitation control of support unit 3 is stopped. At the same time, substrate 39 is set in a higher position than when steel plate X is present, and maintains this state until the arrival of the next steel plate.

Steel plate X which is supported without contact by support unit 3 travels by means of unit propulsion component 5. The above levitation control and height control are successively commenced by all the unit support components 3 at which steel plate X has arrived. At this time, bending in the vertical direction sometimes occurs along the direction of advance of steel plate X due to elasticity. This bending becomes a disturbance in the vertical direction in individual support unit 3. In two neighboring support units 3, it becomes pitching of the steel plate parts supported by them.

In attraction control device 19 of each support unit 3, levitation control is performed in relation to the vertical motion and the rolling of the center of gravity of steel plate X by vertical motion mode control voltage operation circuit 82 and roll mode control voltage operation circuit 83. However, if the respective spring constants and damping factors of coil springs 47 and dampers 49 of mounting device 17 are set at appropriate values, it becomes possible to accelerate the pitching convergence of the steel plate. In this embodiment, the bending of steel plate X can be effectively inhibited by accelerating the pitching convergence of the steel plate. In other words, levitation control in the pitch direction of steel plate X is performed by coil springs 47 and dampers 49 of mounting device 17. Therefore, the whole of steel plate X can be stably levitated.

Also, as shown in FIG. 11, when the rolling of steel plate X is impaired by the rollers, etc. of the cold rolling mill, output $e\theta$ of roll mode control voltage operation circuit 83 becomes zero through an appropriate device (not illustrated).

In each propulsion unit 5, when steel plate X arrives beneath stators 114a and 114b, all feed monitors 118a, 118b, 128a and 128b detect that steel plate X is present and output steel plate detection signals TF. Then, the fact that steel plate X has arrived beneath stators 114a and 114b is transmitted to stator gap width setter 166 and changeover switch 167 via AND circuit 144 of thrust control system 120.

Height adjustment mechanisms 110a, 110b, 130a and 130b which adjust the heights of each stator 100a, 100b, 114a and 114b are controlled by height control system 122 which is composed of 4 blocks each of the same composition. Therefore, the following is a description of its operation, taking height adjustment mechanism 130a as an example.

In stator gap width setter 166, when the fact that steel plate X is present is transmitted by steel plate detection signal TF, the gap width set value between stator 114a and steel plate X is selected, while output h of gap sensor 126 is selected in changeover switch 167. Then, when h is not the same as the set value, $\Delta h$ is introduced to excitation current operation circuit 170, and idt is operated so that $\Delta h$ converges to zero. Thus, the motors of actuators 51 and 106 are driven by current driver 165. By this means, the gap width between stator 114a and steel plate X can always be maintained at the set value.

The above operation is the same in height adjustment mechanisms 110a, 110b and 130b as well. Thus, the gap widths between stators 100a, 100b, 114a and 114b and steel plate X can always be maintained at the set values, independently of each other. Moreover, in guidance unit 7, when steel plate X arrives beneath stators 178a and 178b, feed monitors 118 detect that steel plate X is present and output steel plate detection signals TF. Steel plate detection signals TF are transmitted to stator gap width setter 166 and changeover switch 167 of height control system 122.

Height adjustment mechanisms 110a, 110b, 182a and 182b which adjust the heights of each stator 172a, 172b, 178a and 178b are controlled by height control system 122 which is composed of four blocks, each of the same composition. Therefore, in the same way as in the case of propulsion unit 5, the gap widths between each stator 172a, 172b, 178a and 178b and steel plate X can always be maintained at the set values, independently of each other.

If each stator in propulsion unit 5 or guidance unit 7 always maintains a constant gap width for steel plate X, even when steel plate X is deformed by twisting or bending, not only will each stator not come into contact with steel plate X, but also the thrust and guiding force contributed to steel plate X can be made to depend solely on the excitation frequency of each stator. Thus, thrust control and guiding force control become simpler.

At the same time, in propulsion unit 5, when the fact that a steel plate is present is transmitted to excitation frequency coordinates inversion circuit 160 via AND circuit 144, thrust control is commenced to maintain the speed of steel plate X at the predetermined value while damping the yawing of steel plate X. In thrust control, output values xa and xb of feed monitors 128a and 128b are differentiated by differentiator 138. Then, in steel plate speed coordinates conversion circuit 140, by operating the mean value of the differentiation results, travel speed vx of the center of gravity of the part of steel plate X overlapped by propulsion unit 5 is outputted. Subtractor 150 subtracts the output of steel plate speed setter 146, that is to say, the speed set value set by the main computer, from travel speed vx, and outputs speed deviation $\Delta vx$.

Speed deviation $\Delta vx$ is introduced to speed mode excitation frequency operation circuit 154, and excitation frequency $\omega z$ of inverters 136a and 136b concerned in the travel speed of the center of gravity of the part of steel plate X overlapped by propulsion unit 5 is outputted. Also, output values ya and yb of feed monitors 118a and 118b are introduced to yaw direction coordinates conversion circuit 142, and yaw angle $\phi$ about the center of gravity of the part of steel plate X overlapped by propulsion unit 5 is calculated.

Output $\phi$ of yaw direction coordinates conversion circuit 142 is compared with the zero output of yaw angle setter 148 by subtractor 152, and yaw angle deviation $\Delta\phi$ is outputted by subtractor 152. Yaw angle deviation $\Delta\phi$ is introduced to yaw mode excitation frequency operation circuit 156, and excitation frequency $\omega\theta$ of inverters 136a and 136b relating to yawing about the center of gravity of the part of steel plate X overlapped by propulsion unit 5 is outputted. Outputs $\omega z$ and $\omega\theta$ of excitation frequency operation circuit 158 are introduced to excitation frequency coordinates inversion circuit 160. There, excitation frequency $\omega a$ of inverter 136a which excites stator 100a and stator 114a is calculated on the basis that $\omega a=\omega z+\omega\theta/2$, while excitation frequency $\omega b$ of inverter 136b which excites stator 100b and stator 114b in the same case is calculated on the basis that $\omega b=\omega z-\omega\theta/2$.

For this reason, if the travel speed of steel plate X is less than the set value, the four stators 100a, 100b, 114a and 114b are excited so that steel plate X is accelerated, and if a yaw angle occurs, stators 110a and 114a are excited in the deceleration direction while stators 100b and 114b are excited in the acceleration direction. Thus, steel plate X travels without the occurrence of a yaw angle while maintaining the set speed.

Furthermore, in guidance unit 7, when the fact that steel plate X is present is transmitted to individual excitation frequency operation circuit 196 by feed monitors 118, guidance control of steel plate X is commenced.

In guidance control, subtractor 192 subtracts the output of steel plate center deviation setter 190, that is to say, the zero set value set by the main computer, from output value y of feed monitors 118, and outputs position deviation $\Delta y$ of the lateral direction of the part of steel plate X overlapped by guidance unit 7. Position deviation $\Delta y$ is introduced to guide mode excitation frequency operation circuit 194. There, excitation frequency incremental/decremental portion $\Delta\omega$ of excitation frequency $\omega ga$ of inverter 188a relating to the guidance of the part of steel plate X overlapped by guidance unit 7 and of excitation frequency $\omega gb$ of inverter 188b in the same case is calculated.

In individual excitation frequency operation circuit 196, excitation frequency ωga for inverter 188a and excitation frequency ωgb for inverter 188b which relate to the guidance of the part of steel plate X overlapped by guidance unit 7, based on fixed frequency ωgo preset by the main computer, are calculated on the basis that ωga=ωgo−Δω/2 and ωgb=−ωgo−Δω/2. Here, stators 172a, 172b, 178a and 178b are excited so that steel plate X receives a guiding force in the y direction of FIG. 1 if the respective values of ωga and ωgb are positive, and in the opposite direction if they are negative.

If steel plate X has not drifted in the lateral direction, Δy is zero and Δω is also zero. Therefore, stators 172a and 178a are excited by ωgo, while stators 172b and 178b are excited by −ωgo. In this case, the guiding force acting on steel plate X is cancelled and steel plate X does not drift to the left or right. If steel plate X drifts in the y direction Δy only by under an external force, the excitation in the y direction of stators 172a and 178a weakens, while the excitation in the −y direction of stators 172b and 178b strengthens. Therefore, a guiding force acts on steel plate X as a whole in the opposite direction to the y direction. Then, Δy decreases and guidance of steel plate X is achieved. In this way, steel plate X travels to its destination while levitating without contact and without leaving the track which is composed by support units 3, unit propulsion components 5 and unit guidance components 7.

In the above embodiment, mounting device 17 is composed of guide mechanisms, provided with coil springs, dampers, linear guides, etc., and height adjustment mechanisms, provided with actuators, linear guides, etc. However, this does not limit the composition of the mounting device in any way, and various modifications can be made, provided the magnetic support units have vertically moveable structures.

Figure 12:
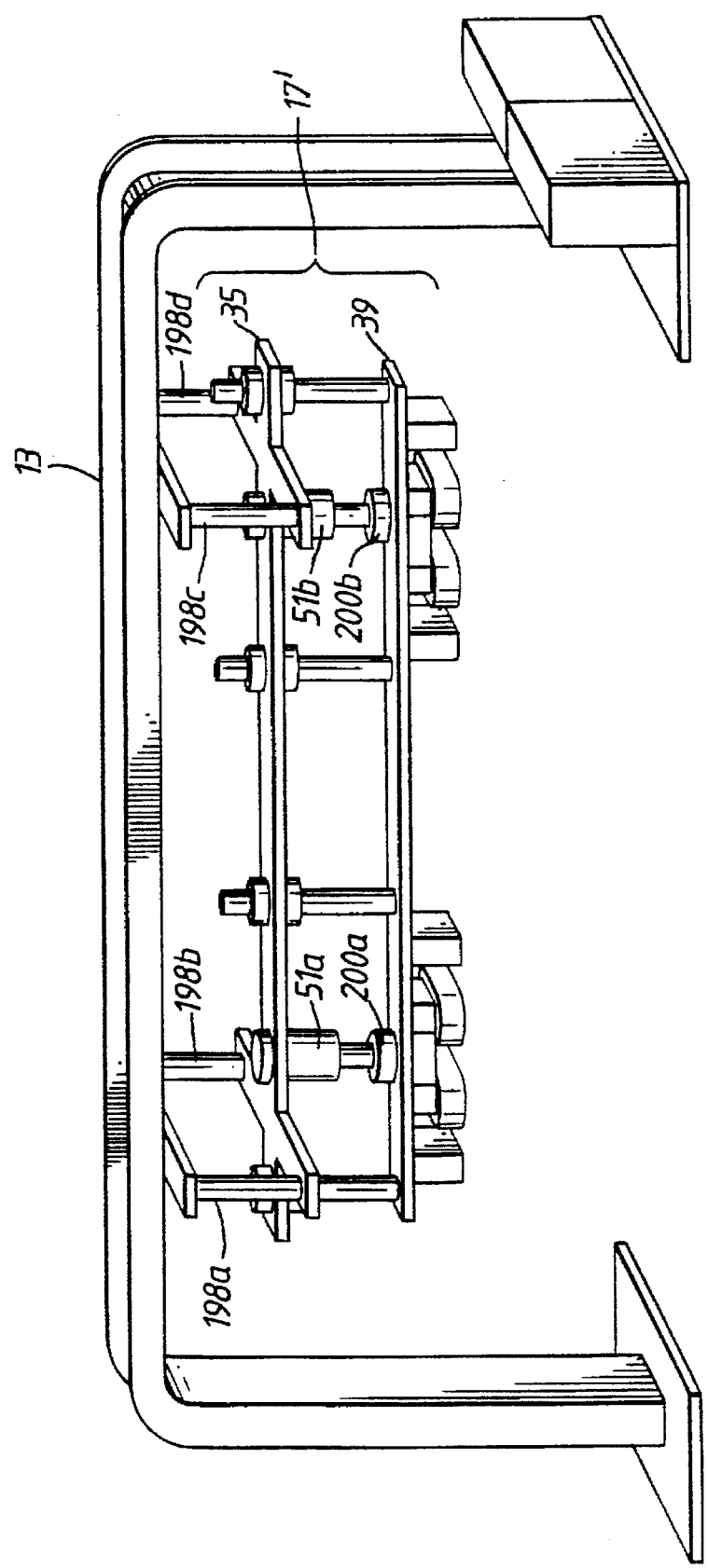
FIG. 12 is an oblique view of the essential parts in the magnetic track positioning type magnetic levitation transport system concerned in a different embodiment of this invention.

For example, as shown in FIG. 12, mounting device 17' is composed by securing baseplate 35 to track frame 13 by supports 198a, 198b, 198c and 198d, while sandwiching load cells 200a and 200b between actuators 51a and 51b and substrate 39. In this case, any force in the vertical direction applied to mounting device 17' is measured by load cells 200a and 200b. Thus, it goes without saying that, by performing height control using the outputs of load cells 200a and 200b, the same function can be achieved as in the case of using coil springs and dampers.

Figure 13:
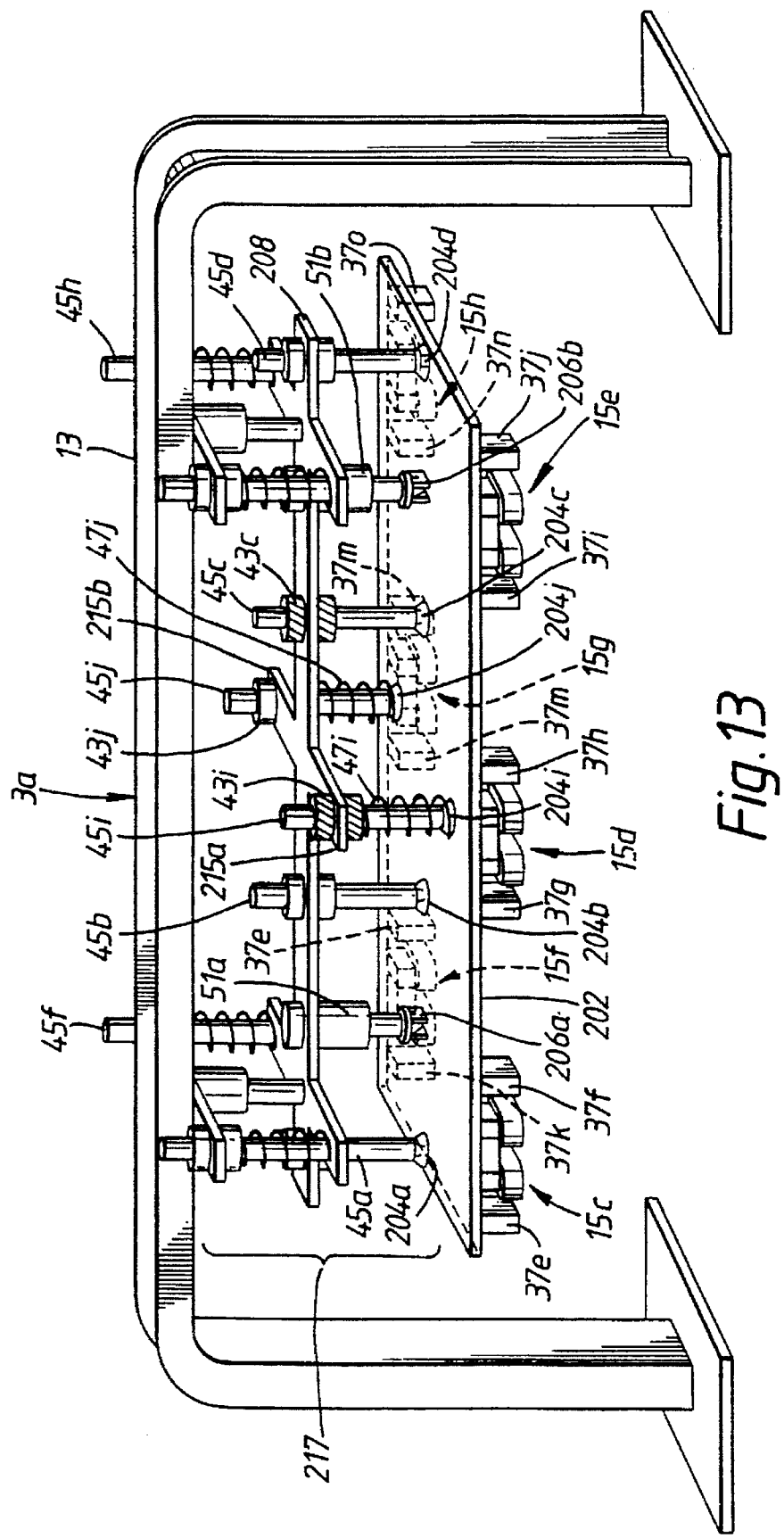
FIG. 13 is an oblique view of the essential parts in the track mounting type magnetic levitation transport system concerned in another different embodiment of this invention.

Also, in the above embodiment, two magnetic support units 15a and 15b are provided on substrate 39. However, this does not restrict the number of magnetic support units used in support unit 3 in any way. For instance, the composition may be as shown in FIG. 13.

This support unit 3a is composed by mounting device 217 having flat substrate 202 provided with six sets of magnetic support units 15c, 15d, . . . , 15h which accompany with gap sensors 37e, 37f; . . . , . . . ; 37n, 37o on their both sides. Even if steel plate X is bending, the mean levitation gap width between steel plate X and individual magnetic support units 15c, 15d, . . . can be obtained by gap sensors 37e, 37f; . . . respectively provided on both sides of magnetic support units 15c, 15d, . . . .

The lower ends of rods 45a, 45b, 45c and 45d of linear guides 43a, 43b, 43c and 43d provided between it and baseplate 208 are connected to the upper surface of substrate 202 via universal joints 204a, 204b, 204c and 204d. Also, the lower ends of actuators 51a and 51b provided between it and baseplate 208 are connected to the upper surface of substrate 202 via links 206a and 206b which are capable of rotating in a plane parallel to the direction of advance of steel plate X. Baseplate 208 is provided with extensions 215a and 215b at its central part, apart from those at both ends. The following are provided at the two ends of central extensions 215a and 215b of baseplate 208:

linear guides 43i and 43j which are secured by thrusting through baseplate 208; rods 45i and 45j, provided with universal joints 204i and 204j at their lower ends and coil springs 47i and 47j, the lower ends of which are secured to substrate 202. Rods 45i 45j have a flexible proper structure to absorb mechanical dimensional errer.

Using this composition, substrate 202 is rotatable in the pitch direction, while detection of pitch angle and the amount of vertical travel is possible by the two linear guides 43i and 43c. Substrate 202 has no freedom in the vertical direction and the roll direction due to the action of links 206. Therefore, by adapting zero power control, such as disclosed in Patent Application No. Heisei 4-351167 in the Japan Laid-Open Patents Gazette for instance, it is possible to support steel plate X without contact by using multiple support units 3a, while causing substrate 202 to follow the bending of steel plate X. In this case, needless to say, in the stationary levitation state, the coil currents of all magnetic support units 15c, 15d, . . . , 15h converge to zero.

When multiple magnets are provided in unit support components in this way, the load weight borne by each magnetic support unit becomes small. Therefore, the levitation gap width between the magnetic support unit and steel plate X can be made larger. Also, when substrate 202 is made to follow the bending of steel plate X, the support torque in the pitch direction acting on steel plate X becomes smaller. Thus, the deformation of steel plate X during levitation transport can be inhibited.

In unit support component 3a, in the case when rods 45a, . . . and actuators 51a, . . . are secured to substrate 202 in place of universal joints 204a, . . . and links 206a, . . . , substrate 202 cannot be made to follow the bending of the steel plate. However, levitation control related to the pitching of substrate 202 is not required and so, needless to say, the system composition becomes simple.

Moreover, in the above embodiment, unit support components are composed by mounting magnetic support units in inverse U-shaped track frames 13, and control is performed only of the vertical motion and rolling of the steel plate center of gravity, using steel plate X as the object to be transported. However, there is no restriction of any kind on the shape of the track frames, the mounting of the magnetic support units, the objects to be transported or the levitation control methods which are combinations of vertical motion and rolling control of the center of gravity of the object to be transported. Various modifications are possible.

For instance, there is no objection to arranging multiple support units provided with propulsion devices along the transport route, and causing the levitation and travel of the body to be levitated using an H-shaped cross-section provided with ferromagnetic bodies which are attracted to magnetic support units on both left and right sides of the support unit.

As a practical example, it may be track mounting type magnetic levitation transport system 1b, such as shown in FIG. 14a. In track mounting type magnetic levitation transport system 1b, the track is formed of multiple U-shaped track frames 13b of support units 3b arranged along the transport route. Magnetic support units 15 and stators 114a and 114b are mounted via mounting devices 17a, 17b, 112a and 112b by securing seats 31 to the inside side surfaces of the left and right extensions of the upper part of track frame 13b.

Mounting devices 17a, 17b, 112a and 112b are composed by providing two baseplates 35a and 35b formed by dividing baseplates 35 of mounting devices 17 and 112 into two sections at their centers. Moreover, in mounting devices 17a and 17b, two substrates 39a and 39b are provided, formed by dividing substrate 39 into two sections at its center. Stators 100a and 100b are positioned on the upper surface of the bottom of track frame 13b via height adjustment mechanisms 110a and 110b. Mounting devices 112a and 112b and height adjustment mechanisms 110a and 110b have the same positional relationships as in propulsion unit 5, and the same height control is performed for each stator. Moreover, feed monitors 118a and 118b are arranged in positions at the front and rear ends of stators 100a and 100b which are provided on the upper surface of the bottom of track frame 13b.

For linear guides 43a and 43b, two each are mounted on seats 31 of mounting devices 17a and 17b and mounting devices 112a and 112b, and mounted on baseplates 35a and 35b. Other than this, gap sensors 37, gap sensors 108, gap sensors 126 and each sensor of feed monitors 128a and 128b are arranged in the same way as in the cases of support units 3 and propulsion units 5.

At the same time, as shown in the essential part cross-section of FIG. 14b, levitated body 216, as the object to be transported, is composed by securing flat plate-shaped load bearer 210 and soleplate 212 via supporting plate 214. Soleplate 212 is composed of flat plate 218 made of aluminum which is an electrically conductive, non-magnetic body. The soleplate is composed with ferromagnetic bodies, for instance iron strip-shaped flat plates 220, recessed into the soleplate 212 in positions at which the flat plates 220 will respectively face stators 100a and 100b (positions of the left and right sides of supporting plate 214). Also, left and right strip-shaped plates 220 are positioned to face magnetic support units 15 as well, so that they generate levitating forces and guiding forces.

In this embodiment, thrust control is the same as in propulsion unit 5. However, for levitation control, so-to-speak, combination control for levitation and guidance is performed, therefore, rolling and lateral motion are stabilized by levitation control for the rolling interacting on the lateral motion of the center of gravity of levitated body 216. Vertical motion of the center of gravity is stabilized in the same way as in support unit 3. Moreover, stabilization of the yawing of levitated body 216 is realized by imparting thrusts differently to the left and right portions of levitated body 216 using stators 100a, 100b, 114a and 114b in the same way as in propulsion unit 5. When the fore to aft length of soleplate 212 is determined so that it straddles at least three pairs of magnetic support units 15, four support points is ensured even in the worst case. Accordingly, the pitching of levitated body 216 is stabilized by determining the spring constants and damping factors of coil springs 47 and dampers 49 of mounting devices 17a and 17b at appropriate values.

Figure 15A:
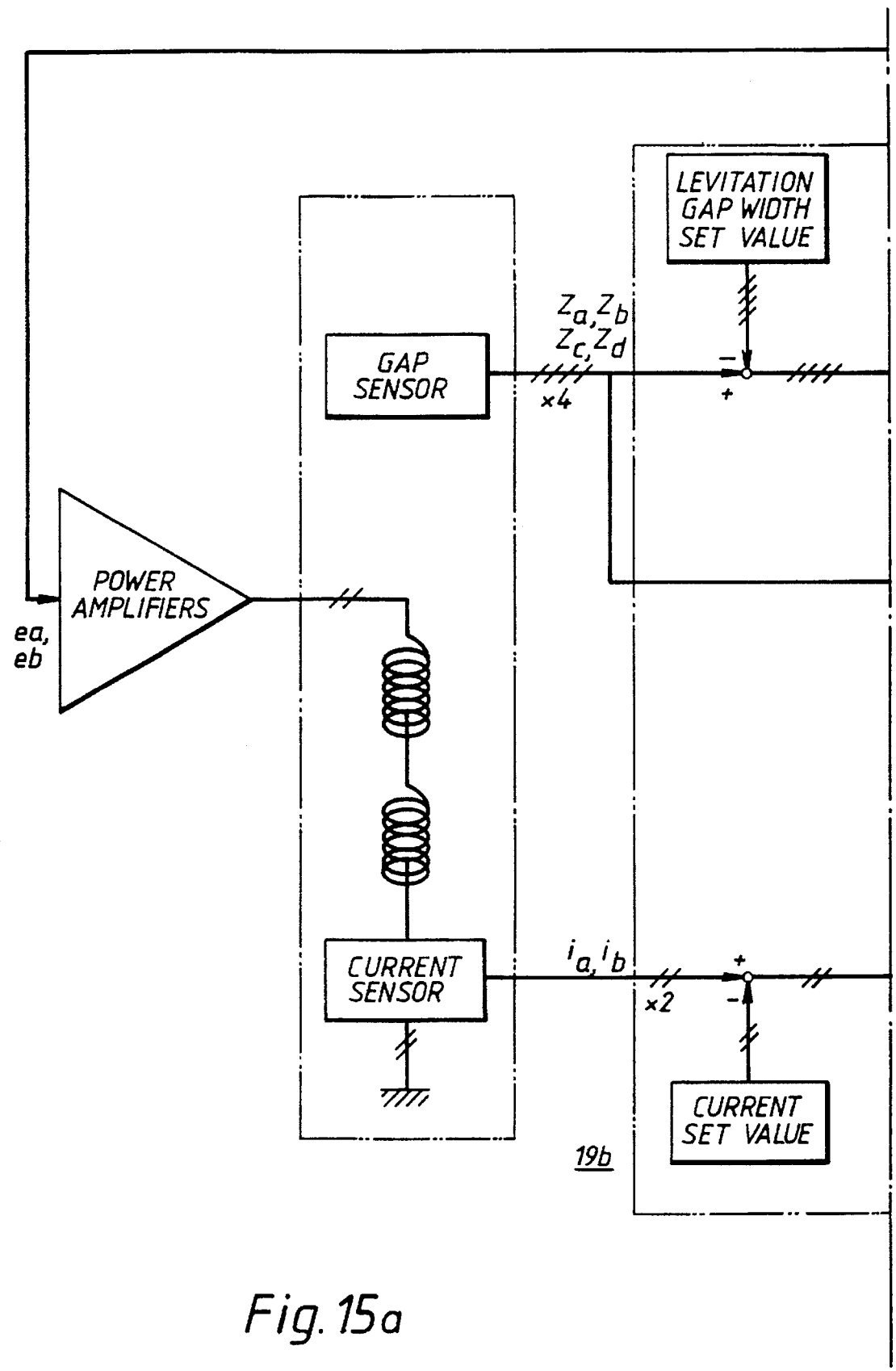
FIG. 15 is a block diagram of the control system in the above system.
Figure 15B:
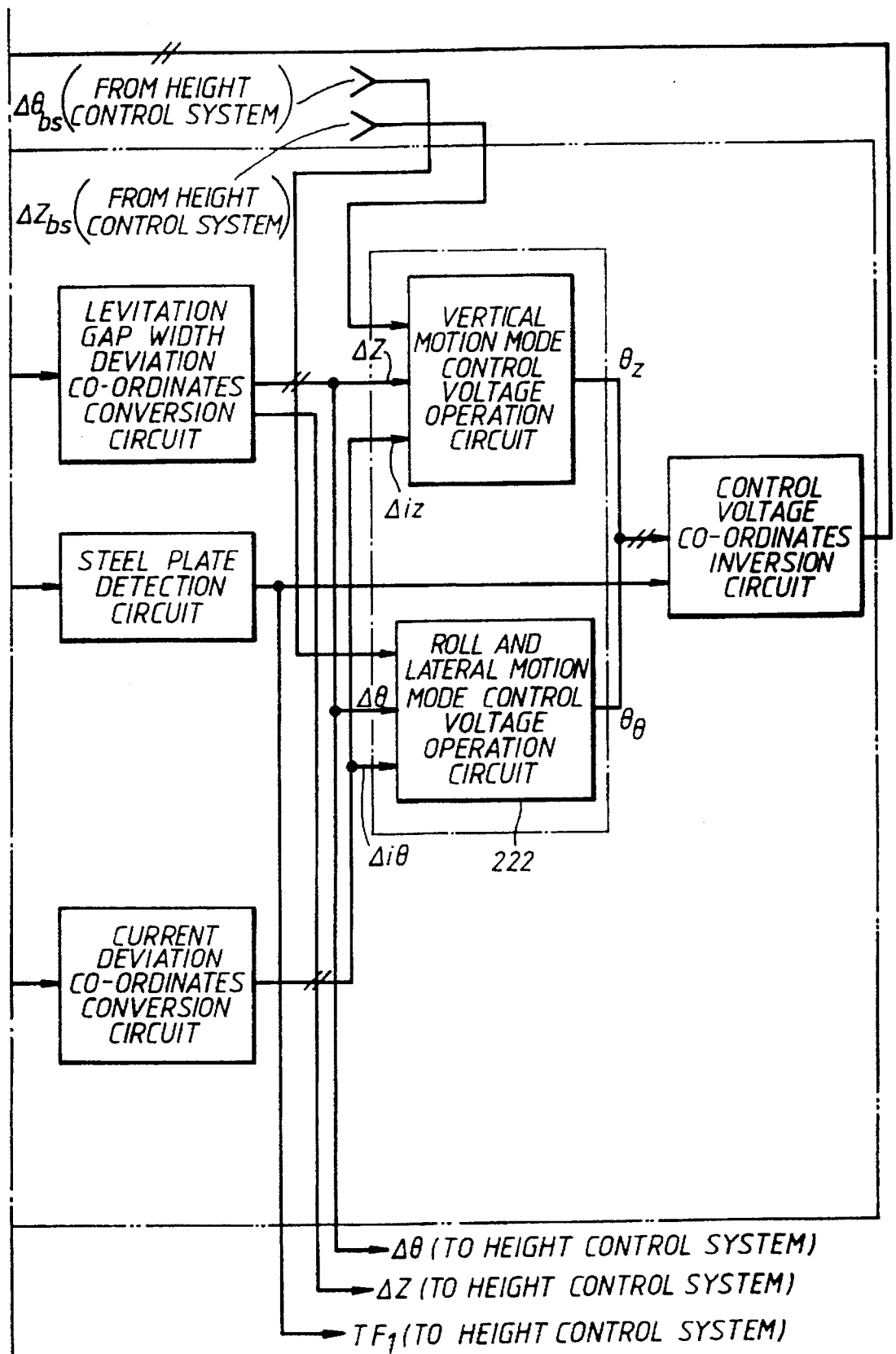
Figure 16A:
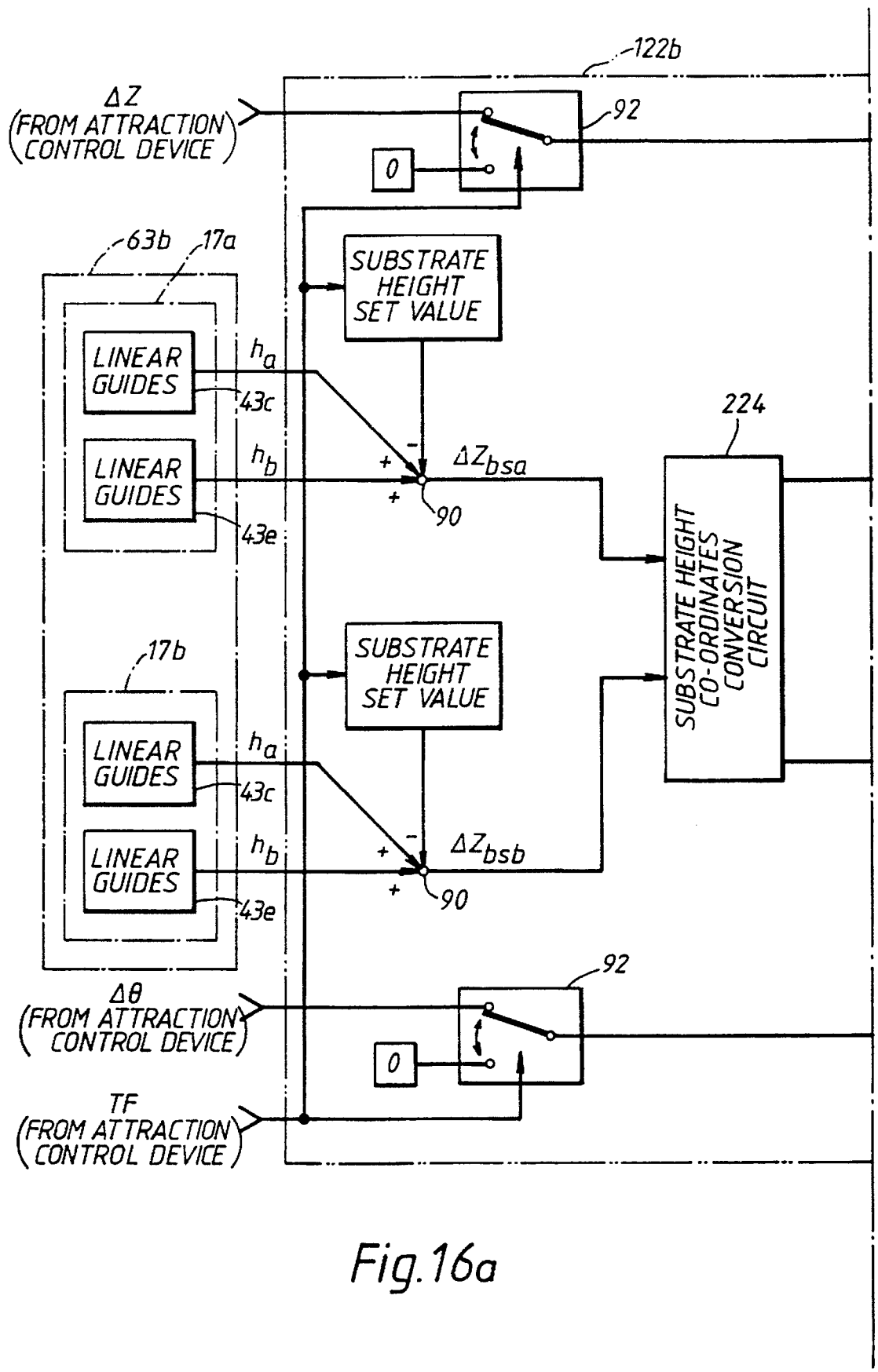
FIG. 16 is a block diagram of another control system in the above system.
Figure 16B:
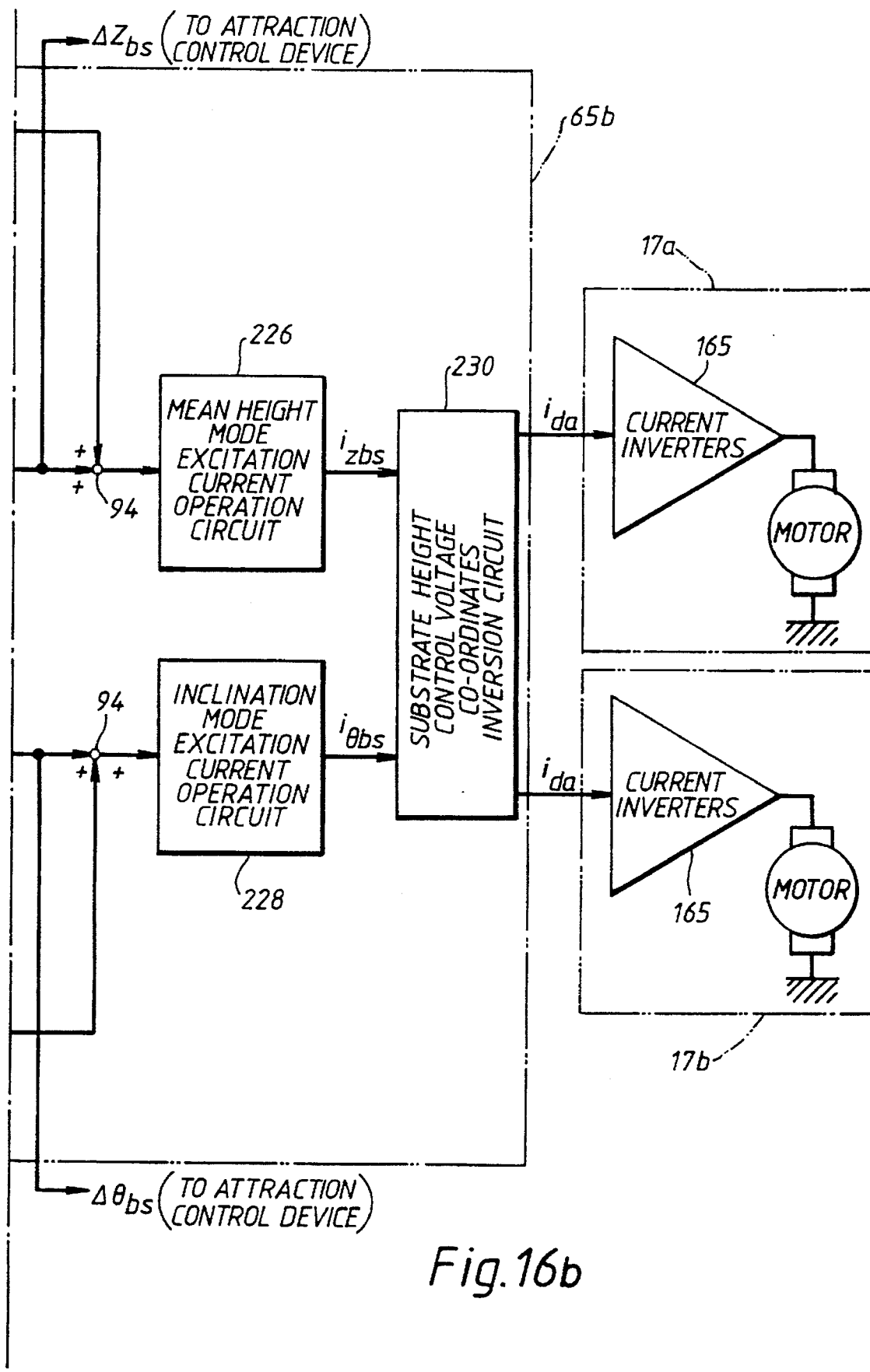

Also, height control is performed in the same way as in support units 3 for left and right magnetic support units 15 as well. FIG. 15 shows a control block diagram for attraction control device 19b related to this embodiment. FIG. 16 shows a control block diagram for height control system 122b, also related to this embodiment.

In attraction control device 19b of FIG. 15, roll and lateral motion modes control voltage operation circuit 222, for combination control for levitation and guidance is provided in place of roll mode control voltage operation circuit 83 shown in FIG. 3 mentioned above. In roll and lateral motion modes control voltage operation circuit 222 for combination control for levitation and guidance, inclination angle ΔθSbs of substrates 39a and 39b of mounting devices 17a and 17b are introduced from height control system 122b, and is used for roll control of levitated body 216.

In height control system 122b of FIG. 16, height adjustment sensor unit 63b is composed of linear guides, 43c and 43e of mounting device 17a and linear guides 43c and 43e of mounting device 17b. Their outputs are introduced to height adjustment operation unit 65b, and deviations Δzbsa and Δzbsb of the respective heights of substrates 39a and 39b from the substrate height setting values of mounting devices 17a and 17b are calculated. Deviations Δzbsa and Δzbsb are introduced to substrate height coordinates conversion circuit 224, and mean deviation Δzbs and inclination angle Δθbs are outputted from substrate height coordinates conversion circuit 224.

At the same time, levitation height deviation Δz and levitation roll angle Δθ of levitated body 216 relative to magnetic support units 15 are introduced to height adjustment operation unit 65b from attraction control device 19b. These are added to mean deviation Δzbs and inclination angle Δθbs by two adders 94 via two changeover switches 92. The respective outputs of the two adders 94 are introduced to mean height mode excitation current operation circuit 226 and inclination mode excitation current operation circuit 228, and mode excitation currents izbs and iθbs for actuators 51 in the respective modes are calculated. Outputs izbs and iθbs of mean height mode excitation current operation circuit 226 and inclination mode excitation current operation circuit 228 are introduced to substrate height control current coordinates inversion circuit 230, and motor excitation currents ida of the respective actuators 51 of mounting devices 17a and 17b are calculated. By this means, in track mounting type magnetic levitation transport system 1b also, it is possible to maintain the height of soleplate 212 of levitated body 216 constant, as in track mounting type magnetic levitation transport system 1.

In this type of transport system, there is the advantage that the composition of the levitated body is extremely simple. Also, guidance control for lateral motion of the levitated body is made through levitation control for rolling of the levitated body by combination control for levitation and guidance. Thus, there is the advantage that there is no requirement to provide an additional guidance device and therefore the composition of the track is simple.

Furthermore, in the embodiments described above, the control systems and their operations are expressed analogically. However. they are not limited to this type of control method, and digital methods may also be adopted. Also, a unit composition which integrates several support units and guidance units or propulsion units may be used. Moreover, the system of this invention can be used in an entire painting process line, including the final drying process. In this way, this invention can be implemented in various modifications within limits which do not deviate from its purport.

When using the track mounting type magnetic levitation transport system of the embodiment of this invention as described above, levitation control for perpendicular motion and levitation control for rolling of the object to be transported is performed at every support unit. Moreover, it is also possible to inhibit pitching of the object to be transported between supporting units by the magnetic support units being capable of vertical movement due to the mounting devices. For this reason, even if, not only the total lengths of the objects to be transported, but also the total widths of the objects to be transported are varied, stable levitation can be performed by inhibiting the vertical motions and the rolling of the objects to be transported at every support unit. Also, stabilization can be achieved by inhibiting the pitching of the objects to be transported using the mounting devices. Therefore, the whole of an object to be transported can be supported without contact.

Furthermore, even if the weights and inertial moments of objects to be transported differ, this type of difference is distributed among the support units. Therefore, it is possible for a track mounting type magnetic levitation transport system formed as a collection of individual support units to support objects to be transported with a wider range of weights and inertial moments without contact. Also, it is possible to support multiple objects to be transported without contact on a single track. Furthermore, a track mounting type magnetic levitation transport system can also respond smoothly to the shapes of objects to be transported.

The following is a description of another embodiment of this invention with reference to the drawings.

FIG. 17 shows one of support units 303 which form the track laid along the transport route of the track mounting type magnetic levitation transport system related to another embodiment of this invention. Structural components which are the same as structural components of the embodiment previously described are described by giving them the same symbols.

Support unit 303 is composed of inverse U-shaped track frame 13, both ends of which are secured to bases 11;

magnetic support units 15a and 15b which cause magnetic attraction to act on steel plate X in order to support steel plate X, which is the object to be transported, at the left and right side portions of it independently and without contact;

mounting device 17 which is provided between track frame 13 and magnetic support units 15a and 15b for mounting magnetic support units 15 on track frame 13 and attraction control device 19 which causes steel plate X to be supported without contact by controlling the attraction of magnetic support units 15a and 15b mounted in support unit 303.

Magnetic support unit 15a is for independently supporting the right side portion of steel plate X in the direction of travel without contact. It is composed by sandwiching permanent magnet 21a by two electromagnets 27a and 27b which are made up of coils 23a and 23b and iron cores 25a and 25b. These two coils 23a and 23b are connected in series so that their magnetic fluxes are reinforced each other by the same excitation current. On the other hand, magnetic support unit 15b is for independently supporting the left side portion of steel plate X in the direction of travel without contact. It is composed by sandwiching permanent magnet 21b by two electromagnets 27c and 27d which are made up of coils 23c and 23d and iron cores 25c and 25d. These two coils 23c and 23d are connected in series so that their magnetic fluxes are reinforced each other by the same excitation current.

Mounting device 17 is composed of two seats 31a and 31b which are each secured by welding to the under surface of the top of track frame 13 with a predetermined span between them; baseplate 35, on the center of the lower side of which feed monitor 327 for detecting the presence and amount of left/right travel of steel plate X without contact is mounted via height control system 329 and seat 331 and, at the same time, which is guided so that it is permitted to move only in the vertical direction via guide mechanisms 33a and 33b;

substrates 339a and 339b, on the underside of which are provided gap sensors 37a, . . . , arranged on either side of each magnetic support unit 15a and 15b for measuring the gap widths between magnetic support units 15a and 15b, which are part of attraction control device 19, and steel plate X, together with magnetic support units 15a and 15b and height adjustment mechanisms 341a and 341b which are secured to the upper faces of substrates 339a and 339b and adjust the respective heights of substrates 339a and 339b by varying the distances between baseplate 35 and substrates 339a and 339b.

Zero is outputted from feed monitor 327 when it is detected that steel plate X is not present. When the presence of steel plate X is detected, the amount of travel is outputted from the time of detection, taking the initial value as zero.

Since guide mechanisms 33a and 33b have the same constructions as in the previously described embodiment, their descriptions have been omitted. Linear guides 43b, 43c and 43e have the additional purpose of travel distance meters for rods 45b and 45c.

Also, height adjustment mechanisms 341a and 341b are composed of four linear guides 43a, 43b, 43c and 43d which are thrust through base plate 35 and secured; four rods 45a, 45b, 45c and 45d of which the lower ends are secured to substrates 339a and 339b, and the upper ends are guided by linear guides 43a, 43b, 43c and 43d so that they are free to move in the vertical direction and actuators 351a and 351b which are free to expand and contract, of which the tops are thrust through baseplate 35 and secured, and the lower ends are secured to the respective upper faces of substrates 339a and 339b.

The expansion and contraction of actuator 351a is controlled by height control system 329 in order to control the height of substrate 339a at a predetermined value. Similarly, the expansion and contraction of actuator 351b is controlled by height control system 329 in order to control the height of substrate 339b to a predetermined value. The mean heights and angle of inclination of substrates 339a and 339b are controlled based on these expansions and contractions. In this embodiment, height adjustment mechanisms 341a and 341b have the two purposes of inclination device and height adjustment device for steel plate X.

Attraction control device 19 has the same composition as the attraction control device shown in FIG. 3 of the previous embodiment. Its description has therefore been omitted.

Figure 18A:
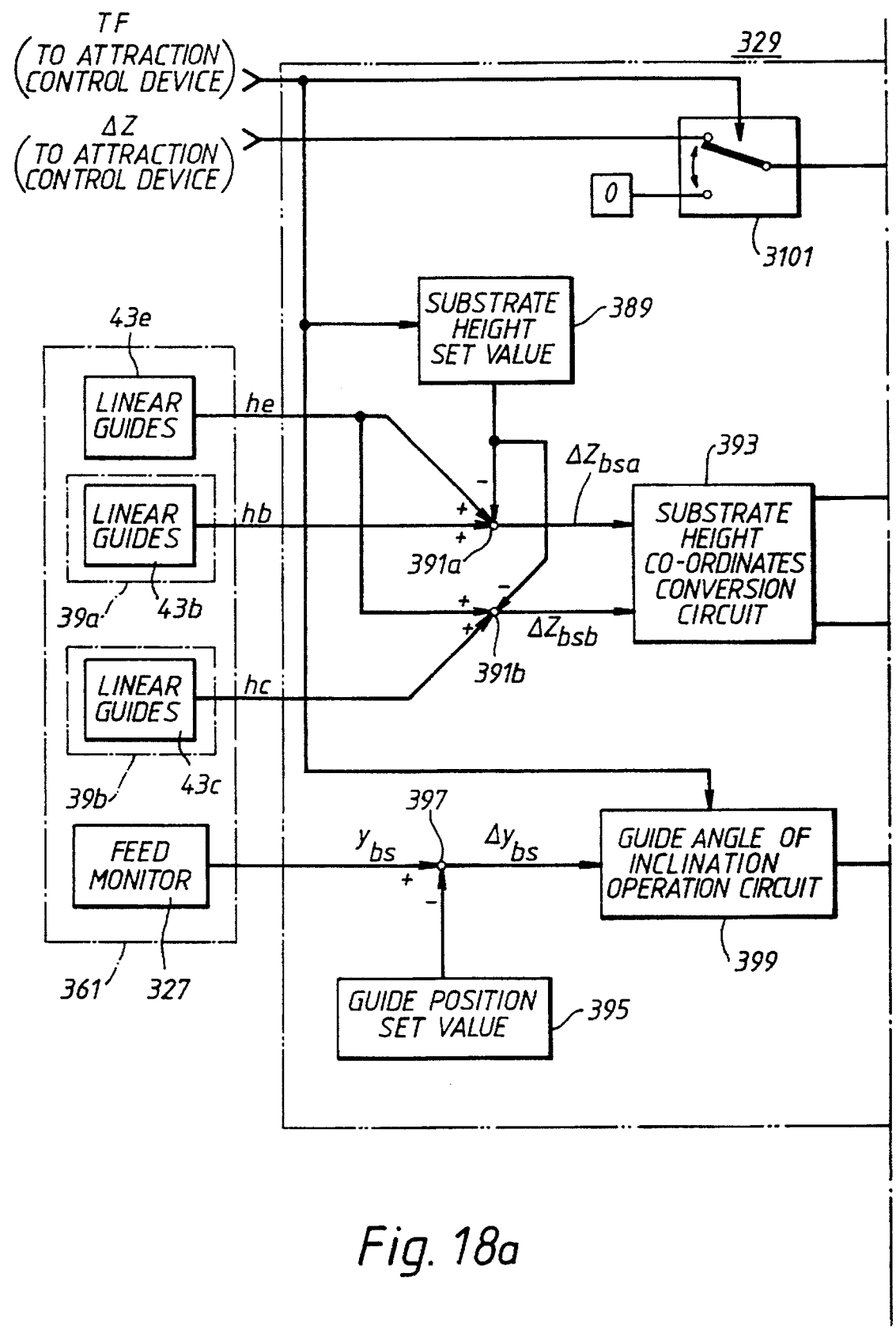
FIG. 18 is a block diagram of the height control system used in the above transport system.
Figure 18B:
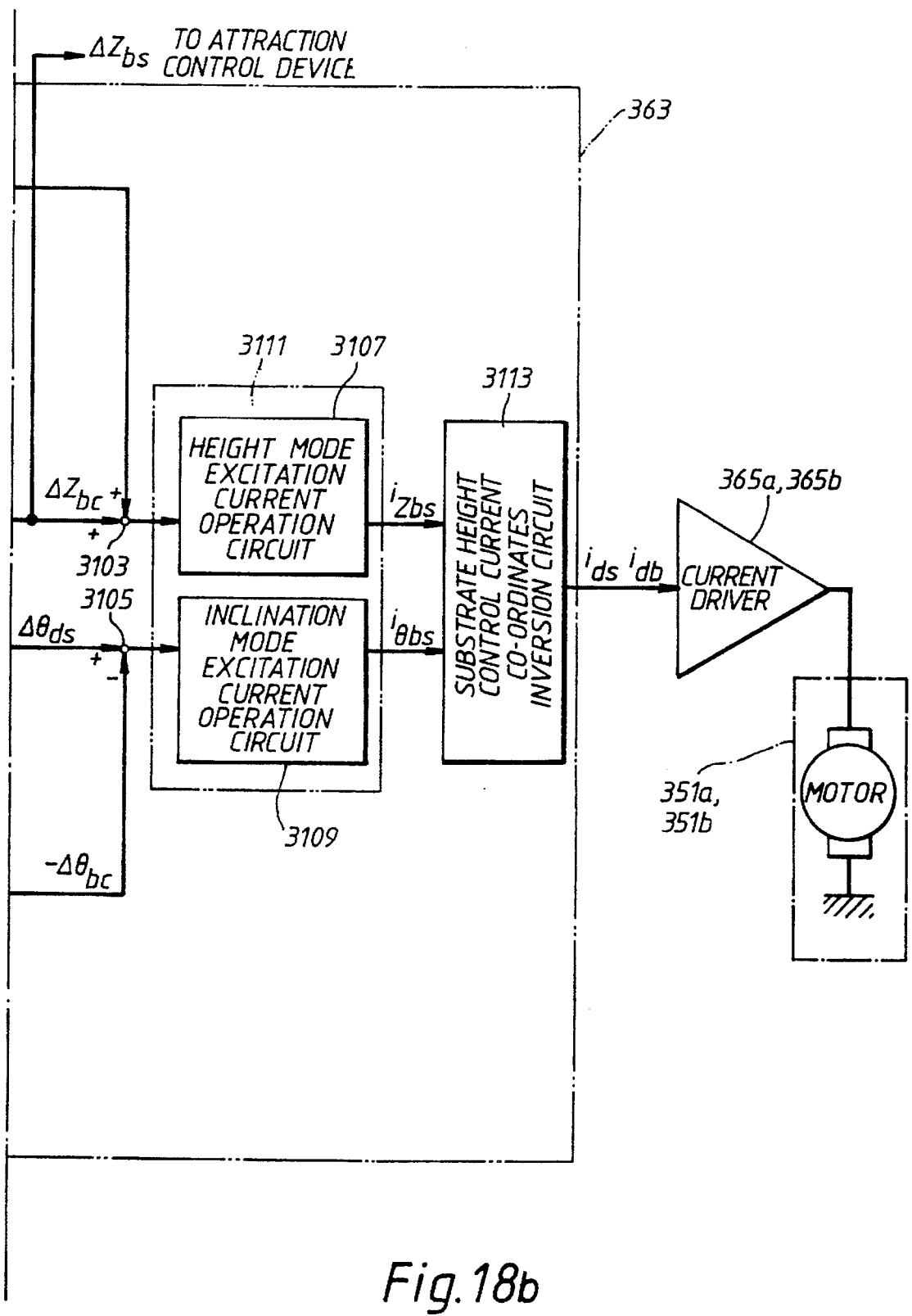

As shown in FIG. 18, height control system 329 is composed by height adjustment sensor unit 361 which is composed of linear guides 43b, 43c, and 43e and feed monitor 327;

height adjustment operation unit 363, which takes as its inputs the output signals of height adjustment sensor unit 361, displacement signal Δz from the predetermined setting value of the levitation gap width and steel plate X detection signal TF obtained from attraction control device 19, and maintains the height of steel plate X during levitation at the predetermined value and, at the same time, when fluctuation occurs in the lateral position of steel plate X, calculates motor driving currents ida and idb of the respective actuators 351a and 351b of substrates 339a and 339b to guide steel plate X by adjusting the angles of inclination made by substrates 339a and 339b and current drivers 365a and 365b which are connected to a power source (not illustrated) and which drive the motors of actuators 351a and 351b based on outputs ida and idb of height adjustment operation unit 363.

In this way, height control system 329 has the two purposes of a height control device, which controls the height of steel plate X at a constant level, and an inclination angle control device, which controls the inclination of steel plate X.

Height control operation unit 363 is composed of substrate height setter 389 which selectively outputs multiple predetermined set values, which are set for instance by the main computer, based on steel plate detection signal TF from attraction control device 19;

operator 391a for subtracting the substrate height set value from the sum of output values he and hb of linear guide 43e and linear guide 43b which belongs to substrate 339a;

operator 391b for subtracting the substrate height set value from the sum of output values he and hc of linear guide 43e and linear guide 43c which belongs to substrate 339b;

substrate height coordinates conversion circuit 393 which takes, as it inputs outputs $\Delta zbsa$ and $\Delta zbsb$ of operators 391a and 391b, and outputs mean deviation $\Delta zbs$ obtained by averaging the deviations from the predetermined set values for the respective heights of substrates 339a and 339b and the angles of inclination $\Delta\theta$ which are made by substrates 339a and 339b;

guide position setter 395 which outputs a set value relating to the guide position of steel plate X which is set by radio from the main computer (not illustrated);

subtractor 397 for subtracting the output value of guide position setter 395 from output value ybs of feed monitor 327;

guide angle of inclination operation circuit 399 which takes output $\Delta ybs$ of subtractor 397 as its input, calculates angles of inclination $-\Delta\theta bc$ made by substrates 339a and 339b, for guiding steel plate X in the lateral direction, based on this value, and outputs 0 when steel plate detection signal TF is 'NO' and outputs $-\Delta\theta bc$ in predetermined time t2 after TF changes from 'NO' to 'YES';

changeover switch 3101 which takes as its inputs deviation $\Delta z$ and steel plate detection signal TF from attraction control device 19, and outputs $\Delta z$ when steel plate X is levitated beneath magnetic support units 15 and outputs 0 when that is not the case;

adder 3102 which adds output $\Delta zbs$ of substrate height coordinates conversion circuit 393 and the output of changeover switch 3101; subtractor 3105 which subtracts output $-\Delta\theta bc$ of guide angle of inclination operation circuit 399 from output $\Delta\theta bs$ of substrate height coordinates conversion circuit 393;

excitation current operation circuit 3111 composed of height mode excitation current operation circuit 3107 which calculates motor driving current izbs for actuators 351a and 351b related to the mean height of substrates 339a and 339b from the output of adder 3103 and angle of inclination mode excitation current operation circuit 3109 which calculates motor driving current i$\theta$bs for actuators 351a and 351b related to the inclination made by substrates 339a and 339b from the output of subtractor 3105 and substrate height control current coordinates inversion circuit 3113 which takes, as its inputs, izbs and i$\theta$bs of excitation current operation circuit 3111, and outputs control current values ida and idb which control the expansion and contraction of respective actuators 351a and 351b of substrates 339a and 339b.

In changeover switch 3101, when steel plate detection signal TF changes from 'NO' to 'YES' switching from 0 to $\Delta z$ is performed after specified time t2.

The following is a description of the operation of the track mounting type magnetic levitation transport system related to the 'other' embodiment composed as described above.

Here, FIG. 19 shows the state when the track mounting type magnetic levitation transport system concerned in this embodiment is laid along a transport route, taking, as its starting point, the vicinity of the roller exit of a cold rolling mill. The track mounting type magnetic levitation transport system has a composition in which the transport path is formed by positioning the support units 303 concerned in this embodiment two by two between multiple propulsion units 5 which were illustrated by FIG. 5. Three support units 303 are positioned at the exit of rollers 3191 of the cold rolling mill. In each unit support component 303, when steel plate X is not present beneath magnetic support units 15, no levitation control is performed, as in support units 303 shown by the symbol A. When steel plate X comes beneath magnetic support units 15, levitation control is performed by attracting the steel plate by lowering magnetic support units 15, as in support units 303 shown by the symbol B. In the same way, with propulsion units 5 also, when steel plate X is not present between stators 100 and 114 of the linear induction motors, no propulsion control is performed, as in propulsion units 5 shown by the symbol C. When steel plate X comes between stators 100 and 114, propulsion control of the steel plate is performed by operating so that stator 100 rises and stator 114 falls, and so that they approach steel plate X, as in propulsion units 5 shown by the symbol D.

Next, when describing the operation of this embodiment in practical terms by referring to FIG. 3, FIG. 18, etc., in each support unit 303, when steel plate X is not present beneath magnetic support units 15, steel plate detection circuit 78 detects that steel plate X is not present since the output values of gap sensors 37a, . . . , 37d, are large. Then, the fact that steel plate X is not present is transmitted to control voltage coordinates inversion circuit 86 by detection signal TF. Then, since zero is outputted instead of excitation voltages ea and eb, no levitation control is performed.

Since detection signal TF is also transmitted to height control system 329 at this time, zero is selected by changeover switch 3101 and, at the same time, a smaller value than the set value when steel plate X is present is selected in substrate height setter 389.

The sum of outputs he and hb of linear guides 43e and 43b (43c) expresses the height of substrates 339a (339b). The set value of substrate height setter 389 is subtracted from the sum of he and hb in operators 391a and 391b. Then, when heights of substrates 339a and 339b are not at the predetermined value outputs $\Delta zbsa$ and $\Delta zbsb$ of operators 391a and 391b are introduced to substrate height coordinates conversion circuit 393 of height control system 329.

Also, since steel plate X is not present underneath, the output of feed monitor 327 becomes zero. At the same time, since detection signal TF which indicates that there is no steel plate X is transmitted from attraction control device 19, the output of guide angle of inclination operation circuit 399 also becomes zero.

In substrate height coordinates conversion circuit 393, the mean height and inclination of substrates 339a and 339b are calculated based on $\Delta zbsa$ and $\Delta zbsb$, and $\Delta zbs$ and $\Delta\theta bs$ are outputted.

In excitation current operation circuit 3111, ida and idb are operated so that $\Delta zbs$ and $\Delta\theta bs$ converge to zero, and the motors of actuators 351a and 351b are driven by current drivers 365a and 365b. By this means, substrates 339a and 339b are set in a higher position than when steel plate X is present, while maintaining a horizontal positional relationship. When substrates 339a and 339b are set at the high position (shown by symbol A in FIG. 19) in this way, even if steel plate X arrives under levitation at that support unit 303, not only will steel plate X not come into contact with magnetic support units 15, but also a sufficient gap can be ensured between magnetic support units 15 and steel plate X. Therefore, steel plate X will not be adsorbed by the attraction of permanent magnets 21a and 21b either.

The operation of propulsion units 5 is the same as described and shown in FIG. 5 and FIG. 6 of the previous embodiment.

When steel plate X arrives beneath magnetic support units 15 of support unit 303, the output values of gap sensors 37a~37d become smaller than the specified value. Therefore, steel plate detection circuit 78 detects that steel plate X is present. Then, the fact that steel plate X has arrived beneath magnetic support units 15 of support unit 303 is transmitted to substrate height setter 389 and changeover switch 3101 of height control system 329 by detection signal TF. Then, the setting value for when steel plate X is present is selected in substrate height setter 389.

In operators 391a and 391b, the setting value of substrate height setter 389 is subtracted from the sum of outputs he and hb of linear guides 43e and 43b (43c), and $\Delta$zbsa and $\Delta$zbsb are outputted. When substrates 339a and 339b are not at the set value, the output of changeover switch 3101, which selects zero, and $\Delta$zbs are added by adder 3103, and output $\Delta$zbs of substrate height coordinates conversion circuit 393 is introduced to height mode excitation current operation circuit 3107.

At the same time, feed monitor 327 detects steel plate X and starts the output of travel amount ybs. In subtractor 397, the zero set value output of guide position setter 395 is subtracted from ybs, and $\Delta$ybs is outputted. At this time, if predetermined time t2 has not elapsed, guide angle of inclination operation circuit 399 outputs zero. For this reason, the zero output of guide angle of inclination operation circuit 399 and $\Delta\theta$bs are subtracted by subtractor 3105, and output $\Delta\theta$bs of substrate height coordinates conversion circuit 393 is introduced to inclination mode excitation current operation circuit 3109.

izbs and i$\theta$bs are operated in excitation current operation circuit 3111 so that $\Delta$zbs and $\Delta\theta$bs converge to zero. Current drivers 365a and 365b drive the motors of actuators 351a and 351b based on outputs ida and idb of substrate height control current coordinates inversion circuit 3113. By this means, substrates 339a and 339b are set at the set height when steel plate X is present. At this time, output $\Delta$zbs of substrate height coordinates conversion circuit 393 is also introduced to vertical motion mode control voltage operation circuit 82 of attraction control device 19.

At the same time, steel plate detection signal TF of steel plate detection circuit 78 shown in FIG. 3 is also transmitted to control voltage coordinates inversion circuit 86. After substrates 339a and 339b have been set to the set height, that is to say after specified time t1 from receiving detection signal TF, excitation voltages ea and eb are outputted to start levitation control. In levitation control, output values za, zb, zc and zd of gap sensors 37a~37d are subtracted from the output of levitation gap width setter 70 by subtractors 74a~74d. The results of these subtractions are introduced to levitation gap deviation coordinates conversion circuit 80, and deviation $\Delta$z from the specified position of the center of gravity coordinates of the part of steel plate X which is overlapped by the support unit and roll angle $\Delta\theta$ of the same part of steel plate X are calculated. At the same time, excitation current measurement values ia and ib of electromagnets 23a and 23b detected by current detectors 55a and 55b are subtracted from the zero output of current setter 72 by subtractors 76a and 76b. The results of these subtractions are introduced to excitation current deviation coordinates conversion circuit 81, and coil excitation current $\Delta$iz which contributes to the vertical motion of the center of gravity of the part of steel plate X overlapped by support unit 303 and coil excitation current $\Delta$i$\theta$ which contributes to the rolling of the same part of steel plate X are calculated.

Out of $\Delta$z, $\Delta\theta$, $\Delta$iz and $\Delta$i$\theta$, $\Delta$z and $\Delta$iz are introduced to vertical motion mode control voltage operation circuit 82, together with output $\Delta$zbs of substrate height coordinates conversion circuit 393. Here, coil excitation voltage ez, which contributes to the vertical motion of the center of gravity of the part of steel plate X overlapped by support unit 303, is calculated. When ez is calculated, $\Delta$iz converges to zero in the stationary levitation state of steel plate X, that is to say zero power control is performed.

At the same time, $\Delta\theta$ and $\Delta$i$\theta$ are introduced to roll mode control voltage operation circuit 83 of FIG. 3, and coil excitation voltage e$\theta$, which contributes to the rolling of the same part of steel plate X, is calculated. When e$\theta$ is calculated also, $\Delta$i$\theta$ converges to zero in the stationary levitation state of steel plate X, in other words, zero power control is performed.

Outputs ez and e$\theta$ of control voltage operation circuit 84 of FIG. 3 are introduced to control voltage coordinates inversion circuit 86, and excitation voltages ea and eb for respective electromagnets 27 are calculated. By this levitation control, ia and ib in the stationary levitation state of steel plate X converge to zero, in other words, zero power control (Laid-Open Patent No. Showa 61-102105 Gazette) is achieved as a whole.

In this way, if levitation control which contributes to the vertical motion of the center of gravity of the part of steel plate X overlapped by support unit 303 and levitation control which contributes to the rolling of the same part of steel plate X are performed in every mode, it is possible to design levitation control systems in the respective modes. Therefore, robust levitation control can be performed for variations of weight per unit length of steel plate X and for variations of material and thickness. Also, during the time for levitation control to reach the stationary levitation state, the weight of steel plate X is loaded on coil springs 47 and dampers 49. Thus, even if output ha of linear guide 43e fluctuates, height control will be performed in height control system 329 to maintain substrates 339a and 339b at the set height. At the same time, since the fluctuations of $\Delta$zbs and $\Delta\theta$bs which accompany height control are introduced to control voltage operation circuit 85, stable levitation control can be achieved.

Moreover, if steel plate X is stably levitated by zero power control, the levitation gap width between magnetic support units 15 and steel plate X becomes a width which balances the attraction of permanent magnets 21 with the load weight of steel plate X. The levitation gap width at this time differs from the output value of levitation gap width setter 70, and $\Delta$z is outputted in levitation gap width deviation coordinates conversion circuit 80. This output is introduced to changeover switch 3101 of height control system 329. Then, after specified time t2 from the reception of steel plate detection signal TF of steel plate detection circuit 78 to the stable levitation of steel plate X, it is outputted from changeover switch 3101. By this means, ($\Delta$zbs+$\Delta$z) is outputted by the adder of the height control system. Therefore, substrates 339a and 339b travel to a position which is only $\Delta$z higher than the specified height.

Furthermore, after predetermined time t2 from reception of steel plate detection signal TF of steel plate detection circuit 78 to the stable levitation of steel plate X, guide angle of inclination operation circuit 399 starts to output. At this time, as shown in FIG. 20a, if steel plate X deviates to either the left or right direction with regard to the track center, the left/right travel amount is detected by feed monitor 327, and $\Delta ybs$ is introduced to guide angle of inclination operation circuit 399 via subtractor 397. In guide angle of inclination operation circuit 399, the angles of inclination of substrates 339a and 339b are operated to make $\Delta ybs$ converge to zero, and $\Delta \theta bs + \Delta \theta bc$ are introduced to inclination mode excitation current operation circuit 3109 via subtractor 3105. For this reason, as shown in FIG. 20b, substrates 339a and 339b travel vertically to make an angle of inclination of $-\Delta \theta bc$, and a force in a direction to cancel $\Delta ybs$ acts on steel plate X. By this means, $\Delta ybs$ converges to zero, and steel plate X is maintained in a position which corresponds to the guide position setting value of guide position setter 395.

By this operation, even if the weight per unit length of steel plate X which support unit 303 supports varies, its upper surface will always be levitated at a constant height. At the same time, even if a lateral external force acts on steel plate X, rolling will be rapidly damped, and it will be transported along the track while maintaining a stable state.

Here, if a levitation gap width setting value which takes into consideration thickness data for steel plate X is set by the main computer, it goes without saying that it is possible always to maintain the position of the center of the thickness of steel plate X at a constant height. If steel plate X can be levitated at a constant height in this way, not only does dimensional compatibility with other systems become simple, but also the initial values of the gap widths between magnetic support units 15 and steel plate X when levitation control is initiated in support unit 303 by the fresh arrival of steel plate X are the same for each support unit 303. Therefore, the shocks at the initiation of levitation control applied to support unit 303 which are already supporting steel plate X can be made the same. Consequently, there is the advantage that control system design for the absorption of this shock by attraction control device 19 becomes simple.

Also, if a guide position setting value for steel plate X is set by the main computer taking account of the left/right position of the steel plate, it is possible to transport steel plate X while giving it a predetermined deviation in the lateral direction. Even if there is a support unit 303 which is offset from the specified position in the track, if the guide position set value of the error potion of the set position is set, there will be no requirement to cause an excess guiding force to act on steel plate X. Therefore, there will be the advantage of being able to achieve smooth transport.

Moreover, in this embodiment, zero power control is used for levitation control. However, steel plate X is supported without contact by this type of zero power control, the levitation gap width of magnetic support unit 15 in which the load is increased due to the inclination of steel plate X will decrease. Therefore, by inclining the steel plate in the opposite direction to the fore/aft left/right slippage of steel plate X, further effect will be given to guidance control. In other words, the attraction control device has the additional purpose of an angle of inclination control device.

After the passage of steel plate X through unit support component 303 is completed, the output values of gap sensors 37a–37d become larger and therefore steel plate detection circuit 78 detects that there is no steel plate. Then, by the operation in the above-mentioned case when steel plate X is not beneath magnetic support units 15, levitation control of support unit 303 is stopped. At the same time, substrates 339a and 339b are set in higher positions than when steel plate X is present, and maintain this state until the arrival of the next steel plate.

Steel plate X which is supported without contact by support unit 303 travels due to propulsion unit 5. The above levitation control and height control are successively commenced by all the support units 303 at which steel plate X has arrived. At this time, bending in the vertical direction sometimes occurs along the direction of advance of steel plate X due to elasticity. This bending becomes a disturbance in the vertical direction in individual support units 303. In two neighboring support units 303, it becomes pitching of the steel plate parts supported by them.

In attraction control device 19, shown in FIG. 3, of each support unit 303, levitation control is performed in relation to the vertical motion of the center of gravity of steel plates and the rolling of it by vertical motion mode control voltage operation circuit 82 and roll mode control voltage operation circuit 83. However, if the respective spring constants and damping factors of coil springs 47 and dampers 49 of mounting device 17 are set at appropriate values, it becomes possible to accelerate the pitching convergence of the steel plate. In this embodiment, the bending of steel plate X can be effectively inhibited by accelerating the pitching convergence of the steel plate. In other words, levitation control in the pitch direction of steel plate X is performed by coil springs 47 and dampers 49 of mounting device 17. Therefore, the whole of steel plate X can be stably levitated.

Also, as shown in FIG. 19, when steel plates is prevented from the rolling by the rollers, etc. of the cold rolling mill, output $e\theta$ of roll mode control voltage operation circuit 83 of FIG. 3 becomes zero through an appropriate device (not illustrated).

In each propulsion unit 5, as described in the previous embodiment, when steel plate X has passed through propulsion unit 5, linear motor excitation control of propulsion unit 5 stops by the operation when the fact that steel plate X is not present is detected. At the same time, stators 114 are set in higher positions and stators 100 are set in lower positions than when steel plate X is present, and maintain this state until the next steel plate X arrives.

In this way, steel plate X travels to its destination while being levitated without contact without leaving the track which is composed of support units 303 and propulsion units 5.

In the above embodiment, mounting device 17 is composed of guide mechanisms provided with coil springs, dampers and linear guides, etc. and height adjustment mechanisms provided with actuators, linear guides, etc. However, the composition of the mounting devices is not in any way limited to this. Various modifications are possible, provided magnetic support units 15 have compositions which are able to move vertically.

Figure 21:
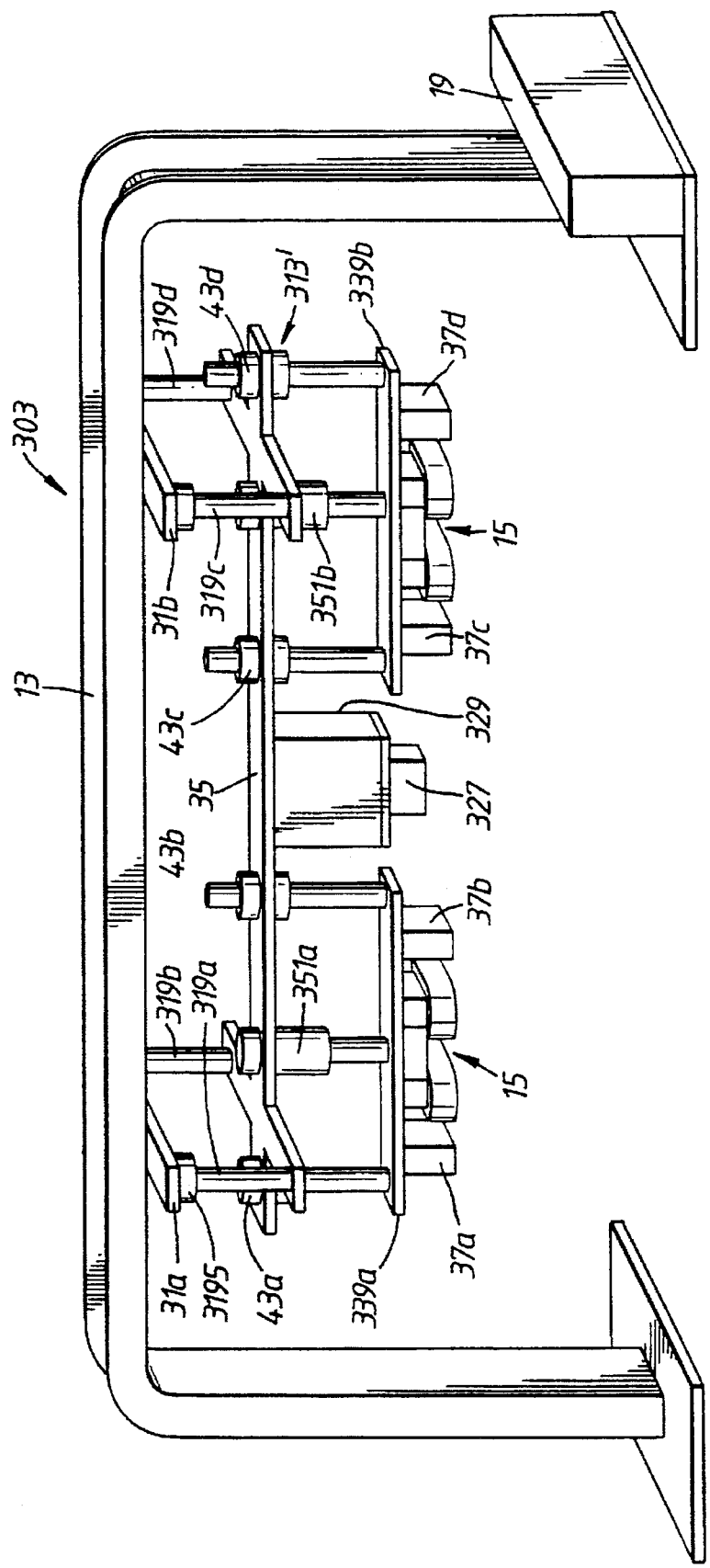
FIG. 21 is an oblique view showing the essential parts of a supporting unit of a further embodiment of this invention.

For instance, support unit 303 may be composed as shown in FIG. 21. This support unit 303 may be composed by securing baseplate 35 to track frame 13 by supports 319a, . . . . At the same time, mounting devices 313' may be composed by providing load cells 3195 between baseplate 35 and substrates 339a and 339b. In this case, any forces in the vertical direction applied to mounting devices 313' are measured by load cells 3195. Thus, it goes without saying that, by performing height control using the outputs of load cells 3195, the same function can be achieved as in the case of using coil springs and dampers.

Figure 22:
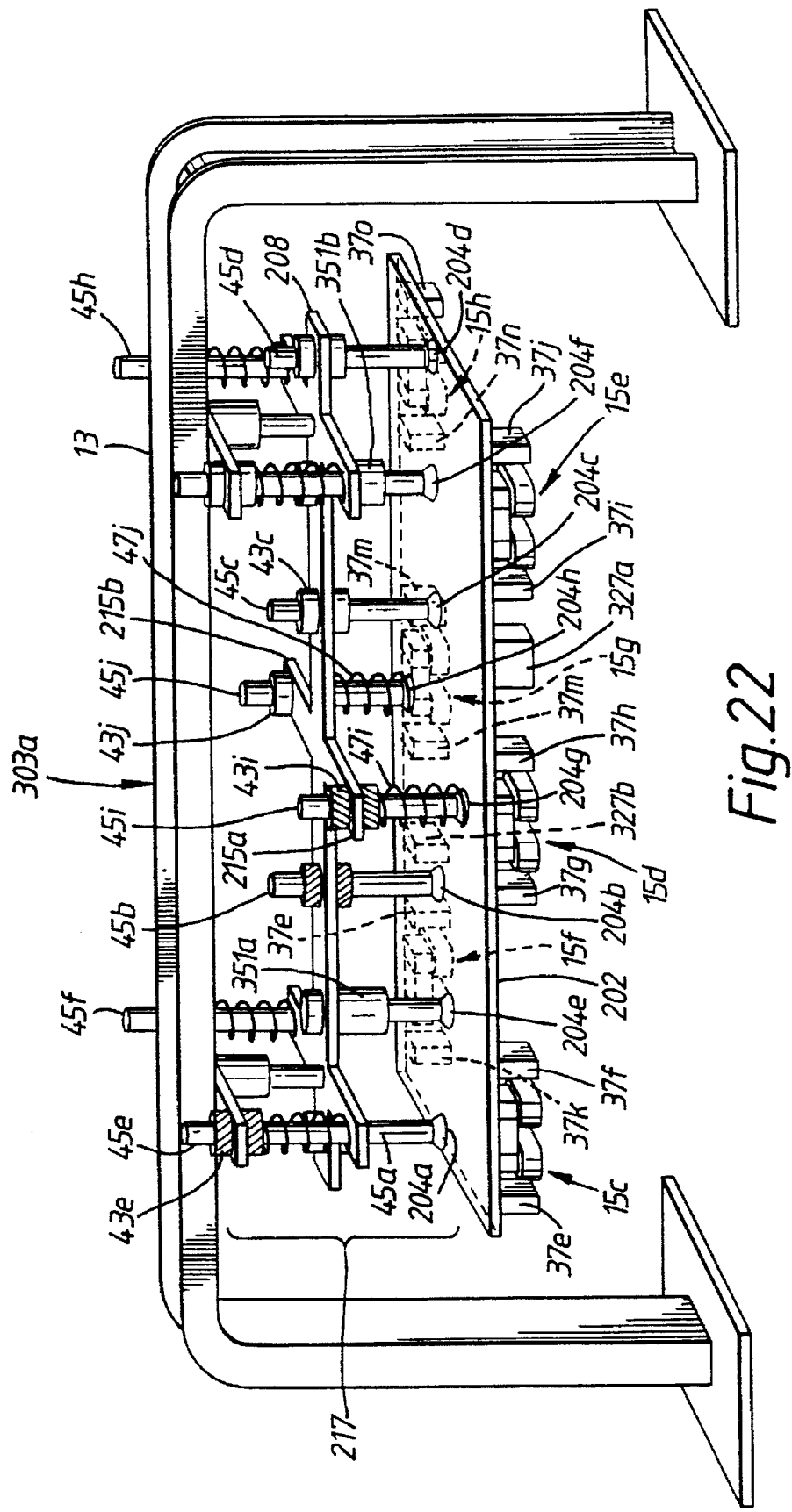
FIG. 22 is an oblique view showing another embodiment of a magnetic support unit.

Also, in the above embodiment, substrates 339a and 339b are respectively provided with one magnetic support unit 15 each. However, this does not restrict the number of magnetic support units used in support unit 303 in any way. For instance, the composition may be as shown in FIG. 22. Support unit 303 shown in FIG. 22 has flat plate-shaped substrate 202 provided with six sets of magnetic support units 15c, 15d, . . . , 15h at which gap sensors 37e, 37f, . . . , ...; 37n, 37o are positioned on their both sides. Even if steel plate X is bending, the mean levitation gap width between steel plate X and individual magnetic support units 15c, 15d, . . . can be obtained by these gap sensors 37e, 37f, . . . on both sides. Substrate 202 is provided with feed monitors 327a and 327b in the center at the front and rear. By taking the mean of the outputs of these feed monitors 327a and 327b, the mean lateral travel amounts of steel plate X in relation to substrate 202 are obtained. Since the lateral travel amount components due to the yawing of steel plate "x" are cancelled, more accurate guidance control can be obtained than in the case of support unit 303.

Moreover, substrate 202 is connected to rods 45a, . . . and actuators 351a and 351b via universal joints 204a, 204b, . . . , 204h on the lower ends of rods 45a, . . . and on the lower ends of actuators 351a and 351b. Also, extensions are provided to baseplate 208 at both ends and in the center part. The following are provided at the two ends of the central extensions of baseplate 208:

linear guides 43i and 43j which are secured by thrusting through baseplate 208;

rods 45i and 45j, provided with universal joints 204i and 204j at their lower ends and coil springs 47i and 47j, of which the upper ends are secured to baseplate 208 and the lower ends are secured to substrate 202. The universal joint has prepared with suitable flexible mechanical structure in order to absorb mechanical dimension error.

By this composition, substrate 202 becomes rotatable in the pitch direction. At the same time, detection of the pitch angle, the roll angle and the vertical travel amount of substrate 202 by three linear guides 43b, 43e and 43i becomes possible.

Also, substrate 202 has no freedom in the vertical direction or the roll direction due to the actions of actuators 351a and 351b. Therefore, due to the application of the zero power control described in detail in the Specification of Patent Application No. Heisei 4-351167, steel plate X is supported without contact by the use of multiple support units 303a. At the same time, it is possible for substrate 202 to follow the bending in the transport direction of steel plate X. In this case, it goes without saying that all the coil currents of magnetic support units 15c, . . . converge to zero.

When a large number of magnets is provided in support unit 303a in this way, the load weight exerted on each magnetic support unit 15a, . . . decreases. Therefore, not only is it possible to increase the gap widths between magnetic support units 15 and steel plate X, but also the supported weight and magnetic flux per magnetic support unit 15, . . . decrease. Thus, even if the object to be transported is a thin steel plate, saturation of magnetic flux can be avoided and stable non-contact support becomes possible. Also, since substrate 202 follows the bending of steel plate X, the supporting force in the pitch direction becomes smaller and deformation of the steel plate during levitation transport can be inhibited.

Moreover, in the above embodiment, support unit 303a is composed by mounting magnetic support units 15, . . . in inverse U-shaped track frame 13, and levitation control is applied in relation to the vertical motion of the steel plate center of gravity and rolling of the steel plate, taking steel plate X as the object to be transported. At the same time, guidance control is performed by inclining steel plate X in the transverse direction. However, there is no restriction of any kind on the shape of the track frames or the composition of the support units, nor on the objects to be transported. Various modifications are possible.

When using the track mounting type magnetic levitation transport system of the embodiment described above, levitation control of the perpendicular motion of the steel plate and levitation control of its rolling are performed at every support unit. At the same time, guidance control of the steel plate is performed by generating angle of inclination in the magnetic support units on the left and right of the support units. Also, it becomes possible to inhibit the pitching of the steel plate between unit support components by the fact that the magnetic support units are vertically movable due to the mounting system. For this reason, even if, not only the whole length of the steel plate, but also the whole width of the steel plate is varied, the vertical motion of the steel plate and the rolling can be stably levitated at every unit support component, and also, the pitching of the steel plate can be stabilized by the mounting devices.

Also, the magnetic support units which provide levitation can have the additional purpose of guidance of the steel plate in the additional direction. Thus, it becomes possible simultaneously to perform the non-contact support and guidance of the whole steel plate with a simple composition.

Moreover, even in cases where the weights and inertial moments of steel plates differ, this type of deviation is distributed to each unit support component. At the same time, the guiding force which acts on the steel plate through the inclination of the magnetic support units is proportional to the distributed weight of the steel plate. Thus, the acceleration in the transverse direction of the steel plate becomes constant, despite the change of the distributed weight. Therefore, it is possible for the track mounting type magnetic levitation transport system as a whole which is formed of a collection of individual support units to support without contact and guide steel plates possessing a broader range of weights and inertial moments. Also, it is possible to support multiple steel plates without contact on a single track. Furthermore, levitated bodies other than steel plates can be supported, and the composition of the levitated bodies can be made extremely simple.

The following is a description of a further embodiment of this invention.

Figure 23:
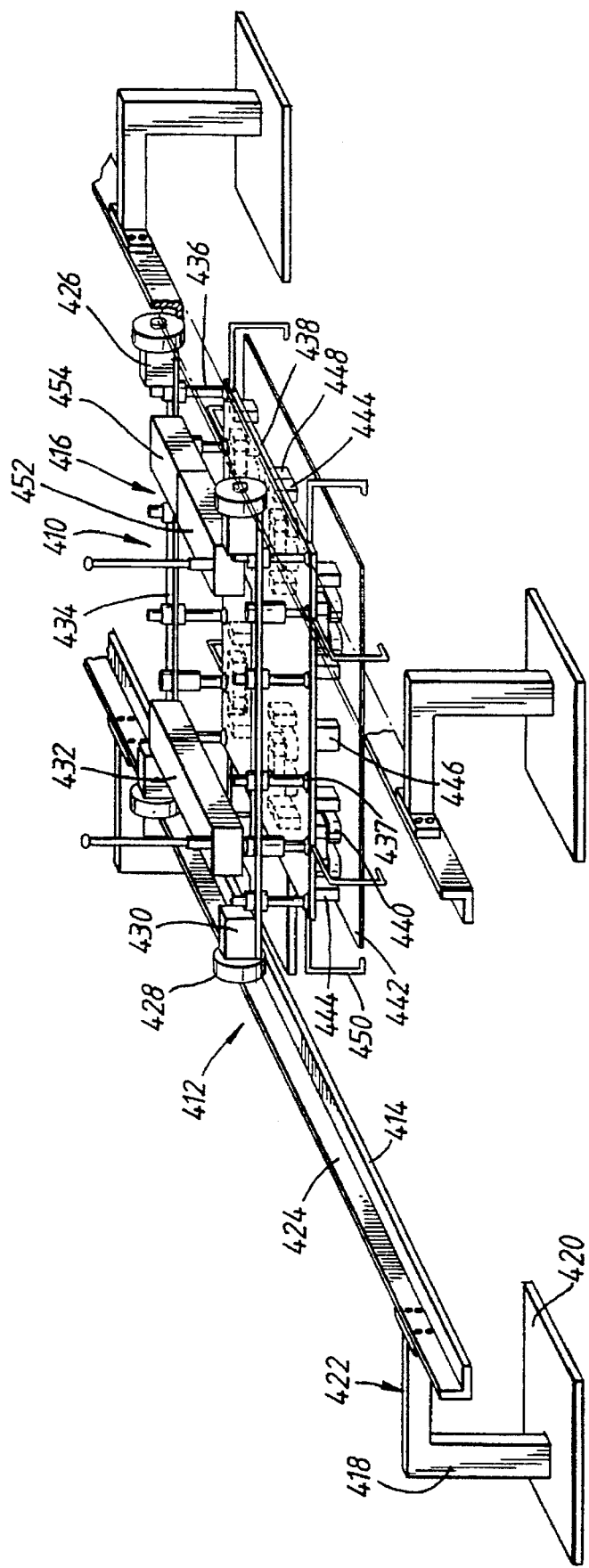
FIG. 23 is an oblique view showing a further embodiment of the magnetic levitation transport system of this invention.
Figure 24:
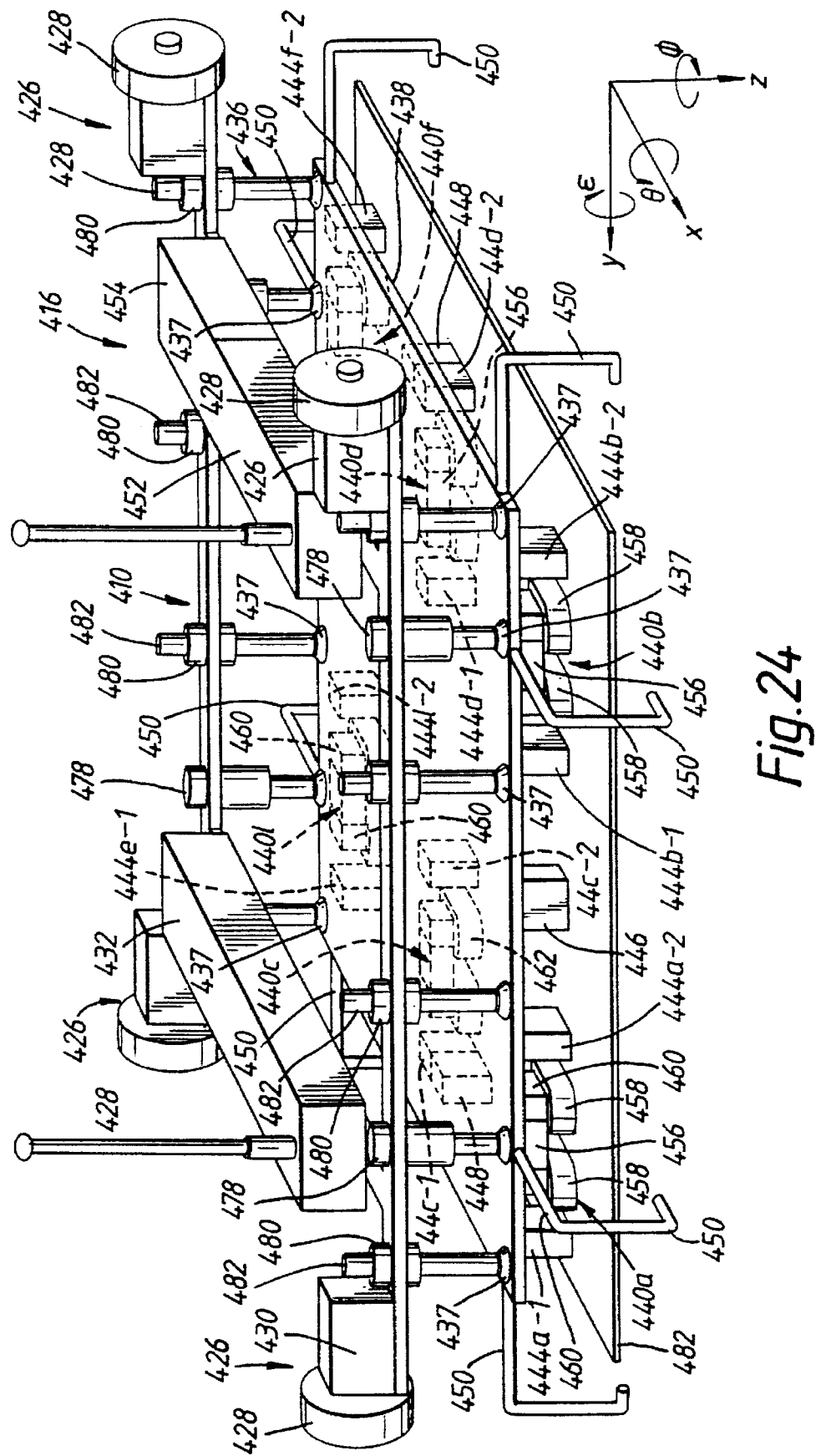
FIG. 24 is an oblique view showing a transporter used in the above transport system.

A steel plate transport system which uses the magnetic levitation system concerned in an embodiment of this invention is shown in FIG. 23 and FIG. 24.

Steel plate transport system 412 is composed of track 414 laid on a specified route and transporter 416 provided with magnetic levitation system 410 concerned in this invention.

Track 414 is formed by installing track support units 422, made by securing L-shaped track support columns 418 on the upper surfaces of baseplates 420, to the left and right of the transport route, and securing guide rails 424 with L-shaped cross-sections to respective track support units 422. Track support columns 418 are formed of insulating components, while guide rails 424 are formed of conducting components. Left and right guide rails 424 are connected to a power source (not illustrated) by an appropriate method.

Transporter 416 is composed by mounting driving units 426 on the upper four corners of magnetic levitation system 410. It is arranged so that it is free to run along track 414.

Driving units 426 are composed of wheels 428; motors 430 which drive wheels 428 and running control system 432 which runs, stops and reverses transporter 416 by controlling motors 430 through external instructions by radio.

Wheels 428 are conductive members. They supply the required power to magnetic levitation system 412 and driving units 426 by making contact with left and right guide rails 424.

Magnetic levitation system 410 is composed of 'hash'-shaped substrate 434;

inclining devices 436 mounted on the flat-shaped components at the front and rear parts of substrate 434;

flat-shaped frame 438 joined to inclining devices 436 via universal joints 437;

a total of six magnet units 440, three of which are positioned in a line on each of the left and right undersides of frame 438;

gap sensors 444 which are positioned on both sides of each magnet unit 440 for non-contact measurement of the gap widths between magnet units 440 and steel plate 442 which is the object to be transported;

feed monitors 446 which are positioned at the front and rear ends of the central parts of the underside of frame 438 for non-contact measurement of the travel amounts in the transverse direction of the parts of steel plate 442 which face them;

feed monitors 448 which are positioned in the center parts of the left and right sides of the underside of frame 438 for non-contact measurement of the travel amount in the fore and aft directions of the parts of the steel plate which face them;

eight guide bars 450 which are positioned so that they enclose the four corners of frame 438 to prevent the escape of steel plate 442 from the available non-contact support region produced by magnet units 440;

magnetic support control device 452 for the non-contact support of steel plate 442 by controlling the attraction of magnet units 440 and angle of inclination control device 454 for guiding steel plate 442 by controlling the angle of inclination of frame 438 using inclination device 436 for preventing the escape steel plate 442 from the available non-contact support region produced by magnet units 440.

Here, running control system 432, magnetic support control system 452 and angle of inclination control system 454 are secured on top of the 'hash'-shape left and right members of substrate 434, as shown in FIGS. 23 and 24. Also, universal joints 437 have structures provided with appropriate flexibility for absorbing mechanical dimension errors.

Feed monitor 446 and feed monitor 448 are designed to output zero respectively when steel plate 442 is distanced from a predetermined position.

As shown in FIG. 24, magnet units 440 are each composed of permanent magnets 456 sandwiched by two electromagnets 452 made up of coils 458 and iron cores 460. The two coils 458 are connected in series so that their magnetic fluxes reinforce each other by having the same excitation current.

Figure 25:
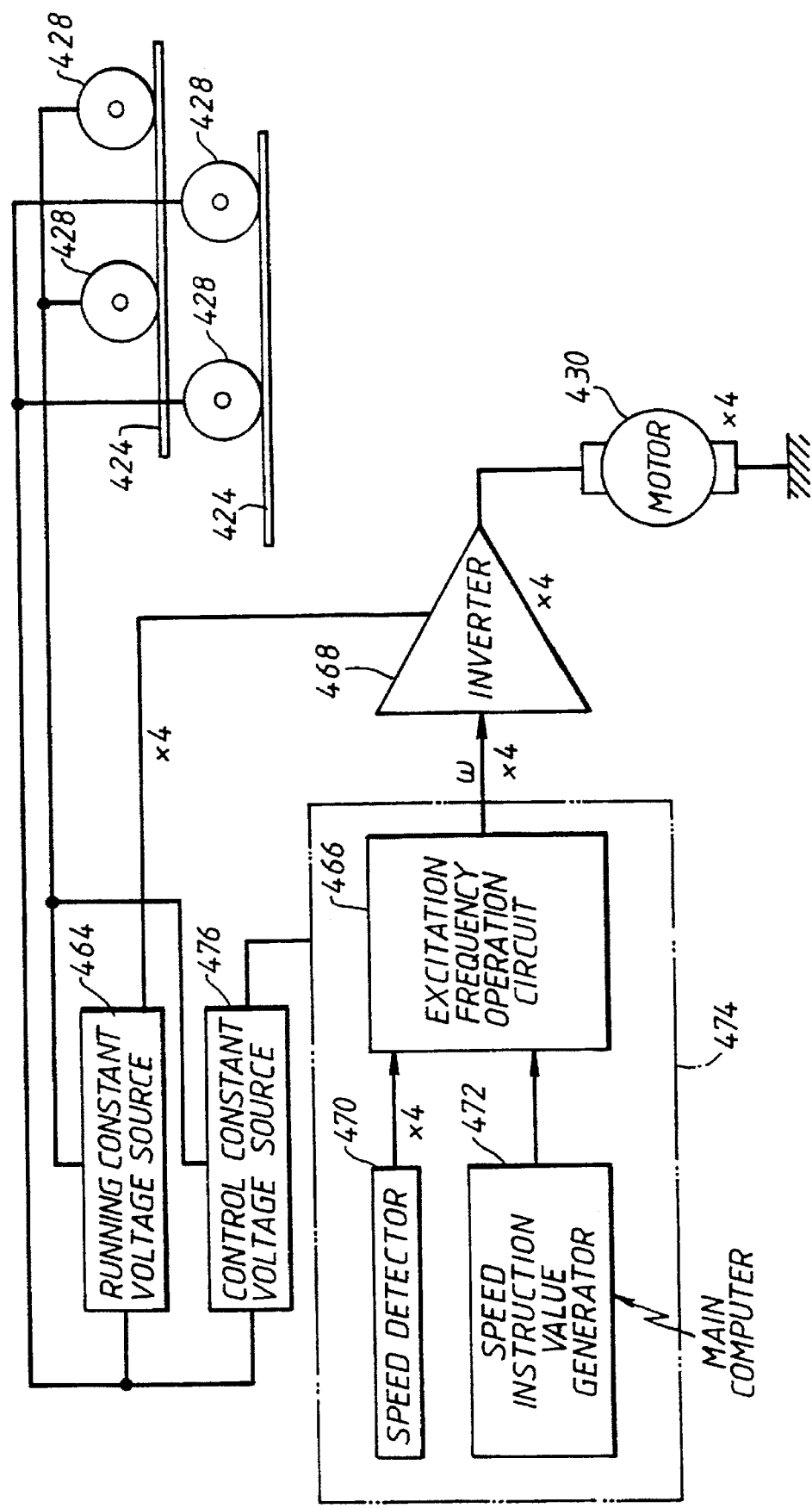
FIG. 25 is a block diagram of the running control system used in the above transport system.

As shown in FIG. 25, running control system 432 is composed of running constant voltage source 464 which introduces the power of a power source (not illustrated) from guide rails 424 via left and right wheels 428 and generates a specified constant 3-phase alternating current;

four inverters 468 which excite each motor 430 based on frequency instruction value ω from excitation frequency operator 466;

running control unit 474 which is provided with four speed detectors 470 for operating the running speed of transporter 416 from the number of revolutions of each wheel 428;

speed instruction generator 472 which outputs the target running speed of transporter 416 through radio from outside and excitation frequency operator 466 which operates the four frequency instruction values ω from speed detectors 470 and speed instruction value generator 472 for exciting each motor 430 so that transporter 416 runs at the target running speed and control constant voltage source 476 which introduces the power source voltage from guide rails 424 via left and right wheels 428 and generates and supplies a specified constant voltage to running control unit 474.

In the control block diagrams from FIG. 25 onwards, the solid lines show power routes, while the arrows show signal routes.

Inclination device 436 is composed of four actuators 478 which are free to expand and contract in the vertical direction and are mounted on the front and rear flat plate-shaped members of 'hash'-shaped substrate 434 by being thrust through them at specified intervals;

eight linear guides 480 mounted on the front and rear flat plate-shaped members of substrate 434 by being thrust through them and eight rods 482 which are moveable only in the vertical direction and are thrust through each linear guide 480.

Actuators 478 and rods 482 are connected to flat plate-shaped frame 438 via universal joints 437. Also, the expansion and contraction of actuators 478 is controlled by inclination control device 454. By this means, it is possible for inclination device 436 to support frame 438 at a specified inclination and a specified height. Here, linear guides 480 have the additional purpose of travel distance meters for rods 482.

Figure 26A:
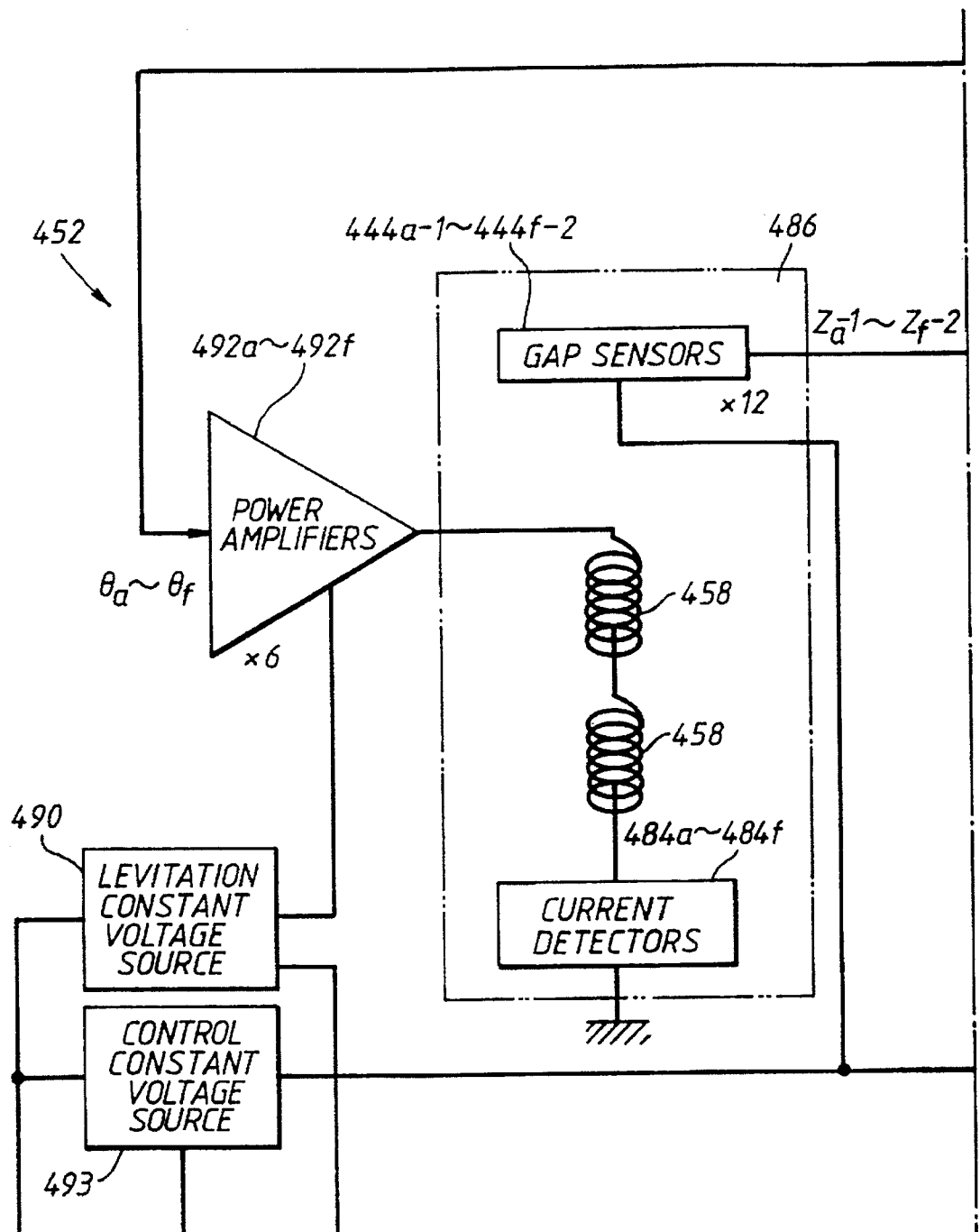
FIG. 26 is a block diagram of the magnetic support control system used in the above transport system.
Figure 26B:
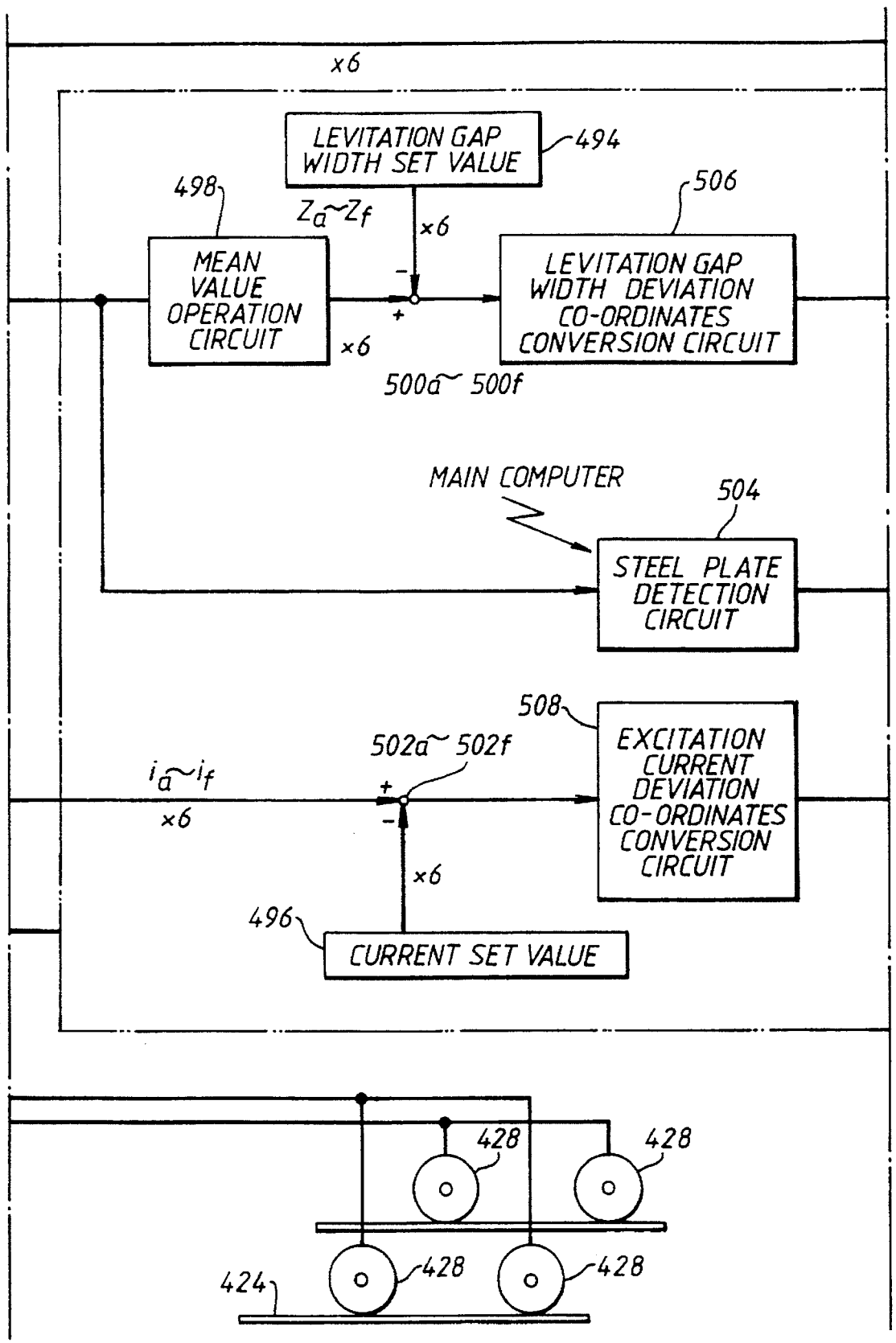
Figure 26C:
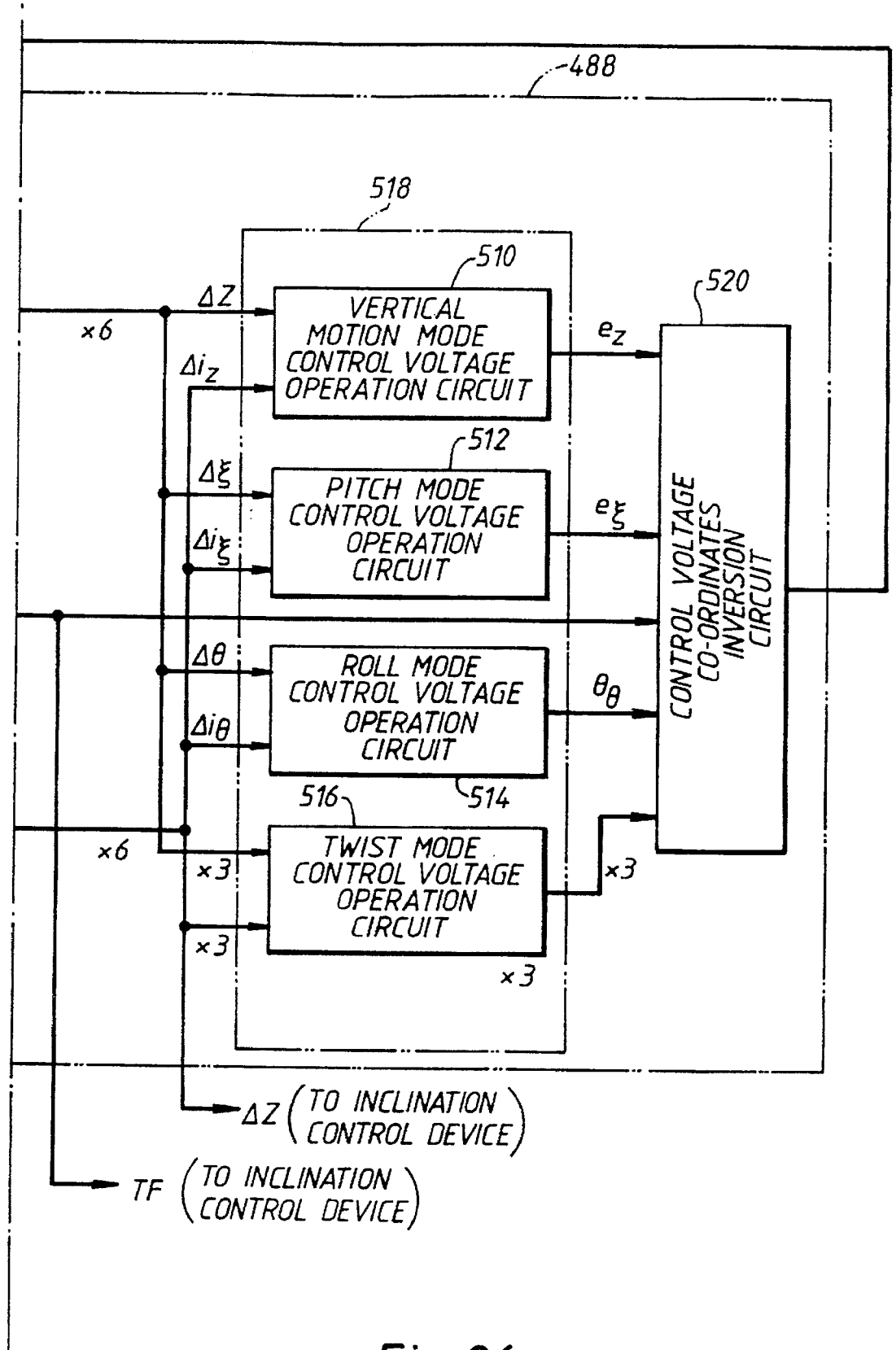

The following is a description of magnetic support control device 452 with reference to FIG. 26. Magnetic support control device 452 is composed of twelve gap sensors 444 (gap sensors 444a-1, 444a-2, 444b-1, 444b-2, . . . , 444f-1, 444f-2) which are close to the left and right of each magnet unit 440, and measure the levitation gap widths between the respective magnet units 440 and steel plate 442;

levitation sensor unit 486 composed of current detectors 484a, 484b, 484c, 484d, 484e and 484f for measuring excitation currents flowing in the coils of electromagnets 462 and gap sensors 444;

levitation operation unit 488 which takes, as its inputs, output signals za-1, za-2, . . . , zf-1, zf-2 and ia, ib, . . . , if of levitation sensor unit 486, and calculates excitation voltages ea, eb, . . . , ef for every magnet unit 440 required for the levitation of steel plate 442;

levitation constant voltage source 490 which introduces the power of a power source (not illustrated) from guide rails 424 via left and right wheels 428, and generates a specified constant voltage;

power amplifiers 492a, 492b, . . . , 492f which are connected to levitation constant voltage source 490, and excite coils 458 of magnet units 440 based on outputs ea, eb, . . . , ef of levitation operation unit 488 and control constant voltage source 493 which is supplied with power from a power source (not illustrated) via guide rails 424 and wheels 428, and supplies a specified constant voltage to gap sensors 444 and levitation operation unit 488.

Levitation operation unit 488 is composed of levitation gap width setter 494 and levitation current setter 496, which output predetermined setting values which are set by, for instance, radio from the main computer;

mean value operation circuit 498 which averages the outputs of gap sensors 444 positioned to the left and right of each magnet unit 440, and outputs mean levitation gap widths za, zb, . . . , zf between steel plate 442 and magnet units 440;

subtractors 500a, 500b, . . . , 500f for subtracting the levitation gap width set values from the respective output values za, zb, . . . , zf of mean value operation circuit 498;

subtractors 502a, 502b, ..., 502f for subtracting the current set value from outputs ia, ib, ..., if of current detectors 484a, 484b, ..., 484f; steel plate detection circuit 504 which judges from output values za-1, za-2, ..., zf-1, zf-2 whether steel plate 442 is present in a position beneath all magnet units 440 and within the available levitation region due to magnet units 440 and, at the same time, commences this judgement based on a transport initiation instruction from the main computer (not illustrated);

levitation gap width deviation coordinates conversion circuit 506 for obtaining from the output values of subtractors 500a, 500b, ..., 500f deviation $\Delta z$ from the predetermined position of the center of gravity coordinates of steel plate 442;

pitch angle $\Delta \xi$ of steel plate 442;

roll angle $\Delta \theta$ of steel plate 442 and the three twist mode deviations relating to the twisting of steel plate 442 beneath the four corner positions of frame 438; the twisting between steel plate 442 below the front and rear ends of frame 438 and the position in the center of frame 438 and the bending between steel plate 442 below the front and rear ends of frame 438 and the position in the center of frame 438;

excitation current deviation coordinates conversion circuit 508 for obtaining coil excitation current $\Delta iz$ which contributes to the vertical motion of the center of gravity of steel plate 442;

coil excitation currents $\Delta i\xi$ and $\Delta i\theta$ which contribute to the pitching and rolling of steel plate 442 and the three twist mode excitation currents relating to the twisting of steel plate 442 beneath the four corner positions of frame 438;

the twisting between steel plate 442 below the front and rear ends of frame 438 and the position in the center of frame 438 and the bending between steel plate 442 below the front and rear ends of frame 438 and the position in the center of frame 438;

control voltage operation circuit 518 composed of vertical motion mode control voltage operation circuit 510 which takes, as its inputs, outputs $\Delta z$ and $\Delta iz$ of levitation gap width deviation coordinates conversion circuit 506 and excitation current deviation coordinates conversion circuit 508, and calculates coil excitation voltage ez which contributes to the vertical motion of the center of gravity of steel plate 442; pitch mode control voltage operation circuit 512 which takes as its inputs outputs $\Delta \xi$ and $\Delta i\xi$ of levitation gap width deviation coordinates conversion circuit 506 and excitation current deviation coordinates conversion circuit 508, and calculates coil excitation voltage e$\xi$ which contributes to the pitching of steel plate 442; roll mode control voltage operation circuit 514 which takes as its inputs outputs $\Delta \theta$ and $\Delta i\theta$ of levitation gap width deviation coordinates conversion circuit 506 and excitation current deviation coordinates conversion circuit 508, and calculates coil excitation voltage e$\theta$ which contributes to the rolling of steel plate 442 and twist mode control voltage operation circuit 516 which takes, as its inputs, the above three twist mode deviations and twist mode excitation currents, and calculates the three excitation voltages which relate to the respective twist modes; and control voltage coordinates inversion circuit 520 which takes as its inputs outputs ez, e$\xi$, e$\theta$ and outputs of the twist mode control voltage operation circuit 516 of control voltage operation circuit 518 and detection signal TF of steel plate detection circuit 504, and calculates excitation voltages ea, eb, ..., ef which excite respective magnet units 440 when steel plate 442 is present below frame 438.

In control voltage coordinates inversion circuit 520, when steel plate detection signal TF changes from 'NO' to 'YES', changeover is performed from six zero outputs to ea, eb, ..., ef after predetermined time t1.

Figure 27A:
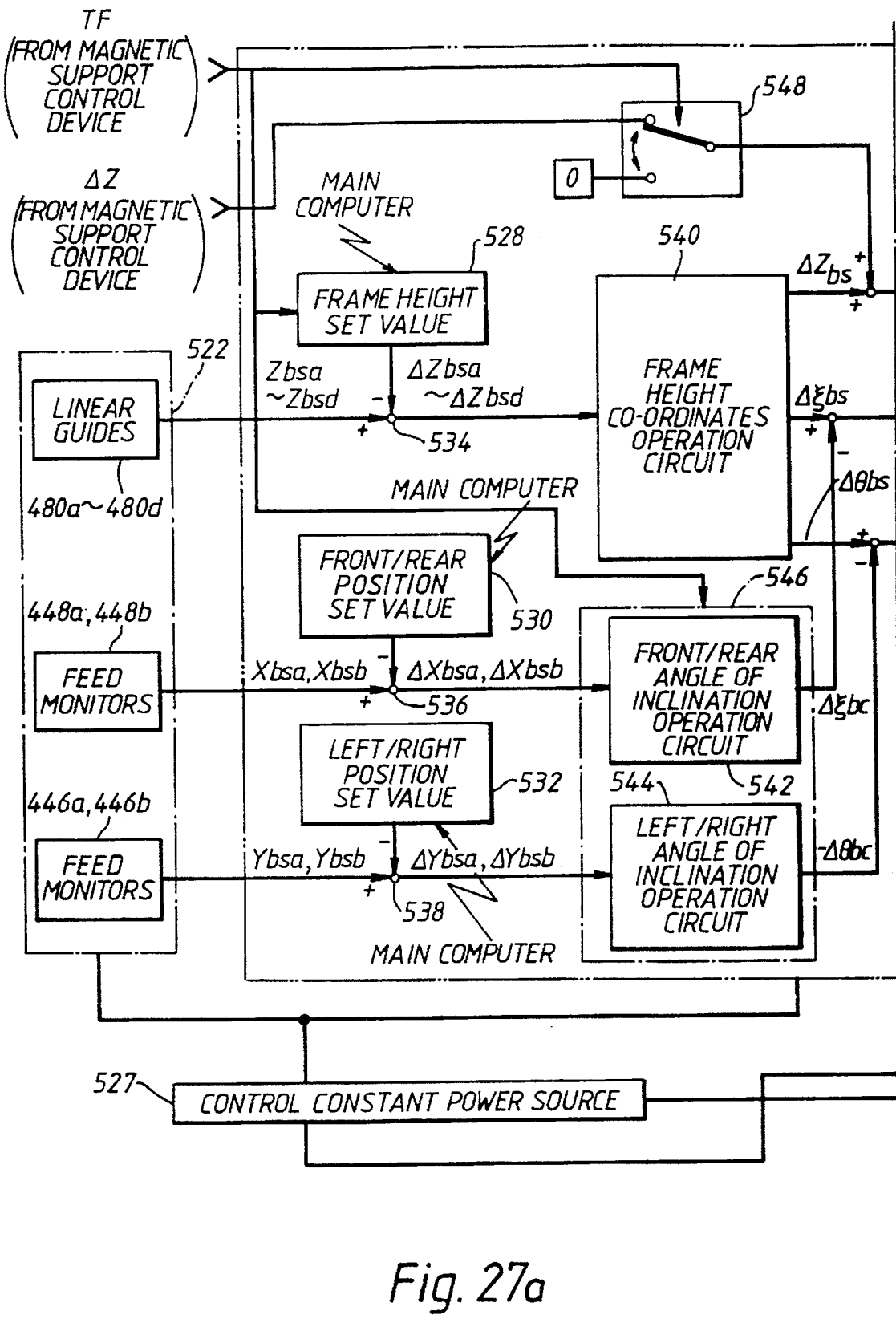
FIG. 27 is a block diagram of the angle of inclination control system used in the above transport system.
Figure 27B:
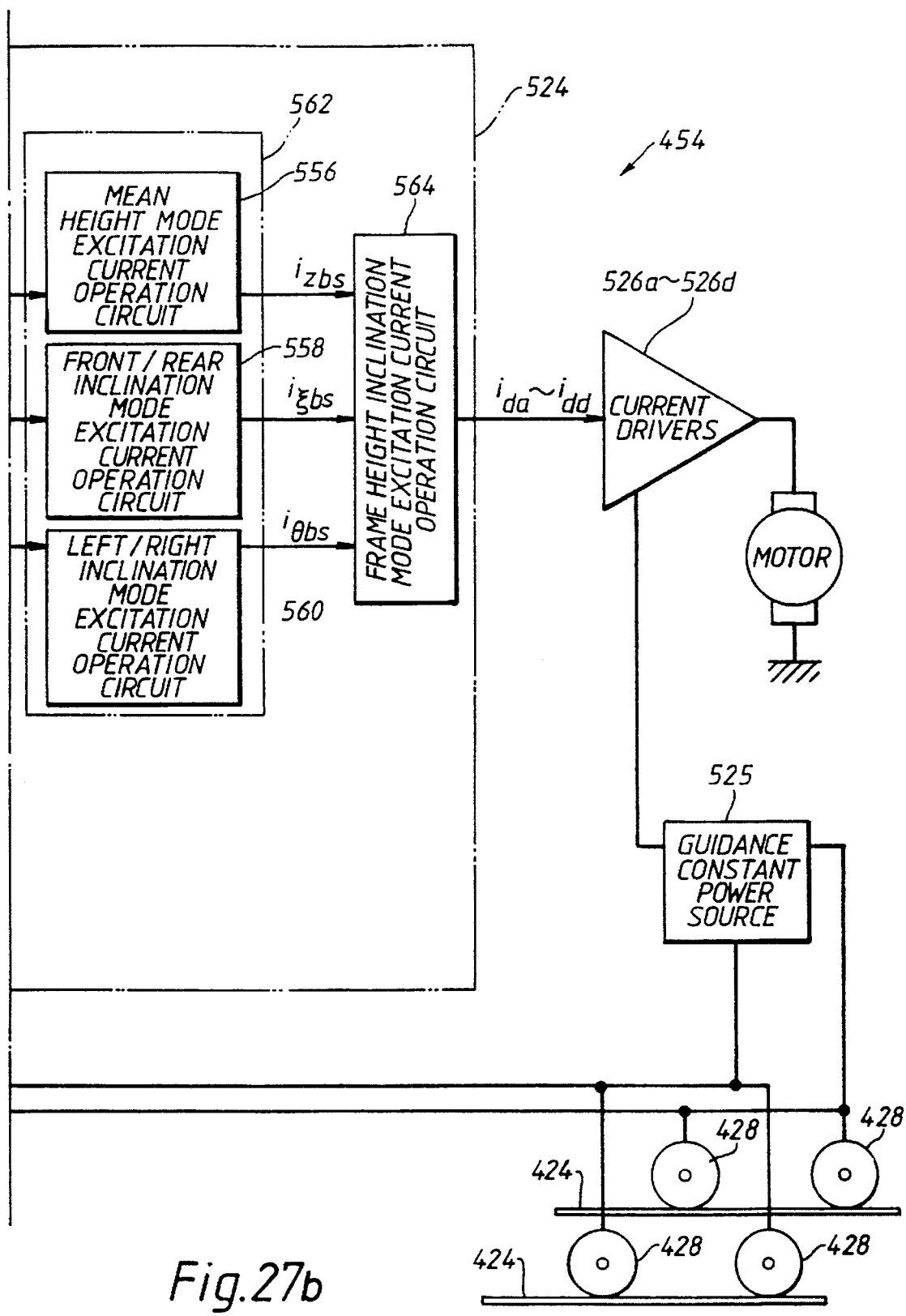

The following is a description of inclination control device 454 with reference to FIG. 27.

Inclination control device 454 is composed of four linear guides 480a, 480b, 480c and 480d which output the travel distances zbsa~zbsd of linear guides 480, which are height information for frame 438;

guidance sensor unit 522 made up of feed monitors 448a and 448b, which output the fore and aft travel amounts xbsa and xbsb of the left and right parts of steel plate 442, and feed monitors 446a and 446b which output transverse travel amounts ybsa and ybsb of the front and rear parts of steel plate 442;

guidance operation unit 524 which introduces presence detection signal TF for steel plate 442 and steel plate 442 center of gravity gap width deviation signal $\Delta z$ which are outputted from magnetic support control device 452 and output signals zbsa~zbsd, xbsa, xbsb and ybsa, ybsb of guidance sensor unit 522, and calculates control current values ida~idd which control the expansion and contraction of four actuators 478 for guiding steel plate 442 in the fore and aft and transverse directions;

guidance constant voltage source 525 which generates a specified constant voltage;

current drivers 526a~526d which are connected to guidance constant voltage source 525, and which cause actuators 478 to expand and contract by driving the motors of actuators 478 based on outputs ida~idd of guidance operation unit 524 and control constant voltage source 527 which is supplied with power from a power source (not illustrated) via guide rails 424 and wheels 428, and supplies a specified constant voltage to guidance sensor unit 522 and guidance operation unit 524.

Guidance operation unit 524 is composed of frame height setter 528 which selectively outputs multiple set values related to the height of the center of gravity of frame 438, which are set by radio from the main computer (not illustrated), based on steel plate detection signal TF from magnetic support control device 452;

front and rear position setter 530 which outputs set values related to the front and rear positions of steel plate 442 which are set by radio from the main computer (not illustrated);

left and right position setter 532 which outputs set values related to the left and right positions of steel plate 442 which are set in the same way;

subtractor 534 for subtracting the output values of frame height setter 528 from output values zbsa~zbsd of linear guides 480;

subtractor 536 for subtracting the output values of front and rear position setter 530 from outputs xbsa and xbsb of feed monitors 448;

subtractor 538 for subtracting the output values of left and right position setter 532 from outputs ybsa and ybsb of feed monitors 446;

frame height coordinates operation circuit 540 which takes as its inputs outputs $\Delta zbsa$~$\Delta zbsd$ of subtractor 534, and calculates deviation $\Delta zbs$ from the set value of the center of gravity height of frame 438 and pitch angle $\Delta \xi bs$ and roll angle $\Delta \theta bs$ of frame 438;

guidance control circuit 546 which consists of front and rear angle of inclination operation circuit 542 which takes, as its inputs, outputs $\Delta xbsa$ and $\Delta xbsb$ of subtractor 536, and calculates pitch angle $\Delta\xi bc$ of frame 438 based on these values for guiding steel plate 442 in the front and rear directions and left and right angle of inclination operation circuit 544 which takes as its inputs outputs $\Delta ybsa$ and $\Delta ybsb$ of subtractor 538, and calculates roll angle $-\Delta\theta bc$ of frame 438 based on these values for guiding steel plate 442 in the transverse direction, and which outputs 0 and 0 when steel plate detection signal TF is 'NO', and outputs $\Delta\xi bc$ and $-\Delta\theta bc$ in predetermined time t2 after TF changes from 'NO' to 'YES';

changeover switch 548 which takes, as its inputs, deviation $\Delta z$ and steel plate detection signal TF from magnetic support control device 452, and outputs $\Delta z$ when steel plate 442 is levitated beneath all magnet units 440, but outputs 0 when that is not the case;

adder 550 which adds output $\Delta zbs$ of frame height coordinates operation circuit 540 and the output of changeover switch 548;

subtractor 552 which subtracts output $\Delta\xi bc$ of guidance control circuit 546 from output $\Delta\xi bs$ of frame height coordinates operation circuit 540;

subtractor 554 which subtracts output $-\Delta\xi bc$ of guidance control circuit 546 from output $\Delta\xi bs$ of frame height coordinates operation circuit 540;

excitation current operation circuit 562 which consists of mean height mode excitation current operation circuit 556 which calculates motor drive current $izbs$ of actuators 478 related to the center of gravity height of steel plate 442 from the output of adder 550;

front and rear inclination mode excitation current operation circuit 558 which calculates motor drive current $i\xi bs$ of actuators 478 related to the pitching of frame 438 from the output of subtractor 552 and left and right inclination mode excitation current operation circuit 560 which calculates motor drive current $i\theta bs$ of actuators 478 related to the rolling of frame 438 from the output of subtractor 554 and frame height control voltage coordinates inversion circuit 564 which takes as its inputs outputs $izbs$, $i\xi bs$ and $i\theta bs$ of excitation current operation circuit 562, and outputs control current values $ida$~$idd$ which control the expansion and contraction of the four actuators 478.

In frame height setter 528, selection of the set height is performed in predetermined time t2 after steel plate detection signal TF changes from 'NO' to 'YES'. At the same time, in changeover switch 548, changeover from 0 to $\Delta z$ is performed in predetermined time t3 after steel plate detection signal TF changes from 'NO' to 'YES'.

The following is a description of the operation of the magnetic levitation system concerned in this embodiment which is composed as described above.

Figure 28:
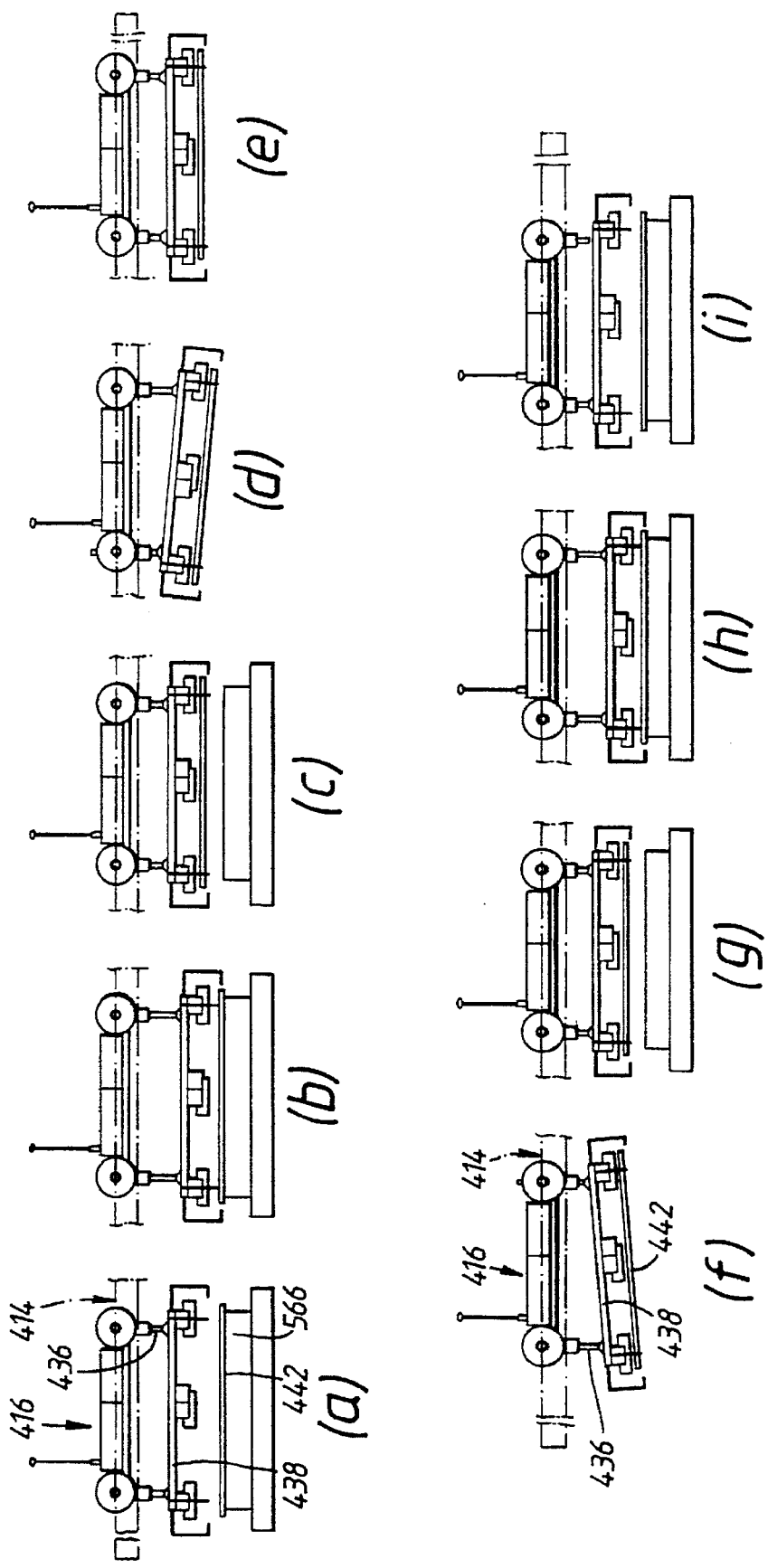
FIG. 28 is illustrations of operations to illustrate the transport operation using the above transport system.

First, the case in which steel plates 442 placed in a specified location on track 414 are transported to another specified location by multiple transporters 416 is described using FIG. 28.

In FIG. 28, 566 is a pedestal on which steel plate 442 is to be placed. First, the circumstances in FIG. 28(a) are described. When a running speed is instructed by the main computer, the instructed speed is set in speed instruction value generator 472 running control system 432 in transporter 416. The actual wheel speed of speed detector 470 is compared with the speed instruction value. Excitation frequency $\omega$ which causes motor 430 to rotate is outputted by excitation frequency operator 466 so that these will correspond with each other. Thus, transporter 416 rapidly runs at the instructed speed.

At this time, since transporter 416 is not transporting steel plate 442, no transport initiation instruction is outputted from the main computer. For this reason, in magnetic support control device 452, a TF signal indicating that there is no steel plate is outputted by steel plate detection circuit 504 to which the outputs of all gap sensors 444 are introduced. This detection signal TF is transmitted to control voltage coordinates inversion circuit 520, and control voltage coordinates inversion circuit 520 outputs zero. Therefore, coil 458 is not excited.

Also, detection signal TF is transmitted to inclination control device 454. Thus, in frame height setter 528, predetermined height h1, at which magnet unit 440 will not adsorb steel plate 442 by the attraction of permanent magnet 456, is outputted. At the same time, in guidance control circuit 546, 0 and 0 are outputted in place of $\Delta\xi bc$ and $-\Delta\theta bc$, and guidance control is not performed.

Moreover, in feed monitors 446a and 446b and feed monitors 448a and 448b, front and rear and transverse travel amounts xbsa, xbsb and ybsa, ybsb become zero since steel plate 442 is not present.

At the same time, when outputs zbsa~zbsd of linear guides 480a, 480b, 480c and 480d differ from output value h1 of frame height setter 528, $\Delta zbs$, $\Delta\xi bs$ and $\Delta\theta bs$ are calculated by frame height coordinates operation circuit 540 based on outputs $\Delta zbsa$~$\Delta zbsd$ of subtractor 534, while the three zero outputs from changeover switch 458 and guidance control circuit 546 are added/subtracted to/from $\Delta zbs$, $\Delta\xi zbs$ and $\Delta\theta bs$ in adder 550, subtractor 552 and subtractor 554 and introduced to control voltage operation circuit 518.

In control voltage operation circuit 518, the respective excitation currents $izbs$, $i\xi bs$ and $i\theta bs$ are calculated for the mode related to the center of gravity height of frame 438 which converges deviation $\Delta zbs$ to zero, the mode related to the inclination in the front and rear direction of frame 438 which converges deviation $\Delta\xi bs$ to zero and the mode related to the inclination in the left/right directions of frame 438 which converges deviation $\Delta\theta bs$ to zero. Outputs $izbs$, $i\xi bs$ and $i\theta bs$ of control voltage operation circuit 518 are converted to motor driving current values $ida$~$idd$ in frame height control current coordinates inversion circuit 564, and actuators 478 are driven via current drivers 526.

In this way, the expansions and contractions of actuators 478 are controlled, and frame 438 is maintained level at frame height set value h1.

In due course, when transporter 416 arrives above pedestal 566, the running speed instruction value is set at zero, and transporter 416 rapidly stops. At this time, steel plate 442 is positioned on pedestal 566, as shown in FIG. 28(a).

When transporter 416 is in the state shown in FIG. 28(a), a judgement on the presence or absence of a steel plate is caused by transmitting a transport initiation instruction from the main computer (not illustrated) to steel plate detection circuit 504. If, at the same time, transport detection circuit 504 is caused to output predetermined height h2, for the fact that there is a steel plate, to frame height setter 528, the above-mentioned control operation will occur in inclination control device 454. Thus, frame 438 will be positioned at set height h2, as shown in FIG. 28(b), by the expansion of actuators 478. Then, in magnetic support control device 452, since the output values of all the gap sensors 444 will become smaller than the predetermined position, steel plate detection circuit 504 will detect that there is a steel plate. Then, the fact that the height of frame 438 has reached the levitation possible region for steel plate 442 due to magnet units 440 is transmitted to control voltage coordinates inversion circuit 520 by detection signal TF. In time t1 after this time, in other words after height control of frame 438 is completed, the following levitation control is commenced.

That is to say, output values za-1, za-2, . . . , zf-1, zf-2 of gap sensors 444a-1, 444a-2, . . . , 444f-1, 444f-2 are outputted as mean values za~zf for the sensors positioned on both sides of magnet units 440 by mean value operation circuit 498.

za~zf are subtracted from the output of levitation gap width setter 494 by subtractors 500a~500f. The subtraction results are introduced to levitation gap width deviation coordinates conversion circuit 506. Here, deviation $\Delta z$ from the predetermined position of the center of gravity coordinates, pitch angle deviation $\Delta \xi$ and roll angle deviation $\Delta \theta$ of frame 438, together with the three twist mode deviations relating to the twisting of steel plate 442 beneath the four corner positions of frame 438;

the twisting of steel plate 442 below the front and rear ends of frame 438 and the position in the center of frame 438 and the bending of steel plate 442 below the front and rear ends of frame 438 and the position in the center of frame 438 are calculated. At the same time, the excitation current measured values ia~if of electromagnets 462 detected by current detectors 484a~484f are subtracted from the zero output of current setter 496 by subtractors 502a–502f and the subtraction results are introduced to excitation current deviation coordinates conversion circuit 508. Here, coil excitation current $\Delta iz$ which contributes to the vertical motion of the center of gravity, coil excitation current $\Delta i\xi$ which contributes to the pitching and coil excitation current $\Delta i\theta$ which contributes to the rolling of steel plate 442, together with the three twist mode excitation currents relating to the twisting of steel plate 442 beneath the four corner positions of frame 438;

the twisting of steel plate 442 below the front and rear ends of frame 438 and the position in the center of frame 438 and the bending of steel plate 442 below the front and rear ends of frame 438 and the position in the center of frame 438 are calculated.

Out of the outputs of levitation gap width deviation coordinates conversion circuit 506 and excitation current deviation coordinates conversion circuit 508, $\Delta z$, $\Delta iz$, $\Delta \xi$, $\Delta i\xi$ and $\Delta \theta$, $\Delta i\theta$ are respectively introduced to vertical motion mode control voltage operation circuit 510, pitching mode control voltage operation circuit 512 and rolling mode control voltage operation circuit 514, and coil excitation voltage $e\xi$ which contributes to the vertical motion of the center of gravity of steel plate 442, coil excitation voltage $e\xi$ which contributes to the pitching-of steel plate 442 and coil excitation voltage $e\theta$ which contributes to the rolling of steel plate 442 are calculated. During the calculation of ez, e$\xi$ and e$\theta$, zero power control is performed in which $\Delta iz$, $\Delta i\xi$ and $\Delta i\theta$ converge to zero in the stationary levitation state of steel plate 442.

At this time, respective pairs corresponding to the three twist mode deviations and the three twist mode excitation currents are introduced to the three twist mode control voltage operation circuits 516. Here, the three twist mode excitation voltages which contribute to the twisting of steel plate 442 beneath the four corner positions of frame 438; the twisting of steel plate 442 below the front and rear ends of frame 438 and the position in the center of frame 438 and the bending of steel plate 442 below the front and rear ends of frame 438 and the position in the center of frame 438 are calculated.

During these calculations, zero power control is performed in which the three twist mode excitation currents converge to zero in the stationary levitation state of steel plate 442.

By this levitation control, so-called 'zero power control' in which ia~if converge to zero in the stationary levitation state of steel plate 442 is achieved as a whole, and steel plate 442 is stably levitated. At this time, levitation gap width deviation $\Delta z$ converges to a value which depends on the weight of steel plate 442.

At the same time, the fact that the height of frame 438 has reached the levitation possible region for steel plate 442 due to magnet units 440 is also transmitted to inclination control device 454 by detection signal TF. In inclination control device 454, detection signal TF is introduced to frame height setter 528, guidance control circuit 546 and changeover switch 548.

In frame height setter 528, predetermined set value h3 is selected when steel plate 442 is levitated, that is to say when steel plate 442 is supported without contact in time t2 after detection signal TF has changed from 'NO' to 'YES', and frame 438 rises. When the rising of frame 438 is completed, that is to say in time t3 after detection signal TF has changed from 'NO' to 'YES', $\Delta z$ is selected in changeover switch 548, and the levitation gap width deviation for when steel plate 442 is in the stationary levitation state is introduced to adder 550.

For this reason, in angle of inclination control device 454, the height of frame 438 is controlled so that this stationary deviation $\Delta z$ is cancelled, and steel plate 442 always levitates at the predetermined height, as shown in FIG. 28(c), despite its weight.

Also, guidance control is commenced in time t2 after detection signal TF has changed from 'NO' to 'YES'. That is to say, when frame 438 begins to descend from the state shown in FIG. 28(a), since the distance to steel plate 442 becomes within the predetermined range, front and rear and transverse travel amounts xbsa, xbsb and ybsa, ybsb are outputted in feed monitors 446a and 446b and feed monitors 448a and 448b. At the same time, in time t2 after detection signal TF has changed from 'NO' to 'YES', the output of guidance control circuit 546 switches from 0 and 0 to $\Delta \xi bc$ and $-\Delta \theta bc$. At this time, xbsa, xbsb, and ybsa, ybsb are compared with the zero outputs of front and rear position setter 530 and left and right position setter 532 in subtractor 536 and subtractor 538. The respective outputs $\Delta xbsa$, $\Delta xbsb$ and $\Delta ybsa$, $\Delta ybsb$ of subtractor 536 and subtractor 538 are introduced to front and rear angle of inclination operation circuit 542 and left and right angle of inclination operation circuit 544.

In front and rear angle of inclination operation circuit 542, pitching angle $\Delta \xi bc$ for cancelling $(\Delta xbsa+\Delta xbsb)/2$ is calculated. At the same time, in left and right angle of inclination operation circuit 544, rolling angle $-\Delta \theta bc$ for cancelling $(\Delta ybsa+\Delta ybsb)/2$ is calculated. Pitch angle $\Delta \xi bc$ is subtracted from output $\Delta \xi bs$ of frame height coordinates operation circuit 540 in subtractor 552, and the subtraction result is introduced to front and rear inclination mode excitation current operation circuit 558. Also, roll angle $-\Delta \theta bc$ is subtracted from output $\Delta \theta bs$ of frame height coordinates operation circuit 540 in subtractor 554, and the subtraction result is introduced to left and right inclination mode excitation current operation circuit 560.

In front and rear inclination mode excitation current operation circuit 558, excitation current i$\xi$bs is calculated for making $(\Delta bs-\Delta \xi bc)$ zero. Therefore, frame 438 is inclined by controlling the expansion and contraction of actuators 478 so that the slippage of steel plate 442 in the front and rear directions is cancelled.

In left and right inclination mode excitation current operation circuit 560, excitation current i0bs is calculated for making (Δθbs+Δθbc) zero. Therefore, frame 438 is inclined by controlling the expansion and contraction of actuators 478 so that the slippage of steel plate 442 in the left and right directions is cancelled.

By this guidance control, steel plate 442 is always maintained facing frame 438 in stable.

When transporter 416 is in the state in FIG. 28(c), if the instructed running speed is gradually increased by the main computer, transporter 416 will accelerate. When accelerating, steel plate 442 will shift toward the rear of frame 438. However, by the above guidance control system, frame 438 will be inclined as shown in FIG. 28(d) and steel plate 442 will follow frame 438. When transporter 416 is running at constant speed by a constant instructed speed, frame 438 will be level, as shown in FIG. 28(e).

In due course, transporter 416 approaches its destination, and when the instructed running speed begins gradually to decrease, transporter 416 will decelerate. When decelerating, steel plate 442 will shift toward the front of frame 438. However, by the above guidance control system, frame 438 will be inclined as shown in FIG. 28(f) and steel plate 442 will follow frame 438.

In this way, when it arrives at its destination and the instructed speed becomes zero, transporter 416 will stop, as shown in FIG. 28(g).

Figure 29A:
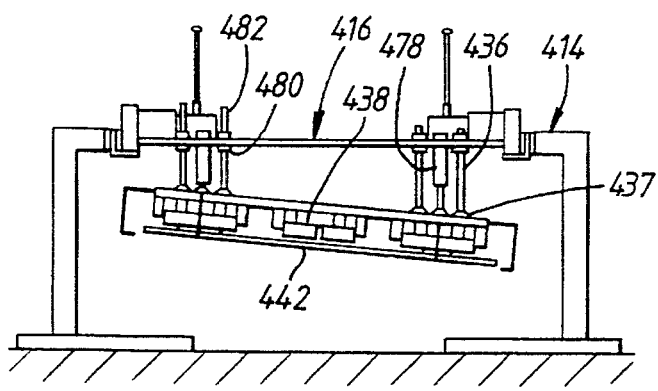
FIG. 29 is illustrations of operations to illustrate a different transport operation using the above transport system.
Figure 29B:
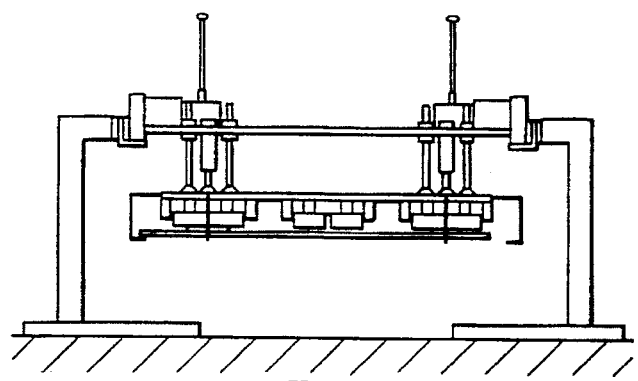
Figure 29C:
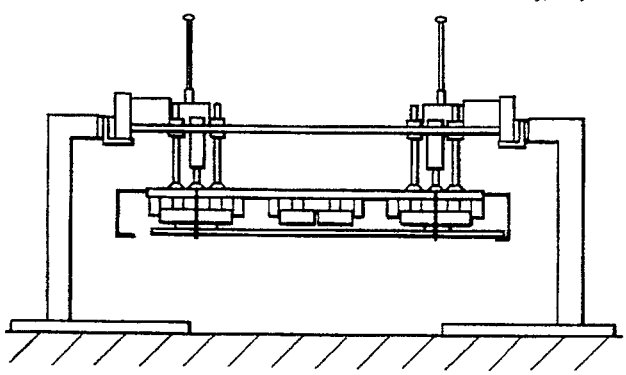
Figure 29D:
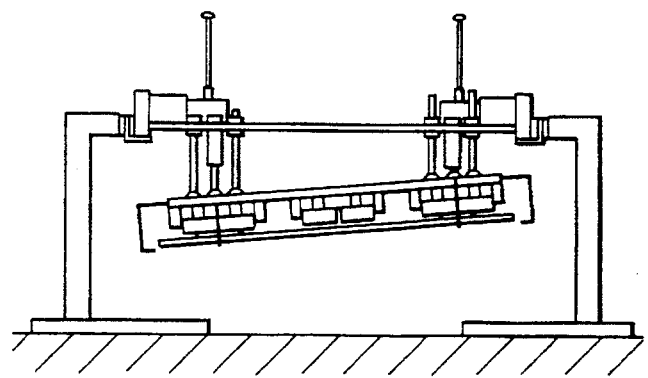

During this time, if external forces are applied in the transverse direction to steel plate 442 under levitation, guidance control is performed which returns steel plate 442 to its original position by inclining frame 438 as shown in FIG. 29(a) for the case of steel plate 442 offset to the left as in FIG. 29(b), and as shown in FIG. 29(d) for the case of offset to the right as in FIG. 29(c). Thus, a state in which steel plate 442 and frame 438 face each other is maintained.

When transporter 416 stops and predetermined height h4 is outputted to frame height setter 528 by the main computer at the moment steel plate 442 is held by guidance control, steel plate 442 is landed on pedestal 566 by the descent of frame 438. At this time, when a 'transport completed' signal is transmitted from the main computer, steel plate detection circuit 504 outputs a TF signal which indicates that steel plate 442 is not present. Then, levitation control and guidance control are stopped by outputting zero in control voltage coordinates conversion circuit 520 and guidance control circuit 546. At the same time, predetermined frame height h1 is outputted in frame height setter 528, and frame 438 rises, leaving steel plate 442 on pedestal 566, as shown in FIG. 28(h). The frame height becomes h1, and transport is completed in the state shown in FIG. 28(i).

In this embodiment, gap sensors 444 are arranged on both sides of magnet units 440. By this means, even if there is bending in the steel plate to be transported, it is possible to detect the levitation gap width between magnet units 440 and steel plate 442 more accurately.

Also, in levitation control, the movement of steel plate 442 is divided into modes by movement coordinate systems, and levitation control is performed mode by mode. For that reason, it is possible to design respective levitation control systems for every mode. Therefore, robust levitation control can be performed for variations in the weight, material and thickness of the steel plate.

Moreover, zero power control is used in levitation control. However, when supporting steel plate 442 without contact by this type of zero power control, the levitation gap widths of magnet units 440 on which the load is increased by the inclination of steel plate 442 decrease. Therefore, the effect of guidance control for the front and rear left and right positional slippage of steel plate 442 is further contributed to by inclining the steel plate in a direction which will return it to its original position. In other words, the magnetic support control device has the additional purpose of an inclination control device.

In the above embodiment, magnetic levitation system 410 is assembled in transporter 416. However, this does not place any limits on whether or not there is a steel plate transport device, nor on the inclination device.

Figure 30:
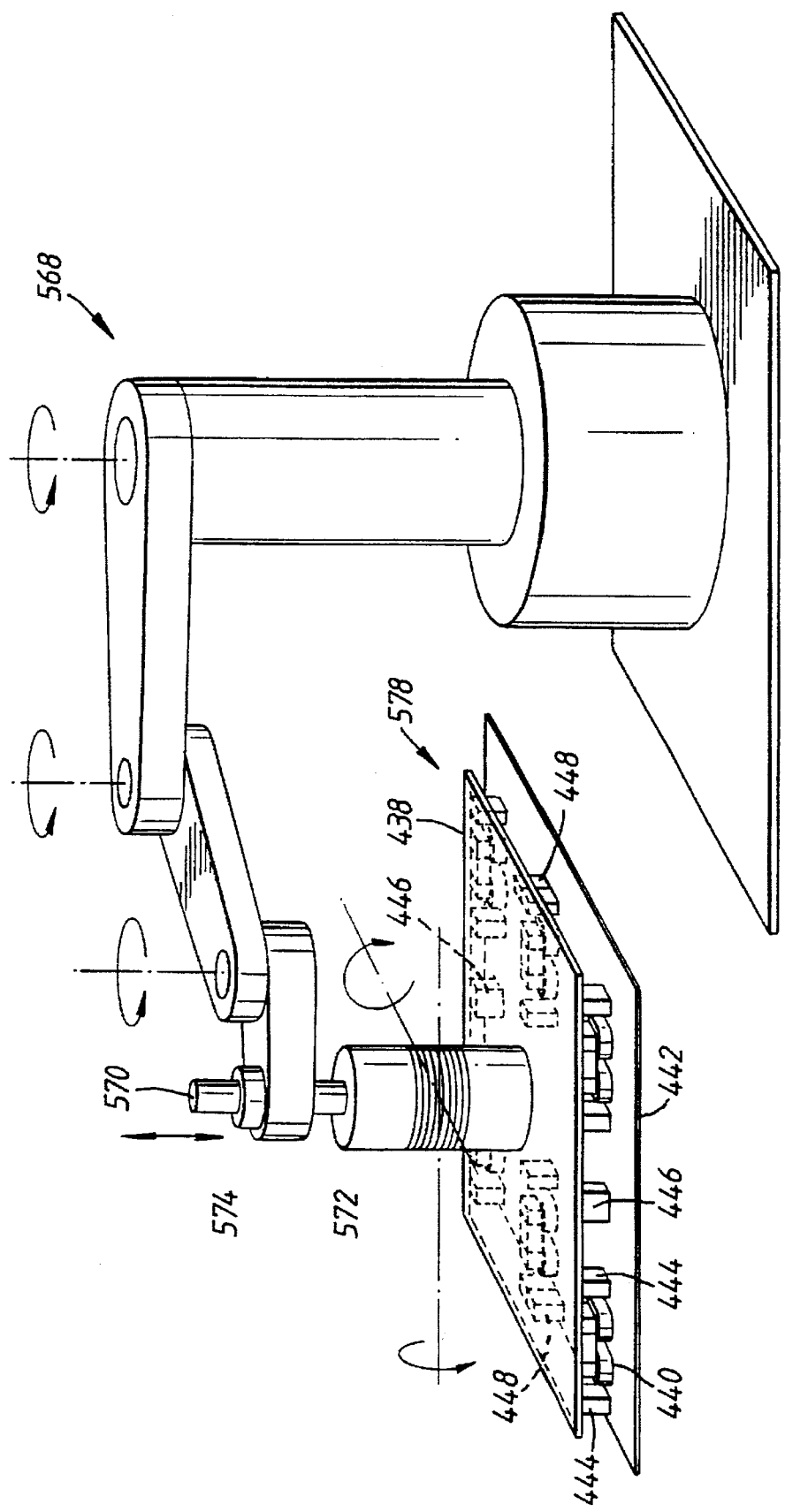
FIG. 30 is an oblique view showing a scalar type robot to which the magnetic levitation system of this invention has been applied.

For example, as shown in FIG. 30, there is no objection of any kind to mounting joint mechanism 572, which is capable flexion with two degrees of freedom, on the lower end of tip 570 of scalar type robot 568 and using this as the inclination device for magnetic levitation system 410. Scalar type robot 568 has the degree of freedom of each rotation about its axis shown in FIG. 30, while tip 570 is constructed so that it moves vertically through actuator 574.

Using this type of composition, the inclination of frame 438 is controlled via the two degrees of freedom of the lower end of joint mechanism 572 of the flexion action and the vertical motion of actuator 574 in response to the travel of tip 570. Thus, steel plate 442 is always supported without contact in a state facing frame 438.

Needless to say, this invention can be widely used for transport and delivery purposes other than the above scalar type robot.

Also, in the above embodiment, the magnetic units are mounted on flat plate-shaped frame 438, and guidance control is achieved by inclining the steel plate by causing the inclination of frame 438.

However, this in no way limits the methods of mounting the magnetic units.

Figure 31:
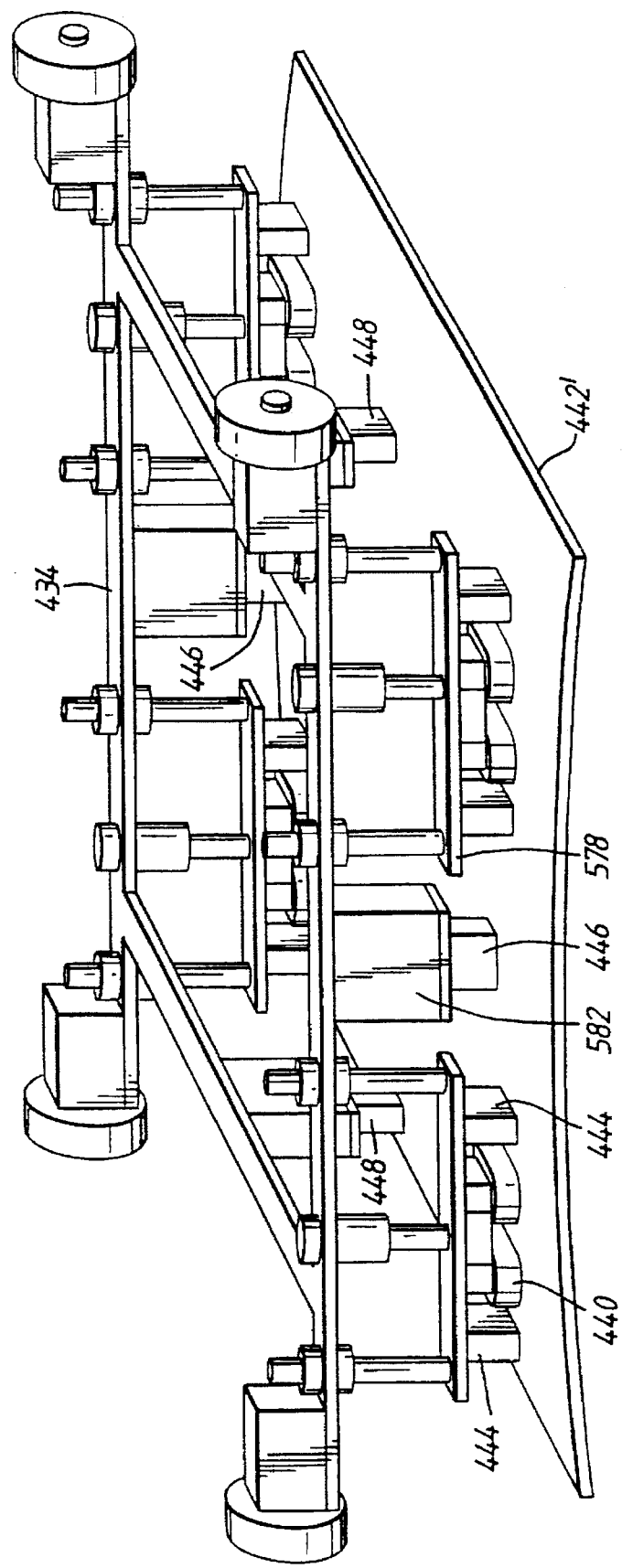
FIG. 31 is an oblique view showing another embodiment of the magnetic levitation system of this invention.

For example, as shown in FIG. 31, instead of frame 438 in magnetic levitation system 410 of FIG. 24, magnetic levitation system 578 may be composed by securing narrow strip-shaped members 576 to the lower ends of actuators 478 and rods 482 which are thrust through linear guides 480 on their left and right sides, and arranging magnet units 440 and gap sensors 444 on the underside of narrow strip-shaped members 576. In this case, substrate 434 may be regarded as a frame for mounting magnet units 440. Also, feed monitors 446 and 448 mounted on the underside of narrow strip-shaped members 580 are secured to substrate 434 via pedestals 582.

In this type of composition, guidance control is performed by inclining the steel plate by changing the heights of respective magnet units. At the same time, magnetic levitation of objects to be transported with large bends, such as steel plate 442', is possible.

Figure 32:
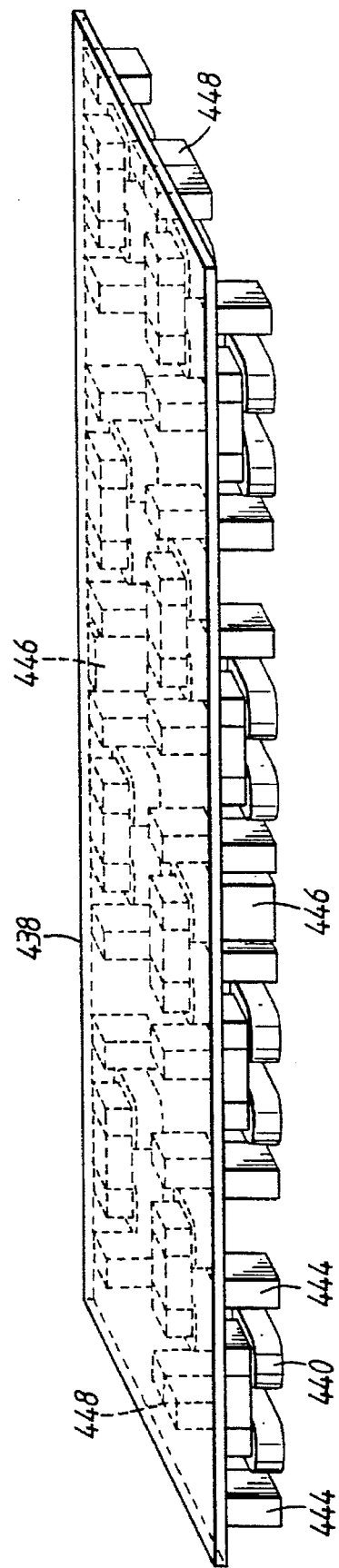
FIG. 32 is an oblique view showing another embodiment of the magnetic levitation system of this invention.

Moreover, in the above embodiment, a steel plate is supported without contact by six magnet units. However, this does not limit the number of magnet units in any way. For example, as shown in FIG. 32, there is no objection to using twelve magnet units. When a large number of magnet units are used in this way, weight increases of the objects to be transported can be coped with, while the supported weight and magnetic flux per magnet unit can be reduced. Thus, even if the object to be transported is thin steel plate, saturation of magnetic flux can be avoided, and stable non-contact support becomes possible.

In addition, in this embodiment, U-shaped magnet units are provided with permanent magnets. However, this does not limit the configurations and compositions of the magnet units in any way. For example, there is no objection of any kind even if the magnet units are composed of various configurations of electromagnets, such as E-shaped or tubular.

Also, in this embodiment, the object to be transported is a flat plate-shaped steel plate. However, this does not limit the material or configuration of the object to be transported in any way provided the object to be transported is composed of a magnetic substance or a ferromagnetic substance, there is no objection to its being of any configuration.

Moreover, in the embodiment described above, the control system and its operation are expressed analogically. However, it is not limited to this type of control method, and a digital method may be used.

Needless to say, in this way, this invention can be implemented by various modifications within limits which do not deviate from its purport.

When the magnetic levitation system of this invention is used as described above, guiding forces act on the object to be transported through the resultants of the gravitational forces due to the tilting of the levitated object to be transported and the attractions of the magnet units. The guiding forces can be adjusted by detecting the amount of travel or the speed of travel of the object to be transported in the guidance direction and controlling the angle of inclination of the object to be transported. Therefore, there is no requirement to provide additional electromagnets for guidance and thus the support mechanism is simplified.

Also, the guiding force is obtained by inclining the object to be transported. Therefore, a size of guiding force which corresponds to the mass of the object to be transported can be obtained. Moreover, guidance of the object to be transported is possible, even if the width of the object to be transported is broader than the span between magnetic units in the guidance direction.

For this reason, it is possible to support without contact a large variety of magnetic bodies over long distances. Also transport lines can be of simple construction.

What is claimed is:

1. A track mounting magnetic levitation transport system in which a track is provided with a magnetic force support system along a transport route of an object to be transported and which supports the object to be transported without contact by controlling a magnetic attraction of the magnetic force support system, comprising:

a track composed of multiple support units arranged along a direction of transport, each of the support units including:

a track frame;

multiple magnetic support units which include electromagnets which are positioned in the track frame in a direction orthogonal to a direction of transport of the object to be transported via mounting devices which permit movement in the vertical direction; and an attraction control device which performs levitation control for perpendicular motion of the object to be transported and performs levitation control for rolling of the object to be transported by controlling the electromagnets of each of the magnetic support units when the object to be transported is below the magnetic support units.

2. A track mounting magnetic leviation transport system as stated in claim 1, wherein:

each of the magnetic support units has a permanent magnet;

a magnetic circuit produced by the electromagnets and a magnetic path produced by the said permanent magnet being common in an air gap between the electromagnets and the object to be transported; and the attraction control device possesses a zero power control capability which causes an excitation current of the electromagnets to converge to zero when the object to be transported is stably levitated, despite a weight variety of the object to be transported.

3. A track mounting magnetic levitation transport system as stated in claim 1, wherein:

the mounting device includes elastic components and inelastic components provided between the track frame and the magnetic support units.

4. A magnetic track positioning type magnetic levitation transport system as stated in claim 1, wherein:

the mounting device includes a height adjustment device which varies mounting heights of the magnetic support units.

5. A track mounting magnetic levitation transport system as stated in claim 4, wherein:

the height adjustment device includes a height control device which controls a levitation of the object to be transported to be at a constant height.

6. A track mounting magnetic levitation transport system as stated in claim 1, further comprising:

a propulsion device in the track frame which applies thrust in the direction of transport to the object to be transported.

7. A track mounting magnetic levitation transport system as stated in claim 6, wherein the propulsion device comprises:

multiple linear induction motor stators arranged to apply thrust in a direction along the track to the object to be transported as a secondary conductor;

a yawing detection device which detects yawing of the object to be transported;

a propulsion operation device which separately calculates thrusts applied to a left and right of the object to be transported based on an output of the yawing detection device; and an excitation device for generating traveling magnetic fields in individual ones of the linear induction motor stators based on calculation results of the propulsion operation device.

8. A track mounting magnetic levitation transport system as stated in claim 1, further comprising:

a guidance device in the track frame which guides the object to be transported along the track without contact.

9. A track mounting magnetic levitation transport system as stated in claim 8, wherein the guidance device comprises:

linear induction motor stators which apply thrust in a guidance direction to the object to be transported as a secondary conductor;

a guidance detection device which detects drift of the object to be transported from the track;

a guiding force operation device which calculates the thrust applied to the object to be transported based on an output of the guidance detection device; and an excitation device for generating moving magnetic fields in the linear induction motor stators based on the calculation results of the guiding force operation device.

10. A track mounting magnetic levitation transport system as stated in claim 9, wherein the guidance device comprises:

at least a pair of linear induction motors which generate mutually opposite thrusts in a direction orthogonal to the direction of transport.

11. A track mounting magnetic levitation transport system as stated in claim 8, wherein the guidance device comprises:

electromagnets arranged so that rolling occurs in the object to be transported due to fluctuation in attraction when a center of gravity of the object to be transported leaves a center line of the track; and a control device which controls guidance by controlling levitation of rolling of the object to be transported.

12. A track mounting magnetic levitation transport system in which a track having a magnetic support system is arranged along a transport route of an object to be transported, and which supports the object to be transported without contact, comprising:

a track composed of multiple support units arranged along a direction of transport, wherein each of the support units comprises:

a track frame;

multiple magnetic support units which include electromagnets which are positioned in the track frame in a direction orthogonal to a direction of transport of the object to be transported via mounting devices which permit movement in a vertical direction;

an attraction control device which performs levitation control for perpendicular motion of the object to be transported and performs levitation control for a rolling of the object to be transported by controlling the electromagnets of each of the magnetic support units when the object to be transported is below the magnetic support units;

an inclination device which causes a variation of an angle of inclination of the object to be transported in a direction orthogonal to the direction of transport; and an angle of inclination control device which controls the angle of inclination.

13. A track mounting magnetic levitation transport system as stated in claim 12, wherein:

each of the magnetic support units includes a permanent magnet;

a magnetic circuit produced by the electromagnets and a magnetic circuit produced by the permanent magnet being common in an air gap between the electromagnets and the object to be transported; and the attraction control device has a zero power control capability which causes an excitation current of the electromagnets to converge to zero when the object to be transported is stably levitated, despite a weight variety of the object to be transported.

14. A track mounting magnetic levitation transport system as stated in claim 12, wherein:

the mounting device includes elastic components and inelastic components provided between the track frame and the magnetic support units.

15. A track mounting magnetic levitation transport system as stated in claim 12, wherein the mounting device includes:

a height adjustment device for varying mounting heights of the magnetic support units.

16. A track mounting magnetic levitation transport system as stated in claim 12, wherein the height adjustment device includes:

a height control device which controls a levitation of the object to be transported to be at a constant height.

17. A track mounting magnetic levitation transport system as stated in claim 12, further comprising:

a propulsion device in the track frame which applies thrust in a direction of transport to the object to be transported.

18. A track mounting magnetic levitation transport system as stated in claim 17, wherein the propulsion device comprises:

thrust application devices to a left and right of the track which apply thrust in a direction along the track to the object to be transported;

a yawing detection device which detects yawing of the object to be transported;

a thrust operation device which separately calculates the thrusts applied to the left and right of the object to be transported based on an output of the yawing detection device; and a thrust generation device for causing generation of thrust in the thrust application devices based on a calculation result of the thrust operation device.

19. A track mounting magnetic levitation transport system as stated in claim 18, wherein the propulsion device comprises:

linear induction motor stators which make the object to be transported a secondary conductor; and an excitation device which generates traveling magnetic fields in the linear induction motor stators as the thrust generation device.

20. A track mounting magnetic levitation transport system as stated in claim 12, wherein the mounting device includes the inclination device.

21. A track mounting magnetic levitation transport system as stated in claim 12, wherein the mounting device comprises:

an angle of inclination control device which is provided in the attraction control device; and the magnetic support units.

22. A magnetic levitation system comprising:

magnet units including electromagnets;

a frame for mounting the magnet units;

a magnetic support control device which controls an attraction of the electromagnets of the magnet units for non-contact support of an object to be transported of which at least a part is formed of a ferromagnetic substance;

an inclination device which causes variation of an angle of inclination of the object to be transported in a direction of transport; and an angle of inclination control device which controls the angle of inclination by controlling the inclination device.

23. A magnetic levitation system as stated in claim 22, wherein:

the inclination device causes the inclination of the frame.

24. A magnetic levitation system as stated in claim 22, wherein:

the magnet units are mounted on the frame via the inclination device.

25. A magnetic levitation system as stated in claim 24, wherein:

the inclination device moves the magnet units in a vertical direction.

26. A magnetic levitation system as stated in claim 22, wherein:

the inclination device comprises:

an angle of inclination control device in the magnetic support control device; and the magnet units.

27. A magnetic levitation system as stated in claim 22, wherein:

the magnet units include permanent magnets; and magnetic circuits of the electromagnets and magnetic circuits of the permanent magnets are common in an air gap between the electromagnets and the object to be transported.

28. A magnetic levitation system as stated in claim 27, wherein:

the magnetic support control device has a zero power control capability which causes an excitation current of the electromagnets to converge to zero when the object to be transported is stably levitated, despite a weight variety of the object to be transported.

* * * * *